United States Patent
Deane et al.

(10) Patent No.: US 10,737,662 B2
(45) Date of Patent: Aug. 11, 2020

(54) SYSTEMS AND METHODS FOR PERCEPTION SURFACE CLEANING, DRYING, AND/OR THERMAL MANAGEMENT WITH FLUID RECIRCULATION

(71) Applicants: Geoffrey F. Deane, Bellevue, WA (US); Jere R. Lansinger, Camano Island, WA (US); Derrick Redding, Ann Arbor, MI (US); Karen Harban, Seattle, WA (US); Varun Rupchandani, Seattle, WA (US); Ian Walp, Seattle, WA (US); Karthik Unnikrishnan, Seattle, WA (US); Hrishikesh Pathak, Seattle, WA (US); Nishant Hingne, Redmond, WA (US); Diane Lansinger, Bellevue, WA (US)

(72) Inventors: Geoffrey F. Deane, Bellevue, WA (US); Jere R. Lansinger, Camano Island, WA (US); Derrick Redding, Ann Arbor, MI (US); Karen Harban, Seattle, WA (US); Varun Rupchandani, Seattle, WA (US); Ian Walp, Seattle, WA (US); Karthik Unnikrishnan, Seattle, WA (US); Hrishikesh Pathak, Seattle, WA (US); Nishant Hingne, Redmond, WA (US); Diane Lansinger, Bellevue, WA (US)

(73) Assignee: SEEVA Technologies, Inc., Bellevue, WA (US)

(*) Notice: Subject to any disclaimer, the term of this patent is extended or adjusted under 35 U.S.C. 154(b) by 0 days.

(21) Appl. No.: 16/455,706

(22) Filed: Jun. 27, 2019

(65) Prior Publication Data
US 2020/0001331 A1    Jan. 2, 2020

Related U.S. Application Data

(60) Provisional application No. 62/690,350, filed on Jun. 27, 2018, provisional application No. 62/717,583, (Continued)

(51) Int. Cl.
*B60S 1/48* (2006.01)
*B08B 3/10* (2006.01)
(Continued)

(52) U.S. Cl.
CPC ............... *B60S 1/488* (2013.01); *B08B 3/10* (2013.01); *B60S 1/0848* (2013.01); *B60S 1/487* (2013.01);
(Continued)

(58) Field of Classification Search
CPC .... B08B 3/02; B08B 5/02; B08B 7/04; B08B 2203/027; B60S 1/0848; B60S 1/46;
(Continued)

(56) References Cited

U.S. PATENT DOCUMENTS 3,114,168 A    12/1963    Taylor et al.
3,503,091 A    3/1970    Petry et al.
(Continued)

FOREIGN PATENT DOCUMENTS

GB    1048622 A    11/1966
WO    2013101408 A1    7/2013
WO    2018106840 A1    6/2018

OTHER PUBLICATIONS

International Searching Authority, International Search Report and Written Opinion, PCT Patent Application PCT/US2017/064966, dated Mar. 2, 2018, 12 pages.
(Continued)

*Primary Examiner* — David G Cormier
(74) *Attorney, Agent, or Firm* — Perkins Coie LLP

(57) ABSTRACT

Systems and methods for cleaning, drying, and thermally managing vehicle components are described herein. In some embodiments, the vehicle components can include various sensors and, more particularly, the surfaces of cameras, LIDAR sensors, etc., that need to be clean to effectively perceive the environment around the vehicle. In one embodiment, a cleaning system includes a central delivery system configured to route fluid, such as washer fluid, along one or more delivery channels to remote holding chambers.
(Continued)

The holding chambers can hold and/or heat the fluid before delivering the fluid to nozzles that spray the fluid on nearby vehicle components to clean the components.

17 Claims, 38 Drawing Sheets

Related U.S. Application Data filed on Aug. 10, 2018, provisional application No. 62/731,004, filed on Sep. 13, 2018, provisional application No. 62/917,825, filed on Dec. 31, 2018.

(51) Int. Cl.
*B60S 1/56* (2006.01)
*B60S 1/08* (2006.01)
*B60S 1/52* (2006.01)

(52) U.S. Cl.
CPC . *B60S 1/52* (2013.01); *B60S 1/56* (2013.01); *B08B 2203/007* (2013.01)

(58) Field of Classification Search
CPC .. B60S 1/48; B60S 1/481; B60S 1/487; B60S 1/50; B60S 1/52; B60S 1/56; B60S 1/563; B60S 1/566; B60S 1/58; B60S 1/60; B60R 1/0602; G02B 27/0006
See application file for complete search history.

(56) References Cited

U.S. PATENT DOCUMENTS

| | | | |
|---|---|---|---|
| 3,522,909 A * | 8/1970 | Perry | F24H 1/165 239/127 |
| 3,646,774 A | 3/1972 | Werner | |
| 3,759,290 A | 9/1973 | D'Alba | |
| 3,786,222 A | 1/1974 | Harnden et al. | |
| 3,888,412 A | 6/1975 | Lindo et al. | |
| 4,022,349 A | 5/1977 | McMullan et al. | |
| 4,090,668 A | 5/1978 | Kochenour et al. | |
| 4,481,805 A | 11/1984 | Dobesh | |
| 4,516,596 A * | 5/1985 | Sugisawa | B08B 9/0323 137/240 |
| 4,575,003 A | 3/1986 | Linker et al. | |
| 4,809,863 A | 3/1989 | Woodcock et al. | |
| 5,522,453 A | 6/1996 | Green | |
| 5,549,128 A | 8/1996 | Mansur | |
| 5,693,149 A | 12/1997 | Passer et al. | |
| 5,957,384 A | 9/1999 | Lansinger et al. | |
| 6,032,324 A | 3/2000 | Lansinger | |
| 6,133,546 A | 10/2000 | Bains | |
| 6,615,438 B1 | 9/2003 | Franco et al. | |
| 8,550,147 B2 | 10/2013 | Lansinger | |
| 8,925,620 B2 | 1/2015 | Lansinger et al. | |
| 2002/0005440 A1 | 1/2002 | Holt et al. | |
| 2002/0134857 A1 | 9/2002 | Zimmer | |
| 2006/0042785 A1 | 3/2006 | Werner et al. | |
| 2006/0201933 A1 | 9/2006 | Carpino et al. | |
| 2007/0181565 A1 | 8/2007 | Murahashi et al. | |
| 2008/0272110 A1 | 11/2008 | Kamiyama et al. | |
| 2010/0037415 A1 | 2/2010 | Lansinger et al. | |
| 2011/0073142 A1 | 3/2011 | Hattori et al. | |
| 2012/0174333 A1 | 7/2012 | Heidacker | |
| 2014/0238370 A1 | 8/2014 | Pursifull et al. | |
| 2015/0360853 A1 | 12/2015 | Nicmanis | |
| 2015/0375715 A1 | 12/2015 | Izabel et al. | |
| 2017/0210304 A1 | 7/2017 | Davies et al. | |

OTHER PUBLICATIONS

International Searching Authority, International Search Report and Written Opinion, PCT Patent Application PCT/US2019/039630, dated Nov. 8, 2019, 12 pages.

* cited by examiner

SYSTEMS AND METHODS FOR PERCEPTION SURFACE CLEANING, DRYING, AND/OR THERMAL MANAGEMENT WITH FLUID RECIRCULATION

CROSS-REFERENCE TO RELATED APPLICATION

This application claims priority to (i) U.S. Patent Application No. 62/690,350, titled "SYSTEM FOR PERCEPTION SURFACE CLEANING AND THERMAL MANAGEMENT," and filed Jun. 27, 2018; (ii) U.S. Patent Application No. 62/717,583, titled "SELECTIVE DELIVERY OF WASHER FLUID FOR TEMPERATURE CONTROL," and filed Aug. 10, 2018; (iii) U.S. Patent Application No. 62/731,004, titled "COMBINED SYSTEM OF HEATED WASHER FLUID AND FORCED GAS DRYING FOR VEHICLE SURFACE CLEANING," and filed Sep. 13, 2018; and (iv) U.S. Patent Application No. 62/917,825, titled "ELECTRIC WASHER FLUID HEATING SYSTEM," and filed Dec. 31, 2018, each which is incorporated herein by reference in its entirety.

TECHNICAL FIELD

The present technology relates to systems and methods for cleaning vehicle components including perception surfaces, such as sensors, windshields, mirrors, headlamps, etc.

BACKGROUND

Vehicle operation requires the ability to see. Historically, this has meant that a human driver must be able to see around a vehicle they are operating to safely operate the vehicle. However, as automobiles, heavy trucks, and other vehicles have evolved over time, so too have the systems and components that enable the driver's ability to perceive the vehicle's surroundings. Examples include the invention of windshields, windshield wipers, wiper fluid, headlights, high beams, tail signals, stop signals, turn signals, marker lights, rear and side view mirrors, window defogging systems, window tinting, window shades, etc. More recently, examples include sensors like backup cameras, radar, and other advanced driver assistance systems (ADAS), which further include LIDAR, FLIR night vision, sonar, etc. It is expected that vehicles will increasingly rely on an array of perception sensors like cameras and LIDAR to "see" and navigate. Accordingly, it is expected that the safe and effective operation of vehicles will increasingly depend upon reliable functioning of such perception systems.

A vehicle's perception surfaces (e.g., windshield, mirrors, headlamps, sensors, etc.) are affected by the environment in which the vehicle operates. Common environmental obstructions include snow, ice, mud, insect splatter, and bird droppings. A vehicle can be expected to experience a variety of these situations in any given trip, leading to frequent and fast-developing changes in its ability to "see," as well as the driver's ability to see. Further, vehicles are often stored outside in ever-changing environmental situations. A common occurrence is windshield frost, which can be difficult to manually remove, and which today's vehicle systems often struggle to remove in less than ten minutes. This results in vehicles being left to cold idle, which consumes fuel, results in unnecessary vehicle emissions, and wastes drivers' time. Moreover, some drivers may start driving prematurely—before having clear and safe vision—increasing the likelihood of accidents.

Current vehicle designs may include several systems for removing obstructions from perception surfaces, such as electric heaters, warm air flow, specialized coatings, mechanical wipers, wiper fluid, vibrating surfaces, and spinning surfaces. Electric heaters, for example, often consist of thin wires embedded in surfaces to be cleared of ice (e.g., a windshield) or in materials put in contact with the surfaces, and can still require ten or more minutes to effectively clear a surface. Moreover, such heaters provide heat for deicing—but do not dissolve, mechanically remove, or mobilize other obstructions away from the surface. In some instances, such systems can add significantly to the cost of a vehicle, particularly for surfaces, such as a windshield, that may be damaged or replaced during a vehicle's lifetime.

Oppositely, wipers and fluid can dissolve, mobilize, and mechanically remove some obstructions. However, they are inadequate for many types of obstructions, and they do not provide thermal energy to hasten removal of ice, snow, bug splatter, etc. Further, washer fluid is commonly composed of water and up to 50% alcohol (methanol or ethanol) to ensure that wiper fluid does not freeze or "refreeze" after application (e.g., spraying)—which can reduce visibility and/or damage the vehicle as the frozen fluid expands. An unfortunate side effect of using alcohol is the strongly inverted correlation between temperature and fluid viscosity. Cold alcohol-water mixtures have been shown to have viscosity five (or more) times higher than warm fluid, resulting in situations where warm fluid sprays evenly across the windshield, but cold fluid trickles out and only reaches a short distance from the spray nozzles at greatly reduced flow rates. Therefore, it is highly desirable to heat washer fluid before pumping it onto perception surfaces of a vehicle.

One challenge with the use of washer fluid in surface cleaning is that washer fluid is consumed in the process. Bottled washer fluid (or additive concentrate added to water) can be expensive, requires effort to replace, and washer fluid reservoirs take space and add significant weight to a vehicle. Vehicle engineers place a high premium on the weight and volume of vehicular systems, especially when a vehicle's design borders on a weight class limit. Systems that do not efficiently use washer fluid will result in inconvenience and cost to the vehicle owner and may not be readily implemented in automotive designs by engineers. Therefore, it is highly desirable to utilize as little washer fluid as possible in cleaning perception surfaces.

Moreover, washer fluid premixes can pollute the air, ground, and water, which is becoming more problematic as the number of vehicles in the world increases (presently there are over 1 billion vehicles and growing). For example, the European Union (EU) has passed strict restrictions on the amount of antifreeze that may be in washer fluid. Therefore, vehicles in the EU commonly have warming coils, electrically heated washer hoses, and/or electrically heated nozzles to thaw and maintain washer fluid above freezing. An associated problem with efficiently providing heated fluid to perception surfaces without wasting fluid is that any tubing carrying heated washer fluid from the heating source to the point of application loses heat to the surrounding environment. Even when fluid in this tubing is very hot, it quickly cools and approaches ambient temperature. To subsequently deliver hot fluid through the tubing, the previously cooled fluid must first be removed from the tubing (e.g., via spraying) prior to the arrival and delivery of hot fluid. Accordingly, more effective means to economize on washer fluid usage and improve the efficiency of its use have become a significant need for the future—especially where autonomous or other vehicles may include many vehicle components (e.g., 30 or more per vehicle) that require periodic cleaning.

Additionally, perception devices, such as high-resolution electronic cameras, LIDAR systems, LED lighting system, etc., generate heat that can increase the operating temperatures of these devices above their indicated operating ranges. Moreover, when temperatures rise, the lifetime and performance of such devices decrease. Similarly, other devices within a vehicle—such as those containing batteries—must be maintained within certain temperature ranges and can therefore benefit from heating. These temperature constraints often present challenges with locating and mounting the devices on a vehicle, and with the design and packaging of the devices themselves. For example, devices that tend to overheat typically require larger surface areas or even supplemental cooling fins, such as those found on the back of LED headlights.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Figure 1:
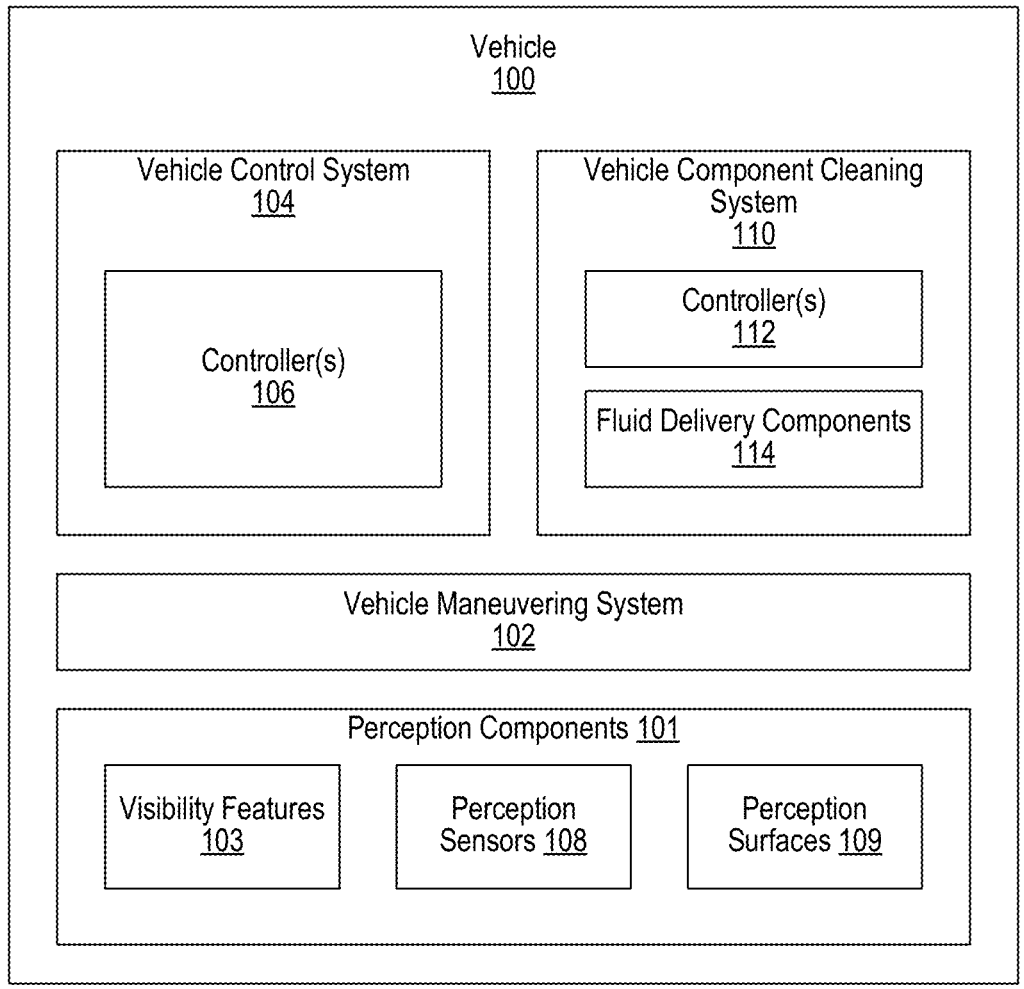
FIG. 1 is a block diagram of a vehicle configured in accordance with an embodiment of the present technology.

The following disclosure describes various embodiments of systems and methods for cleaning, drying, and thermally managing vehicle components, including surfaces of vehicle perception components. In some embodiments, the perception surface vehicle components can include one or more exterior surfaces of a vehicle's perception component, such as a windshield, windows, lights, mirrors, cameras, detectors, and other perception sensors or features that may need to be clean to effectively perceive the environment around the vehicle. In some embodiments, a perception surface cleaning system includes a central delivery system configured to route fluid, such as washer fluid, along one or more delivery channels to remote holding chambers. The holding chambers can hold and/or heat the fluid before delivering the fluid to nozzles that spray the fluid on nearby perception surfaces to clean the components.

Certain details are set forth in the following description and in FIGS. 1-38 to provide a thorough understanding of various embodiments of the present technology. In other instances, well-known structures, materials, operations, and/or systems often associated with vehicles, perception sensors, electromechanical systems, fluid delivery systems (e.g., valves, manifolds, etc.), etc., are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

The headings provided herein are for convenience only and do not necessarily affect the scope of the embodiments.

I. OVERVIEW

FIG. 1 is a block diagram of a vehicle 100 (e.g., an automobile) configured in accordance with an embodiment of the present technology. In the illustrated embodiment, the vehicle 100 includes a maneuvering system 102 (e.g., a system of vehicle components configured to maneuver or physically displace the vehicle) including a propulsion mechanism (e.g., an engine or a motor), a directional mechanism (e.g., steerable wheels), a deceleration mechanism (e.g., brakes, an opposing engine or motor, etc.), and/or other related components. For example, for automobiles, the maneuvering system 102 can include a drive train (e.g., an engine and a transmission), a steering system directing orientation of one or more wheels, a brake system, an external indicator system (e.g., lights corresponding to the brake or a lane-change operation), a drive-by-wire system, or a combination thereof. In other embodiments, the vehicle 100 can be a water, amphibious, or aerial vehicle, and the maneuvering system 102 could include one or of rudders, flaps, movable propulsion mounts, or other suitable components depending on the intended environment for the vehicle.

In some embodiments, the vehicle 100 can include one or more perception components 101 including visibility features 103. For example, the visibility features 103 can include a windshield, windows, mirrors, lights, and/or other surfaces of the vehicle 100. Some or all of the visibility features 103 may require periodic cleaning to, for example, improve the ability of an operator of the vehicle 100 to see through the visibility features 103. The perception components 101 also include perception sensors 108, including cameras, detectors, and other sensors that include external perception surfaces 109 that may be exposed to the elements during operation of the vehicle.

The vehicle 100 further includes a vehicle component cleaning, drying, and/or thermal management system 110 ("cleaning system 110"; which can also be referred to as a fluid delivery system, a perception surface cleaning system, a sensor cleaning system, etc.). The cleaning system 110 is configured to clean, dry, heat, and/or cool the sensors 108, the perception surfaces 109, components of the maneuvering system 102, and/or other components of the vehicle 100 (collectively "vehicle components"). The cleaning system 110 can include one or more controllers 112 operably coupled to one or more fluid delivery components 114, such as tubes, heaters, chillers, valves, manifolds, reservoirs, etc., as described in detail below with reference to FIGS. 2-38. In some embodiments, all or portions of the maneuvering system 102, the vehicle control system 104, and/or the cleaning system 110 can be physically or functionally combined. For example, in some embodiments the vehicle 100 can include a central (e.g., single) controller for controlling both the maneuvering system 102 and the cleaning system 110. Moreover, while the perception surfaces 109 and the sensors 108 are identified as separate components in FIG. 1, the sensors 108 can each include a "perception surface" for receiving/transmitting signals (e.g., detecting light).

The controllers 112 of the cleaning system, and the controllers 106 of the vehicle control system can include one or more CPU(s) (processor) that can be a single processing unit or multiple processing units in a device or distributed across multiple devices. CPU can be coupled to other hardware devices, for example, with the use of a bus, such as a PCI bus or SCSI bus. In some implementations, the controllers can include a communication device capable of communicating wirelessly or hard wired, with features, such as sensors, valve manifolds as discussed below, or other features related to the vehicle. The CPU can have access to a memory in a device or distributed across multiple devices. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory can include program memory that stores programs and software, such as an operating system, adaptive training system, and other application programs. Memory can also include data memory that can include power measurements, windowing data points, critical power or finite work capacity determinations, parameterized transformations for various workouts in terms of work, adaptive workout programs based on ability functions, configuration data, settings, user options or preferences, etc., which can be provided to the program memory or any element of the vehicle component of the cleaning, drying and/or thermal management system 110 of the present technology.

In some embodiments, the cleaning system 110 is configured to selectively deliver fluid (e.g., washer fluid, air, etc.) to one or more of the perception surfaces 109 to thereby clean the perception components 101. In some embodiments, the cleaning system 110 pumps washer fluid and/or air and delivers it to one or more selected channels by, for example, opening or closing of one or more valves. The valves may be located distant from each other or may be co-located such as on a shared manifold. In some embodiments, the control of flow in each channel may also be directed through adjusting the position of a rotary valve. Each channel comprises a fluid conduit through which the fluid flows when pumped, delivering it to a nozzle or other application device to clean one or more of the vehicle components. The fluid may be heated prior to the pump, in between the pump and the one or more valves, or anywhere along the length of the conduit carrying the fluid from the one or more valves to the point of delivery. In some embodiments, the cleaning system 110 may include a recirculating function whereby warmed fluid may be routed through a channel to a position proximate to its desired delivery point, and fluid located at that point, which may have cooled over time, may be routed to return to the washer fluid reservoir.

In some embodiments, the cleaning system 110 is configured to selectively deliver a cooling fluid (e.g., washer fluid, air, etc.) to one or more of the perception components 101, such as the sensors 108 or other vehicle components, for thermal management (e.g., cooling or heating). In some embodiments, the cleaning system 110 can pump and deliver a cooling fluid, either at ambient temperature or chilled by a fluid chiller, to one or more selected channels by opening or closing selected valves. Each channel comprises a conduit through which the cooling fluid flows when pumped, delivering it to a heat exchanger located at the vehicle component to be cooled. In some embodiments, the fluid chiller may be a discrete device or may leverage an air conditioning system of the vehicle 100 to chill the fluid and/or to provide dehumidified air. In some embodiments, the cooling fluid may traverse a recirculating path—wherein the cooling fluid (i) is delivered from a central reservoir to the vehicle component to be chilled to absorb heat from the component and (iii) subsequently returned to the central reservoir.

In some embodiments, the cleaning system 110 is configured to deliver fluid to one or more of the vehicle components for both cleaning and thermal management. For example, one channel with a single lumen can be configured to carry heated or cool washer fluid, and heated or cooled air. The air may be ambient air and/or dehumidified drying air, which may be provided via vehicle's air conditioning system. In another example, one or more channels carrying cooling fluid and/or air can be co-routed with one or more channels carrying heated washer fluid, simplifying installation and routing of the cleaning system 110 within the vehicle 100. In some embodiments, the same fluid is operative at the same temperature for both "warming" (e.g., permitting an effective occlusion wash and dry function) and for "cooling" (e.g., for inhibiting one or more of the sensors 108, such as cameras, from getting too hot). In another embodiment, one or more channels can be configured to carry a flow of air (ambient or dehumidified drying air) that is delivered to a perception surface of, as an example, a sensor 108.

In some embodiments, the cleaning system 110 is further configured to carry and deliver forced air (heated, dried (i.e., dehumidified), or ambient air) for delivery to destination points proximate to the destination points of the heated washer fluid and the cooling fluid (e.g., to the sensors 108). For example, forced air may be used to dry the surface of one of the sensors 108 after it has been cleaned by the delivery of washer fluid. In some embodiments, the channels for forced air, washing fluid, and cooling fluid can be coaxially located on the same conduit—for example, where the inner channel carries washer fluid and the outer channel carries air. The proximity of the channels can advantageously allow heat transfer between the air and the liquid washer fluid.

In some embodiments, the vehicle control system 104 and/or the cleaning system 110 are configured as a closed-loop system. For example, the sensors 108 can communicate with (e.g., send signals to) the controller(s) 106 of the vehicle control system 104 and/or the controller(s) 112 of the cleaning system 110 when the sensors 108 become occluded, exceed a threshold temperature, etc. That is, for example, the vehicle control system 104 and/or the cleaning system 110 can recognize that a particular one of the sensors 108 is not seeing properly, declare a fault, and initiate an attempt to clear the fault. To clear the fault, the cleaning system 110 can deliver washer fluid and/or forced air to the surface of the sensor 108 to clean the surface, and the vehicle control system 104 can check the signal coming from the sensor 108 to determine whether the obstruction has been cleared. Alternatively or additionally, the vehicle control system 104 can engage the cleaning system 110 on a periodic basis without determining that an obstruction exists. For example, forced air may be applied in response to a fault, or it may be applied periodically, or even constantly as the flow of air over the sensor surface may reduce the likelihood that the sensor becomes obstructed. Similarly, the cleaning system 110 can provide cooling on a periodic basis, or cooling may be provided on a periodic basis in which the period varies with the activity of the particular one of the sensors 108, with an ambient temperature, etc. In some embodiments, for example where the vehicle control system 104 is not fully autonomous, the operator of the vehicle 100 may make the determination that one of the vehicle components (e.g., a backup camera, windshield, etc.) needs cleaning, and may engage with the vehicle 100 to trigger the cleaning system 110 to clean the sensor 108 or perception surface.

II. SELECTED EMBODIMENTS OF VEHICLE COMPONENT CLEANING SYSTEMS

In some embodiments of the present technology, a cleaning system (e.g., the cleaning system 110) can be configured to heat and deliver fluid, such as washer fluid, to one or more vehicle components (e.g., the sensors 108 and/or the perception surfaces 109) to clean the vehicle components. In some embodiments, the cleaning system 110 can include a centralized heater that heats the washer fluid at a single location and then moves the heated fluid to the point of delivery. In one aspect of the present technology, such a centralized approach can reduce the number of required components. In another aspect of the present technology, a centralized heater enables parasitic heat recovery from other localized heat sources, such as various components of the maneuvering system 102 (e.g., an internal combustion engine of the vehicle 100, an exhaust system of the vehicle 100, a warm battery encasement of the vehicle 100, etc.) However, the washer fluid will cool as it moves from the centralized heater to the point of delivery, and will cool more the longer it takes to deliver the washer fluid.

In other embodiments, the cleaning system 110 can heat the washer fluid in a decentralized manner, where ambient temperature fluid is moved to the desired application point (or near to it), and then heat is applied. In one aspect of the present technology, this decentralized approach benefits from less heat loss before delivery but can require relatively more components than a centralized heating system. Additionally, it is more difficult to provide a high temperature source for heat exchange to a distributed collection of application points.

The cleaning system 110 typically heats the washer fluid by electric resistance heating, or by heat exchange from a high temperature source. Electric heating utilizes electric power from the vehicle 100, which is often tightly controlled and not widely available, and the generation of which can adversely affect the efficiency of the vehicle 100. Because of this, electric washer fluid heaters are typically of relatively low continuous power. However, such electric heaters also have the advantage of being able to apply that power even when the vehicle 100 is cold, as it may be when starting vehicle operation. By contrast, parasitic heating, or the recovery of waste heat from the vehicle 100 via a heat exchanger, can often provide many times as much heating power as electric heaters. Additionally, as vehicles often have whole systems designed to get rid of the waste heat, recovery of a small amount has little to no effect on the vehicle 100. However, these heaters generally require a high temperature heat source, which may not be available for several minutes following vehicle start. Accordingly, in some embodiments the cleaning system 110 includes a hybrid parasitic-electric fluid heater that utilizes both electric heating and parasitic heating. For example, the cleaning system 110 can utilize the electric heater when the heat exchanger cannot provide heat (e.g., during and immediately after the vehicle 100 is started), and can then shut off or minimize the electricity draw from the vehicle 100 and rely on the plentiful waste heat once the vehicle 100 provides heat (e.g., after the vehicle 100 has warmed up).

The washer fluid is typically brought into the cleaning system 110 at ambient temperature. In some embodiments, the cleaning system 110 heats the washer fluid in-line—in which all pumped fluid passes through the heater. For an electric heater, the electric current can be shut off if no heating is desired. However, for a parasitic heat exchanger heater, all fluid flowing through the heat exchanger will exchange heat. In some embodiments, the cleaning system 110 can include a valving system configured to control the flow of the washer fluid to selectively direct all of the washer fluid to the heater or to bypass the heater, or to direct part of the fluid to the heater, part to bypass the heater, and then recombine the flows.

In some embodiments, the cleaning system 110 includes distributed electric heaters. In such embodiments, ambient temperature fluid can be pumped through a rotary valve to select a distribution channel, and thereby to select a desired vehicle component destination for the fluid. Just before arrival at the point of application, one of the distributed electric heaters can selectively heat the fluid. For example, heating can be applied through an electric resistance heating element to a small volume of fluid in an in-line chamber located close to a spray nozzle. This volume is sized to hold the approximate amount of fluid expected to be used in cleaning that channel's perception surface. Generally, the larger the surface to be cleaned, the larger the in-line heated fluid volume. For example, the cleaning system 110 may be designed to apply between 0.5-3 milliliters of heated fluid per square centimeter of area.

The cleaning system 110 can include sensors to measure the fluid temperature in the in-line chamber as well as in the electric heating elements. A centralized controller (e.g., one or more of the controllers 106 and/or 112) can receive the temperature signals from each channel's sensors and apply or shut off electric current to the channel's heating element such that desired temperatures are achieved. In some embodiments, instead of controlling fluid temperature within the in-line heating chamber using sensors and a controller, a positive temperature coefficient heater may be used which self-limits temperature by reducing heating as temperatures rise. Heaters can be designed to apply enough power to heat fluid from ambient to the desired delivery temperature in a desired amount of time, usually less than 60 seconds. This enables the vehicle components to be repetitively cleaned with properly heated fluid. In some embodiments, the centralized controller can selectively apply current to the channels' heaters to maintain electric power usage within desired limits. In other embodiments, heating may alternatively be applied to the tubing or conduit carrying fluid towards a nozzle.

In some embodiments, the cleaning system 110 can include multiple fluid channels that can be selected for fluid delivery to different ones of the vehicle components via operation of a collection of solenoid valves (e.g., a manifold). The controller 106 and/or the controller 112 can monitor power usage on each channel and choose whether to provide power to each channel.

FIGS. 2-9 are schematic illustrations more specifically illustrating various embodiments of closed-loop control cleaning systems (e.g., sensor cleaning systems) for cleaning one or more vehicle components (e.g., perception sensors) configured in accordance with embodiments of the present technology. The detailed description of each embodiment focuses mainly on those components that are new/different as compared to other embodiments. However, one skilled in the art will appreciate that the various embodiments can (i) include the same or generally similar features (e.g., components, configurations, etc.), (ii) operate the same or generally similarly, and/or (iii) that the various embodiments can be combined. Moreover, one of ordinary skill in the art will appreciate that the number of components can vary in the following embodiments. For example, the systems of the present technology can have any number of delivery channels, return channels, sensors, heaters, chillers, heat exchangers, nozzles, etc.

Figure 2:
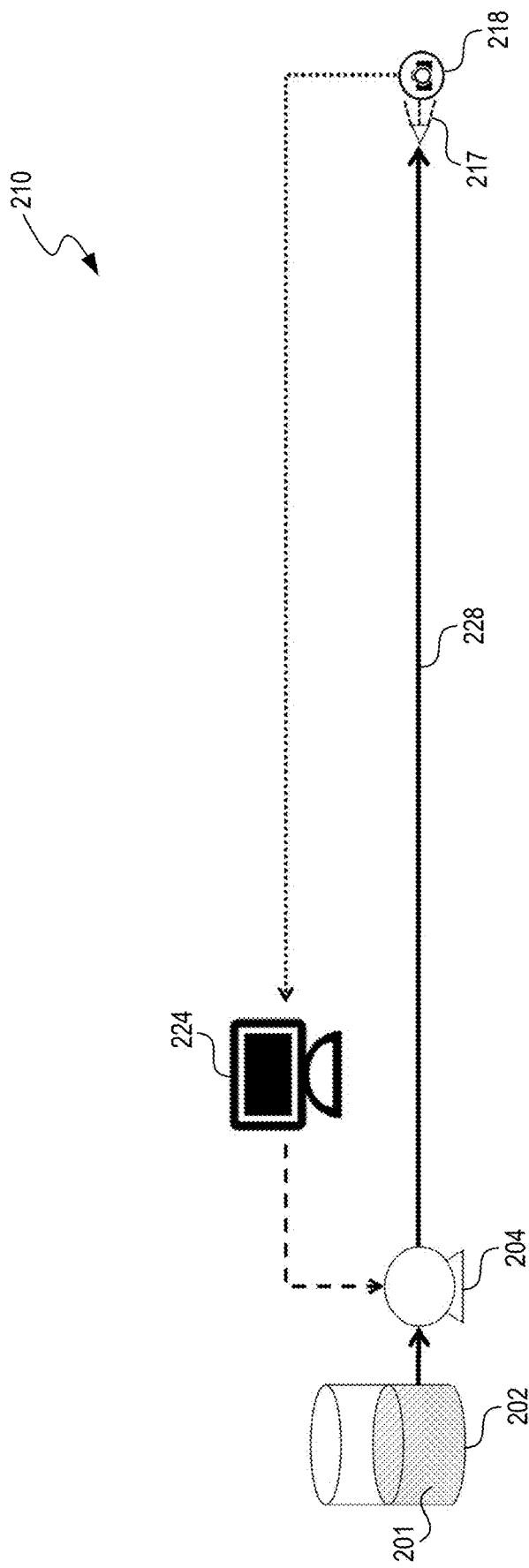
FIG. 2 is a schematic illustration of a perception surface system configured in accordance with an embodiment of the present technology.

FIG. 2 is a schematic illustration of a perception surface cleaning system (e.g., a fluid delivery system) 210 configured in accordance with an embodiment of the present technology. In the illustrated embodiment, a washer fluid pump 204 is configured to pump washer fluid 201 from a reservoir 202 through a delivery channel 228 to a nozzle 217. The nozzle 217 is configured to spray the washer fluid onto the perception surface to clean the sensor 218. In other embodiments, the nozzle 217 can be configured to spray and clean the surface of another perception feature, such a window, windshield, mirror, or other perception component, instead of or in addition to the sensor 218. In the illustrated embodiment, a controller 224 is operably/communicatively coupled to the pump 204 and the sensor 218. The controller 224 can receive signals from the sensor 218 or otherwise determine that the sensor 218 is occluded and can selectively engage the pump 204 to clean the sensor 218 (e.g., the perception surface of the sensor 218). In some embodiments, the controller 224 can selectively engage the pump 204 by controlling an on/off state of the pump 204. In other embodiments, the controller 224 can selectively engage the pump 204 by controlling/selecting a desired pumping flow rate corresponding to a level of sensor occlusion, an ambient temperature, an amount of fluid 201 remaining in the reservoir 202, and/or other conditions. By this arrangement, the system 210 is configured for closed-loop control and operation.

Figure 3:
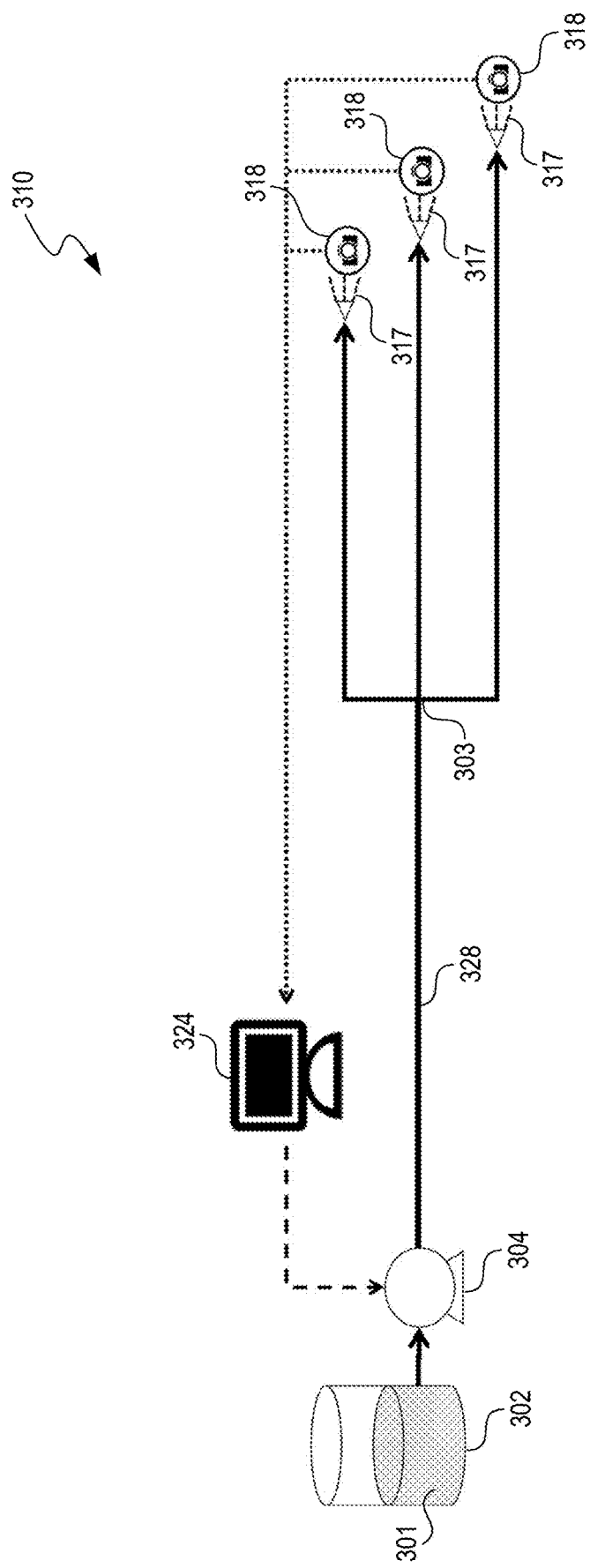
FIG. 3 is a schematic illustration of a perception surface cleaning system for cleaning one or more perception components configured in accordance with an embodiment of the present technology.

FIG. 3 is a schematic illustration of a vehicle component cleaning system 310 for cleaning one or more sensors 318 configured in accordance with an embodiment of the present technology. In the illustrated embodiment, a washer fluid pump 304 is configured to pump washer fluid 301 from a reservoir 302 and along a delivery channel 328 to a flow splitter 303. The flow splitter 303 splits the flow of washer fluid 301 for delivery to a plurality of nozzles 317 configured (e.g., positioned and shaped) to deliver the fluid 301 to/onto corresponding ones of the sensors 318. While the flow splitter 303 is shown as splitting the fluid flow to three nozzles 317 in FIG. 3, in other embodiments the flow splitter 303 can split the delivery channel 328 into any number of sub-channels. In the illustrated embodiment, a controller 324 is operably/communicatively coupled to the pump 304 and the sensors 318. When the controller 324 determines that any of the sensors 318 are occluded, the controller 324 may selectively engage the pump 304 (e.g., by controlling an on/off state, pumping rate, etc., of the pump 304) to clean the surfaces of all the sensors 318. By this arrangement, the system 310 is configured for closed-loop control and operation.

Figure 4:
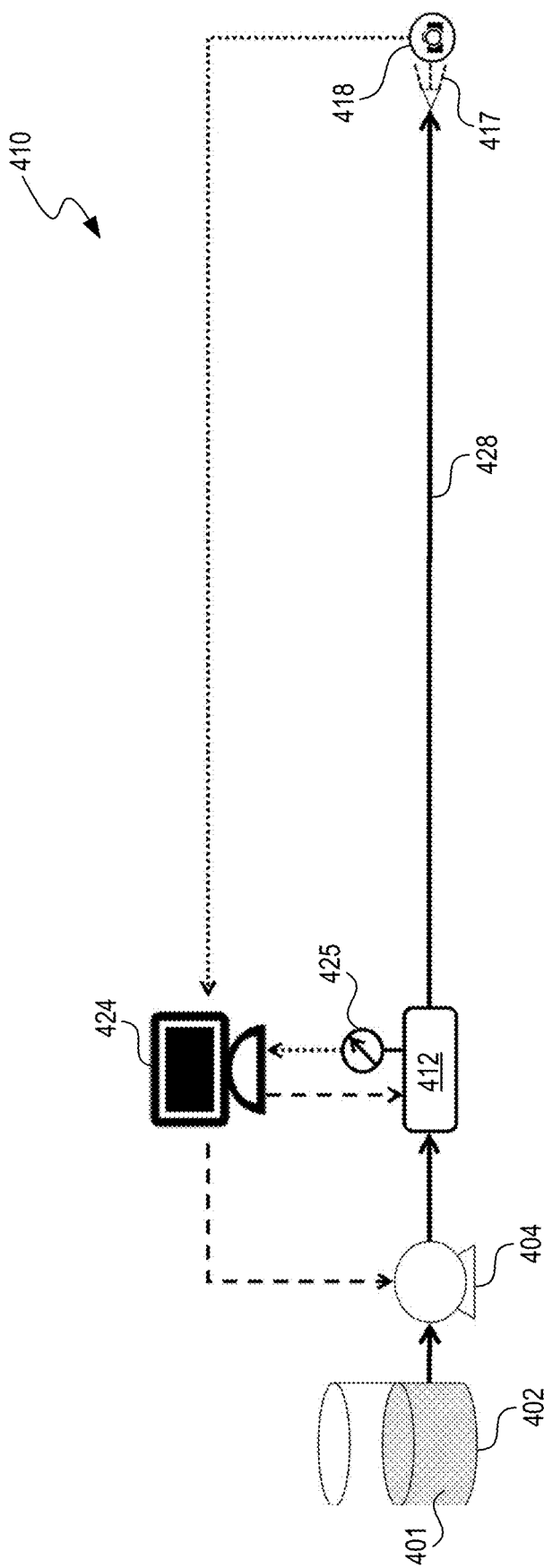
FIG. 4 is a schematic illustration of a perception surface cleaning system including an in-line heater configured in accordance with an embodiment of the present technology.

FIG. 4 is a schematic illustration of a perception surface cleaning system 410 including an in-line heater 412 configured in accordance with an embodiment of the present technology. In the illustrated embodiment, a washer fluid pump 404 is configured to pump washer fluid 401 (i) from a reservoir 402 to the heater 412 and (ii) from the heater 412 along a delivery channel 428 to a nozzle 417. The nozzle 417 is configured to spray the surface of a perception sensor 418 or another vehicle component to clean the sensor 418 or other vehicle component. In the illustrated embodiment, a controller 424 is operably coupled to the sensor 418, the heater 412, and a temperature sensor 425 configured to measure/sense/detect a temperature of the fluid 401 at and/or proximate to the heater 412. When the controller 424 determines that the surface of the sensor 418 is occluded, the controller 424 can selectively engage the pump 404 to clean the surface of the sensor 418. The controller 424 can also receive one or more temperature signals from the temperature sensor 425 and/or the heater 412 and may selectively engage the heater 412 based on the measured temperature, the sensed occlusion of the perception sensor 418, and/or on some other input or combination of inputs to heat the fluid 401 to a desired temperature. In some embodiments, the controller 424 selectively engages the heater 412 by controlling an on/off state of the heater 412, changing a power state of the heater 412, etc. By this arrangement, the system 410 is configured for closed-loop control and operation.

Figure 5:
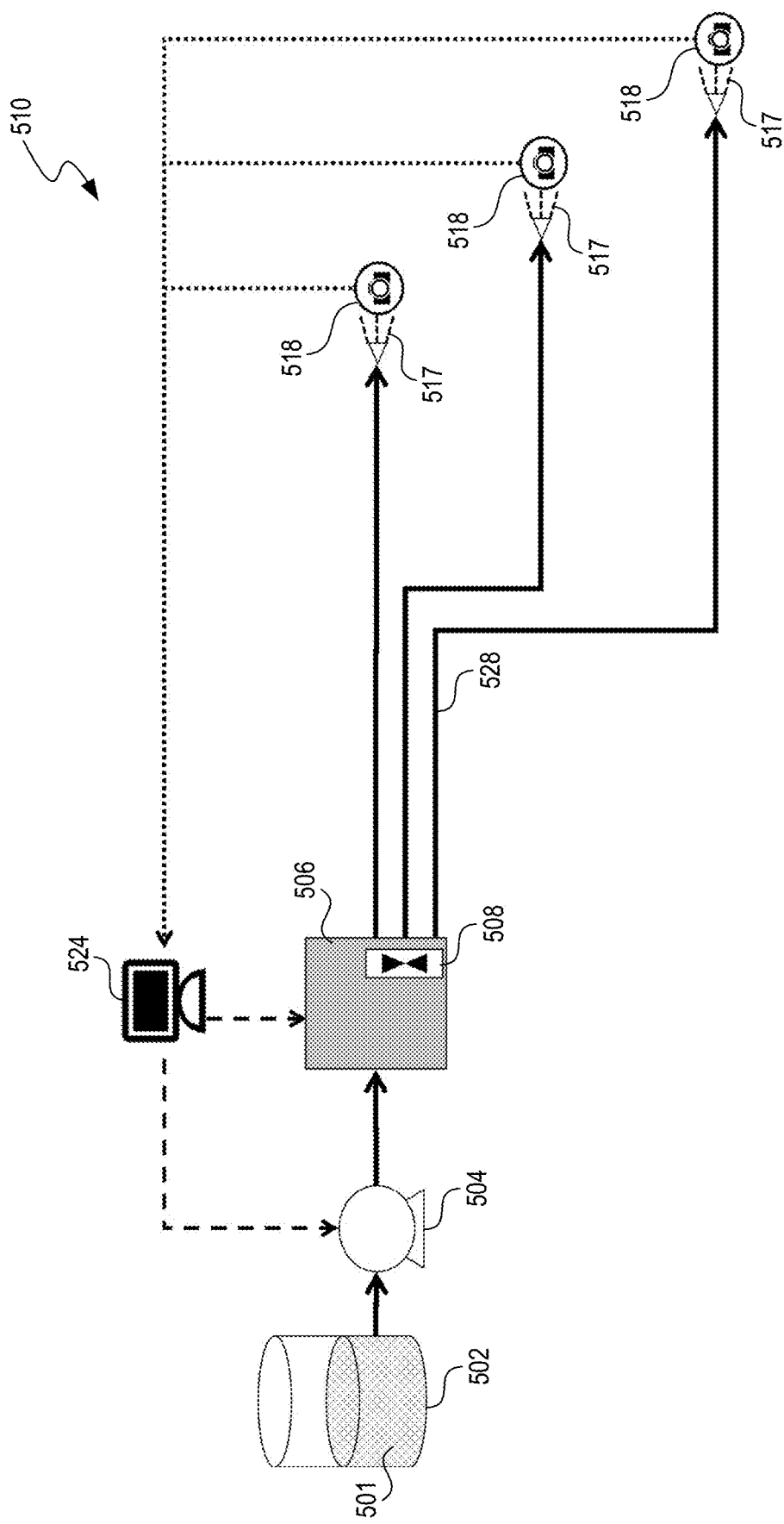
FIG. 5 is a schematic illustration of a perception surface cleaning system for selectively cleaning one or more perception components configured in accordance with an embodiment of the present technology.

FIG. 5 is a schematic illustration of a perception surface cleaning system 510 for selectively cleaning one or more sensors 518 configured in accordance with an embodiment of the present technology. In the illustrated embodiment, a washer fluid pump 504 is configured to pump washer fluid 501 from a reservoir 502 to a delivery system 506 (e.g., a manifold, a valve system, etc.) having a plurality of distribution valves 508. The valves 508 can be selectively opened/closed to permit the fluid 501 to flow along one or more delivery channels 528 to nozzles 517 configured to deliver the fluid 501 onto corresponding ones of the sensors 518 to clean the sensors 518. In the illustrated embodiment, a controller 524 is operably coupled to the delivery system 506 and to the sensors 518. When the controller 524 determines that one or more of the sensors 518 are occluded, the controller 524 can selectively engage the pump 504 and the associated distribution valves 508 to route the fluid 501 to the nozzles 517 corresponding to the occluded sensors 518 to clean the corresponding occluded sensors 518. In one aspect of the present technology, the system 510 can selectively clean only those sensors 518 that are occluded—reducing the amount of the washer fluid 501 consumed during operation. The controller 524 can be configured to apply one or more pulses of washer fluid to the occluded sensor 518 and then communicate with the sensor 518 after each pulse to determine whether the perception surface of the sensor 518 has been adequately cleaned. If not, additional pulses of washer fluid can be directed onto the sensor 518.

Figure 6:
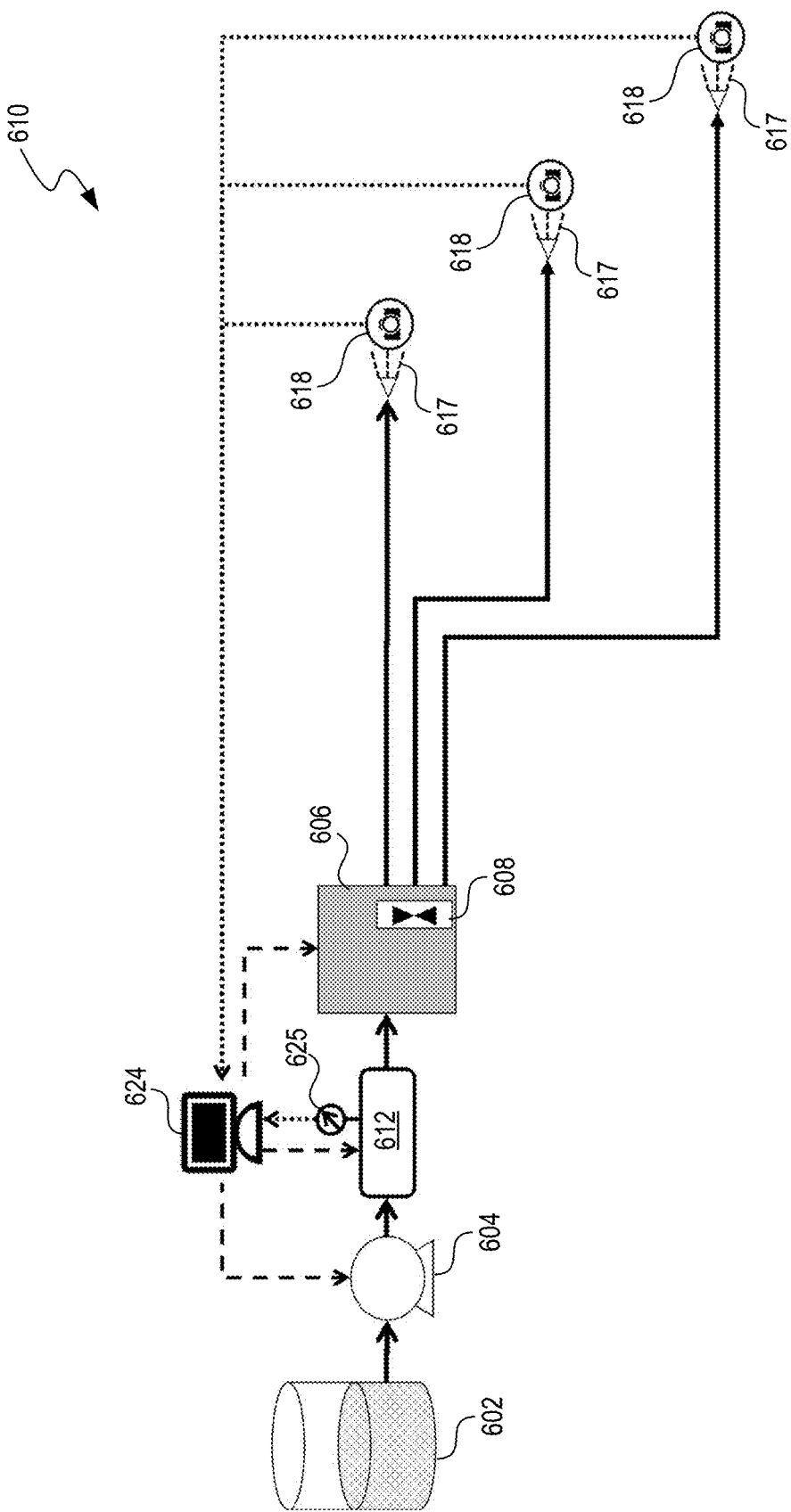
FIG. 6 is a schematic illustration of a perception surface cleaning system for selectively cleaning one or more sensors with heated fluid configured in accordance with an embodiment of the present technology.

FIG. 6 is a schematic illustration of a perception surface cleaning system 610 for selectively cleaning one or more sensors 618 with heated fluid configured in accordance with an embodiment of the present technology. In the illustrated embodiment, a washer fluid pump 604 is configured to pump washer fluid 601 (i) from a reservoir 602 to an in-line heater 612 and (ii) from the in-line heater 612 to a delivery system 606 (e.g., a manifold, a valve system, etc.) having a plurality of distribution valves 608. The valves 608 can be selectively opened to permit the fluid 601 to flow to one or more nozzles 617 configured to deliver the fluid 601 onto corresponding ones of the sensors 618 to clean the sensors 618. In the illustrated embodiment, the controller 624 selectively activates one distribution valve 608 at a time to maintain adequate fluid flow rate and pressure within the system. In other embodiments, the controller 624 may activate more than one distribution valves simultaneously. In the illustrated embodiment, a controller 624 is operably coupled to the heater 612, a temperature sensor 625 configured to detect the temperature of the fluid 601 at and/or proximate to the heater 612, the delivery system 606, and the sensors 618. When the controller 624 determines that one or more of the perception sensors 618 are occluded, the controller 624 can selectively engage the pump 604 and the associated one or more of the distribution valves 608 to route the fluid 601 to the nozzles 617 corresponding to the occluded sensors 618 to clean the corresponding occluded sensors 618. The controller 624 can also receive one or more temperature signals from the temperature sensor 625 and/or the heater 612 and can selectively engage the heater 612 based on the measured temperature, the sensed occlusion of the sensors 618, and/or on some other input or combination of inputs.

Figure 7:
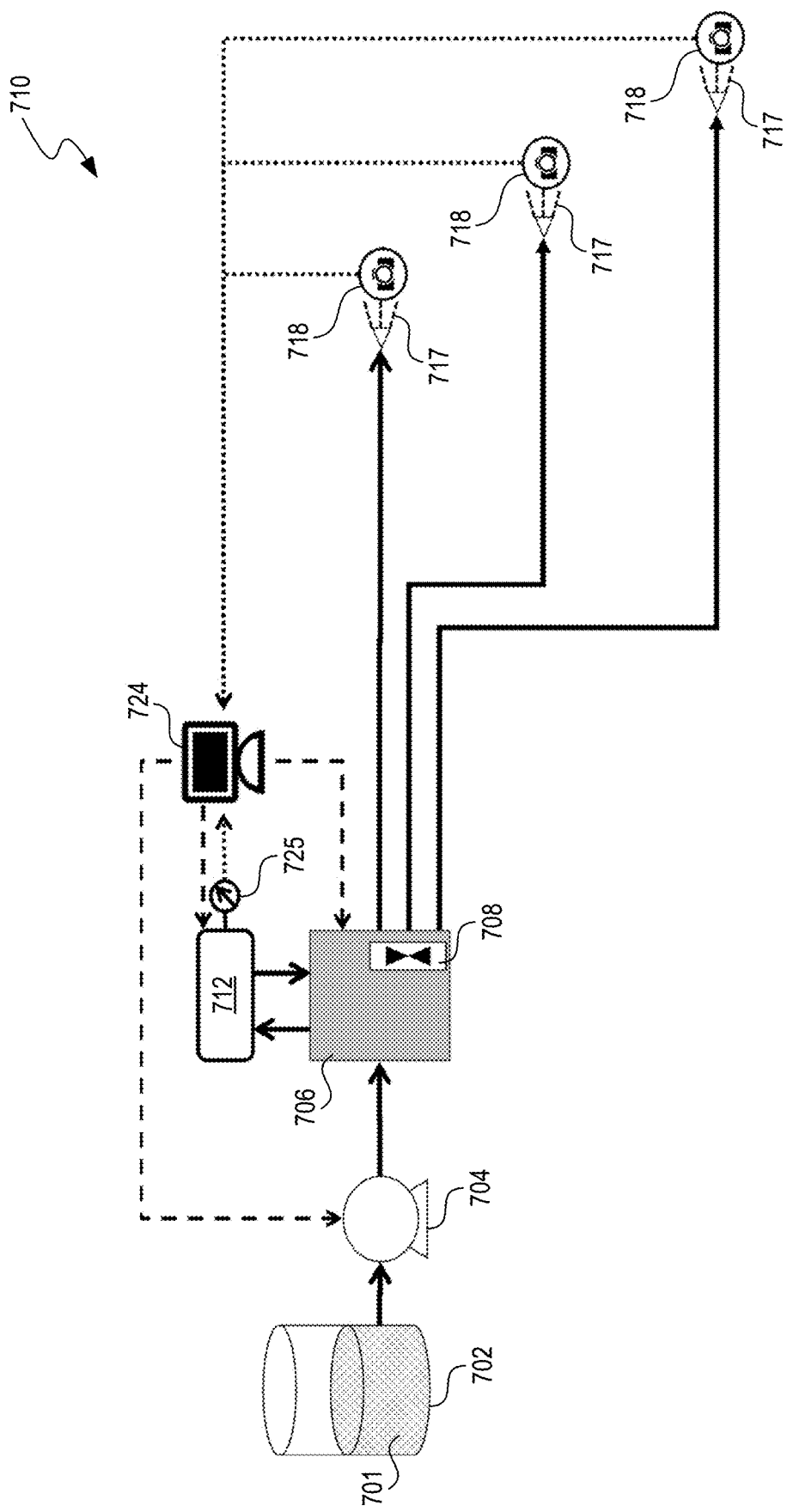
FIG. 7 is a schematic illustration of a perception surface cleaning system for selectively cleaning one or more sensors with heated fluid configured in accordance with another embodiment of the present technology.

FIG. 7 is a schematic illustration of a perception surface cleaning system 710 for selectively cleaning one or more sensors 718 with heated fluid configured in accordance with another embodiment of the present technology. In the illustrated embodiment, a washer fluid pump 704 is configured to pump washer fluid 701 from a reservoir 702 to a delivery system 706 (e.g., a manifold, valve system, etc.) having a plurality of distribution valves 708. A washer fluid heater 712 is arranged in parallel to the delivery system 706. The delivery system 706 is configured to (i) selectively route the fluid 701 to the heater 712 for heating, (ii) subsequently receive the heated fluid 701 from the heater 712, and (iii) selectively route the heated/unheated fluid 701 from the delivery system 706 to one or more nozzles 717 configured to deliver the fluid 701 onto corresponding ones of the sensors 718 to clean the sensors 718.

In the illustrated embodiment, a controller 724 is operably coupled to the heater 712, a temperature sensor 725, the delivery system 706, and the sensors 718. In some embodiments, the controller 724 can control the delivery system 706 and the pump 704 to selectively route all the fluid 701 to the heater 712 or to bypass the heater 712 and remain unheated. In other embodiments, the delivery system 706 may direct only a first portion of the fluid 701 to the heater 712 for heating. The first portion can subsequently mix with a remaining second portion of the fluid 701 that bypasses the heater 712 within a volume of the delivery system 706 to achieve a fluid temperature in between that of the fluid 701 exiting the washer fluid reservoir 702 and the fluid 701 exiting the heater 712. For example, in some embodiments the delivery system 706 may contain a variable aperture valve to direct a portion of the washer fluid to the heater 712. In other embodiments, the delivery system 706 can include a three-way valve that selectively connects (e.g., based on a control signal from the controller 724) the pump 704 to (i) the volume within the delivery system 706 and the distribution valves 708 or (ii) the heater 712. In yet other embodiments, the various valves of the delivery system 706 can be individually controlled solenoid valves or may be combined into a rotary valve system.

When the controller 724 determines that one or more of the perception sensors 718 are occluded, the controller 724 can selectively engage the pump 704 and the associated one or more of the distribution valves 708 to route the fluid 701 to the nozzles 717 corresponding to the occluded sensors 718 to clean the corresponding occluded sensors 718. The controller 724 can also receive one or more temperature signals from the temperature sensor 725 and/or the heater 712 and can selectively engage the heater 712 and/or the delivery system 706 based on the measured temperature to control the temperature of the fluid 701.

Figure 8:
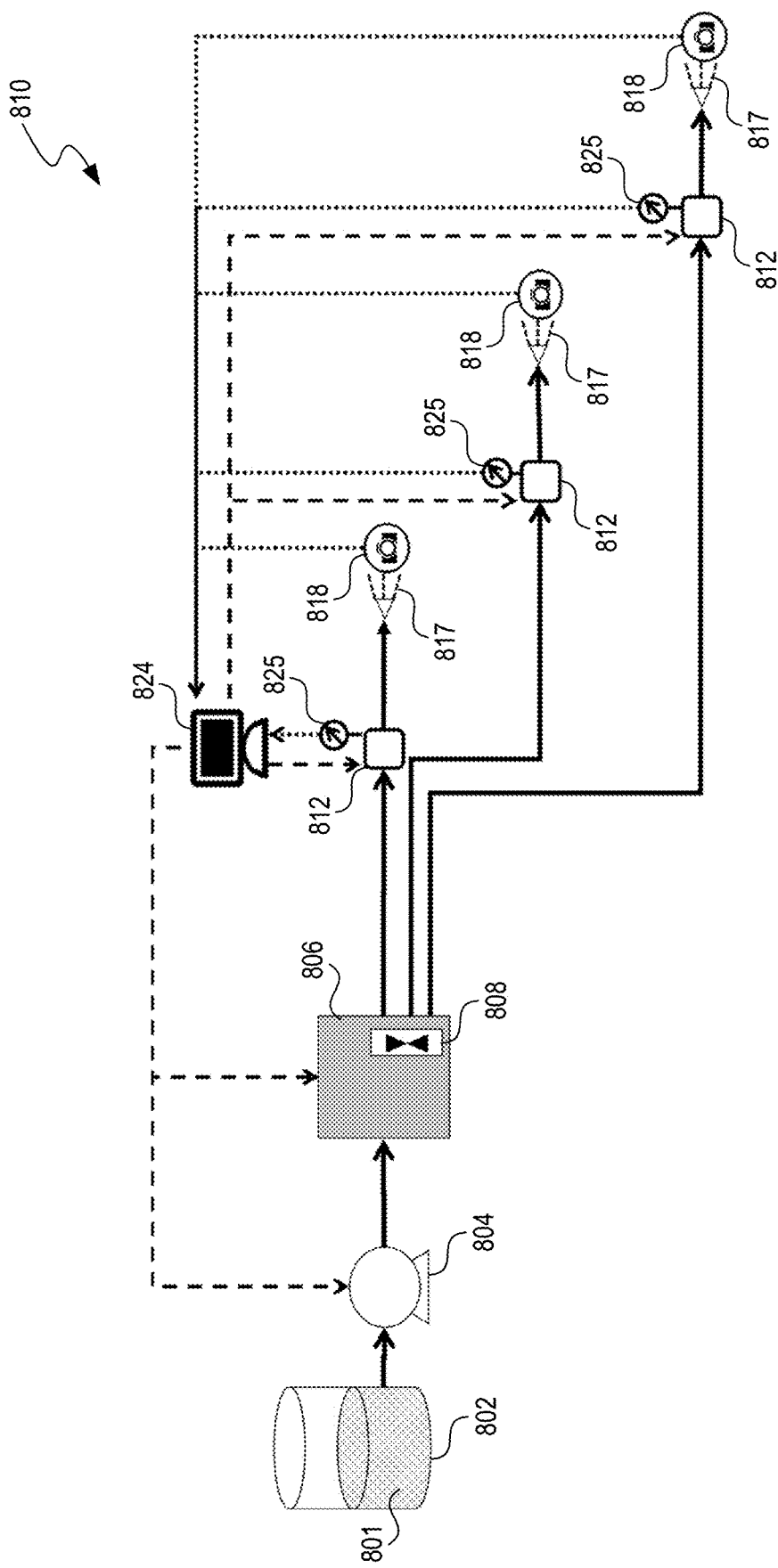
FIG. 8 is a schematic illustration of a perception surface cleaning system for selectively cleaning one or more sensors with heated fluid configured in accordance with another embodiment of the present technology.

FIG. 8 is a schematic illustration of a perception surface cleaning system 810 for selectively cleaning one or more sensors 818 with heated fluid configured in accordance with another embodiment of the present technology. In the illustrated embodiment, a washer fluid pump 804 is configured to pump washer fluid 801 from a reservoir 802 to a delivery system 806 (e.g., a manifold, valve system, etc.) having a plurality of distribution valves 808. The valves 808 can be selectively opened to permit the fluid 801 to be pumped to one or more fluid heaters 812 and from the fluid heaters 812 to corresponding nozzles 817 configured to deliver the fluid 801 onto corresponding ones of the sensors 818 to clean the sensors 818. In one aspect of the present technology, the fluid heaters 812 are located at or proximate to the corresponding nozzles 817. In some embodiments, this can reduce the amount of energy needed to heat the fluid 801 since the fluid 801 will not decrease in temperature much between the heaters 812 and the nozzles 817 as compared to, for example, systems with a centralized heater (e.g., the embodiments illustrated in FIGS. 6 and 7). In some embodiments, the fluid heaters 812 can have features generally the same as or similar to those of the fluid heating devices described in detail below with reference to FIGS. 30-36.

In the illustrated embodiment, a controller 824 is operably coupled to the heaters 812, temperature sensors 825 configured to measure the temperature of the fluid 801 at or proximate to the heaters 812 (e.g., within the heaters 812), the delivery system 806, and the sensors 818. When the controller 824 determines that one or more of the perception sensors 818 are occluded, the controller 824 can selectively engage the pump 804 and the associated one or more of the valves 808 to route the fluid 801 (i) to the heaters 812 to heat the fluid 801 and (ii) from the heaters 812 to the nozzles 817 corresponding to the occluded sensors 818 to clean the corresponding occluded sensors 818 with the heated fluid 801. The controller 824 can also receive one or more temperature signals from the temperature sensors 825 and/or the heaters 812 and can selectively engage the heaters 812 based on the measured temperatures, the sensed occlusion of the sensors 818, and/or on some other input or combination of inputs to vary the temperature of the fluid delivered from the nozzles 817.

Figure 9:
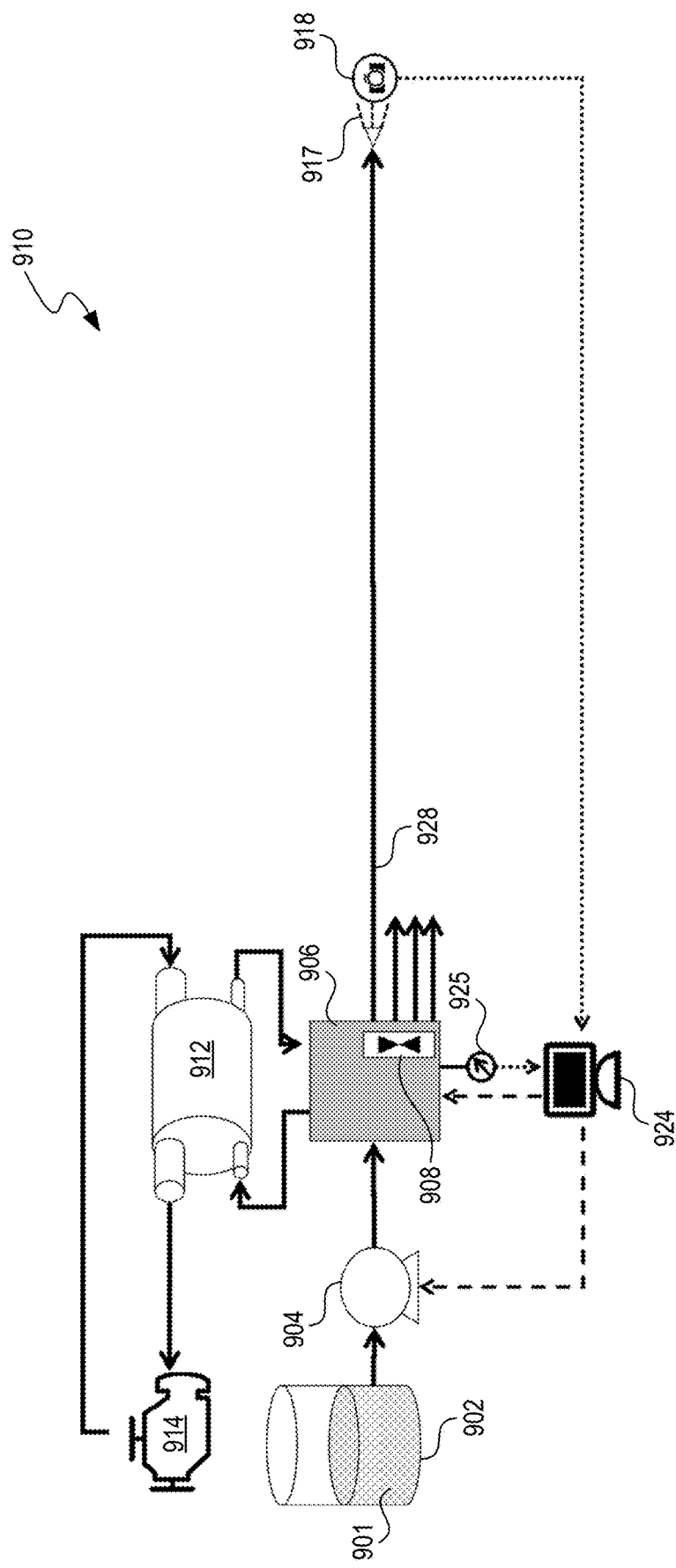
FIG. 9 is a schematic illustration of a perception surface cleaning system for selectively cleaning one or more sensors with heated fluid configured in accordance with another embodiment of the present technology.

FIG. 9 is a schematic illustration of a perception surface cleaning system 910 for selectively cleaning one or more sensors 918 with heated fluid configured in accordance with another embodiment of the present technology. In the illustrated embodiment, a washer fluid pump 904 is configured to pump washer fluid 901 from a reservoir 902 to a delivery system 906 (e.g., a manifold, a valve system, etc.) having a plurality of distribution valves 908. A washer fluid heater 912 is arranged in parallel to the delivery system 906. In the illustrated embodiment, the heater 912 is a parasitic heater (e.g., a heat exchanger) configured to heat the fluid 901 by transferring/exchanging heat generated from another system, such as a vehicle engine 914, to/with the fluid 901. More specifically, for example, heat can be provided to the heater 912 by circulation of a higher temperature fluid, such as engine coolant carrying heat away from the engine 914, or coolant carrying heat away from other vehicular systems needing to be cooled, such as batteries or other electronics in an electric vehicle. For example, the heater can utilize heat from the engine's coolant system, as described in U.S. Pat. Nos. 8,550,147 and 8,925,620, or in U.S. Patent Application Publication No. 2018/0162327, all of which are incorporated herein by reference. The valves 908 and/or other valves (e.g., a three-way valve) can be selectively opened/closed to permit the fluid 901 to flow (i) to the heater 912 for heating, (ii) subsequently back into the delivery system 906 from the heater 912, and/or (iii) from the delivery system 906 and along one or more parallel delivery channels 928 to one or more nozzles 917, which are configured to deliver the fluid 901 onto corresponding ones of the sensors 918 to clean the sensors 918.

In the illustrated embodiment, a controller 924 is operably coupled to the pump 904, a temperature sensor 925 configured to sense the temperature of the fluid 901 in and/or proximate to the delivery system 906, the delivery system 906, and the sensors 918. In some embodiments, the controller 924 can control the valves 908 and the pump 904 to selectively route all the fluid 901 to the heater 912 or to bypass the heater 912 and remain unheated. In other embodiments, the delivery system 906 may direct only a first portion of the fluid 901 to the heater 912 for heating. The first portion can subsequently mix with a remaining second portion of the fluid 901 that bypasses the heater 912 to achieve a fluid temperature in between that of the fluid 901 exiting the reservoir 902 and the fluid 901 exiting the heater 912. For example, the delivery system 906 may contain a variable aperture valve to direct a portion of the washer fluid to the heater 912. When the controller 924 determines that one or more of the perception sensors 918 are occluded, the controller 924 can selectively engage the pump 904 and the associated one or more of the distribution valves 908 to route the fluid 901 to the nozzles 917 corresponding to the occluded sensors 918 to clean the corresponding occluded sensors 918. The controller 924 can also receive one or more temperature signals from the temperature sensor 925 and can selectively engage the delivery system 906 based on the measured temperature and/or other inputs, parameters, etc., to control the temperature of the fluid 901.

III. SELECTED EMBODIMENTS OF PERCEPTION SURFACE CLEANING SYSTEMS CONFIGURED TO RECIRCULATE HEATED FLUID

Referring again to FIG. 1, in some embodiments of the present technology a cleaning system (e.g., the cleaning system 110) can be configured to heat and deliver fluid, such as washer fluid, to one or more vehicle components such as the perception components 101 (e.g., the sensors 108 and/or the perception features 103) to clean the perception surfaces 109 while also recirculating the heated fluid and maintaining the heated fluid proximate to the vehicle components. For example, heat can be applied to the fluid in a centralized location and subsequently moved to a location near to a desired application point. Periodically, as the fluid cools, the cleaning system 110 can move newly heated fluid to the location near the application point and return the cooled fluid to a centralized reservoir (e.g., proximate to the heater). In one aspect of the present technology, such an approach ensures that properly heated fluid is positioned at the application point, while also prewarming the fluid reservoir. However, such an approach requires periodic pumping to recirculate the fluid and some level of valving to control the flow, and therefore may be best suited for systems where heating is plentiful and not costly to the performance of the vehicle 100.

In some embodiments, the cleaning system 110 includes a "hybrid" heating source that transfers heat to the fluid via the combination of a heat exchanger and an electric resistance heating element. The heat exchanger provides heat from a hot coolant flow to the washer fluid. The electric heating element provides supplemental heating when it is desired. For example, when the vehicle 100 is first started, the coolant may not be at a high enough temperature to adequately heat the washer fluid via the heat exchanger, and so supplemental heating using the electric heating element may be desired. However, during operation of the vehicle 100, the heat exchanger may provide sufficient heating without the need for supplemental heating via the electric heating element.

In some embodiments, the cleaning system 110 includes a rotary valve which directs the flow of heated fluid to a selected channel. Each channel can be coupled to a distribution nozzle configured to spray and clean a vehicle component. In operation, when a channel is selected, heated fluid flows along the channel's conduit to a point very close to the distribution nozzle, wherein it enters a small holding chamber which can be better insulated than the conduit. The volume of the holding chamber can be sized to hold the approximate amount of fluid expected for one or two pulses of fluid delivery to be used in cleaning that channel's perception sensor or perception surface (e.g., the larger the surface to be cleaned, the larger the volume). For example, the cleaning system 110 (e.g., the holding chambers) may be designed to apply between 0.5-3 milliliters per square centimeter of area during a single cleaning spray. The holding chamber can also include a heating element, such as an electric heating element configured to heat the small volume of fluid within the chamber for delivery to the associated perception surface 109. In such a configuration, the power draw required to heat the small volume of fluid is minimal.

In some embodiments, individual ones of the holding chambers can have one inlet port through which heated fluid enters, and two outlet ports. The first outlet port can connect to a conduit which returns fluid back to the rotary valve, and from there to a washer fluid reservoir. In some embodiments, the conduit carrying heated fluid to the holding chamber and the conduit carrying fluid back to the rotary valve can be combined in a dual-lumen tube to simplify mounting and routing of the tubing within the vehicle 100. The second outlet port of the holding chamber can carry heated fluid from the holding chamber to a valve, and from the valve to the distribution nozzle. In some embodiments, the valve is a one-way valve which requires an elevated pressure to open. In operation, the rotary valve can selectively recirculate fluid through a selected channel by (i) opening flow from the rotary valve to the holding chamber and (ii) opening a valve in the fluid path of the conduit returning fluid back to the rotary valve, while a recirculation pump is operating. To spray fluid from a distribution nozzle, the rotary valve can (i) open the flow to the selected channel but (ii) close the valve in the fluid path of the conduit returning fluid back to the rotary valve, while the pump is operating. In this case, pressure in the conduit exceeds the pressure required to open the one-way valve positioned near the distribution nozzle, causing the valve to open, and driving the fluid through the nozzle. As the heated fluid from the holding chamber is dispensed, additional fluid is pumped from the main fluid reservoir, through the heater (e.g., the parasitic heater), through the valve manifold, to the holding chamber and toward the nozzle. Once the one-way valve near the distribution nozzle is closed, the flow of fluid will refill the holding chamber.

In some embodiments, each return channel is fit with a one-way check valve and connected into one common flow path such that flow through individual ones of the return channels can be opened or closed by a single, common return valve in the common flow path. The return valve—which closes during spraying—can be an elastomeric open bill duckbill valve which faces the bill into the flow stream and automatically self closes upon facing a high flow generated by the (e.g., more powerful) spraying pump. In some embodiments, the one-way check valves are selected in combination with the diameter of the return flow tubing to ensure that the restriction in the return flow paths is less than the pressure required to open the one-way valves positioned proximate to the distribution nozzles. In some embodiments, a centralized controller operates the washer fluid pump and the valves. In other embodiments, controllable check valves can be used that allow multiple return channels to be combined and controlled, for example by a single solenoid valve connected to the controller. The controller can receive an ambient temperature signal from a sensor positioned near one of the holding channels or from the vehicle 100, and can use a preset function or look-up table to select the frequency and length of time each channel should be recirculated to maintain temperatures in the holding chambers within desired targets.

In other embodiments, the cleaning system 110 can include a central, electric heating element or heat exchanger instead of a hybrid system. In such embodiments, the selective distribution of washer fluid to channels may be accomplished by a collection of solenoid valves, which may be collectively located on one or more flow manifolds. The holding chambers may be replaced with Y- or T-shaped branches in the flow path, such that hot fluid is simply held in the line feeding into the junction. A check valve before the nozzle may be replaced with a controlled solenoid valve. Each return tube may be equipped with its own return valve. Each channel may be equipped with a temperature sensor connected to a central controller to enable direct monitoring of temperature before the valve and decision making as to frequency of recirculation of that channel. Additionally, as semi-warmed fluid may be returned to the washer fluid reservoir, temperature sensors may measure the temperature of the coolant entering and exiting the heating source, and that information may be utilized in determining frequency of recirculation. Alternatively, a single temperature sensor could be added to the common return tube, after each return tube's check valve and after the flow paths have been combined into a single path. By measuring this temperature while recirculating fluid, the system may adaptively learn the appropriate frequency of recirculation of that channel.

FIGS. 10-14 are schematic illustrations more specifically illustrating various embodiments of closed-loop control cleaning systems (e.g., sensor cleaning systems) for cleaning one or more vehicle components (e.g., perception sensors) while recirculating heated fluid configured in accordance with embodiments of the present technology. The detailed description of each embodiment focuses mainly on those components that are new/different as compared to other embodiments. However, one skilled in the art will appreciate that the various embodiments can (i) include the same or generally similar features (e.g., components, configurations, etc.), (ii) operate the same or generally similarly, and/or (iii) that the various embodiments can be combined. Further, one skilled in the art will appreciate that the various embodiments discussed with reference to FIGS. 10-14 can (i) include the same or generally similar features (e.g., components, configurations, etc.) as those embodiments discussed with reference to FIGS. 2-9, (ii) operate the same or generally similarly as those embodiments discussed with reference to FIGS. 2-9, and/or (iii) that the various embodiments can be combined with each other and/or the embodiments discussed with reference to FIGS. 2-9. Moreover, one of ordinary skill in the art will appreciate that the number of components can vary in the following embodiments. For example, the systems of the present technology can have any number of delivery channels, return channels, sensors, heaters, chillers, heat exchangers, nozzles, etc.

Figure 10:
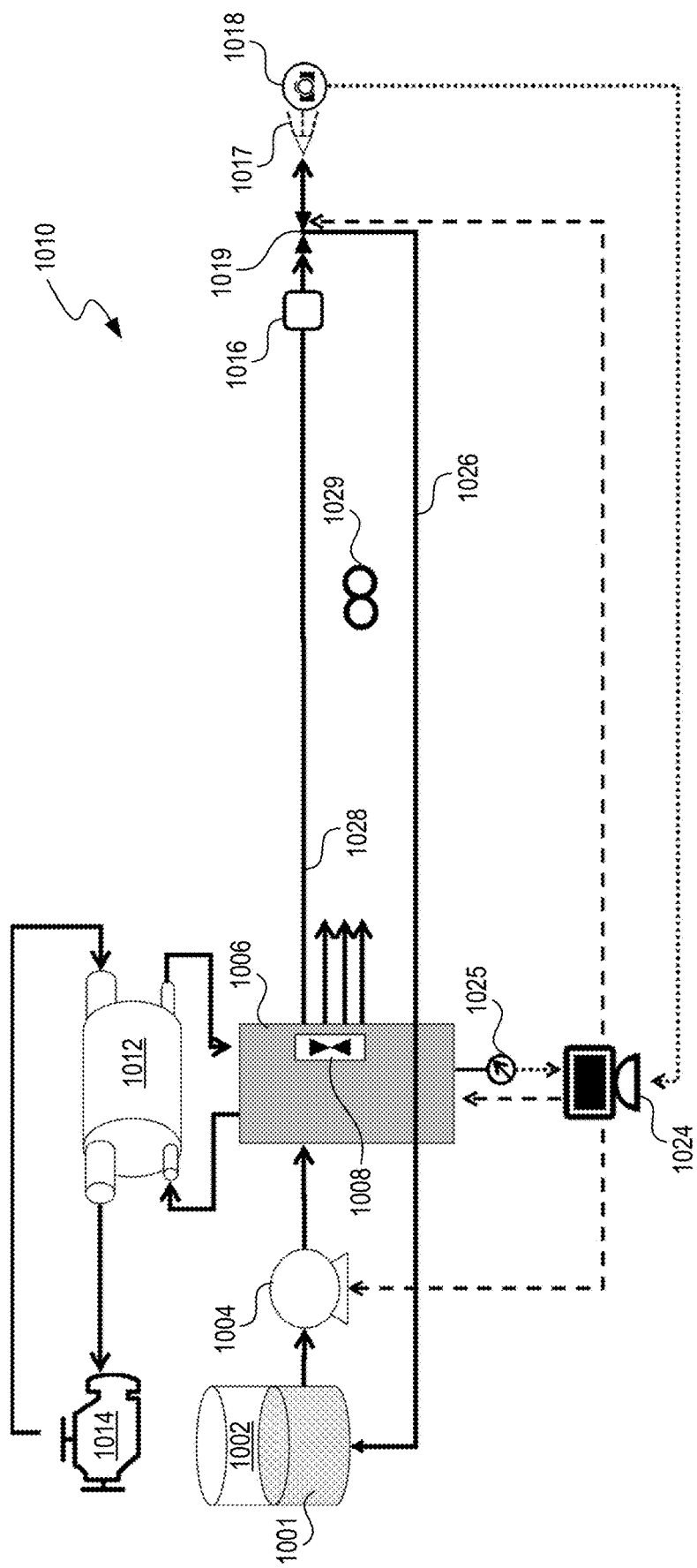
FIG. 10 is a schematic illustration of a perception surface cleaning system for cleaning one or more sensors with heated fluid, and for recirculating the heated fluid, configured in accordance with an embodiment of the present technology.

FIG. 10 is a schematic illustration of a perception surface cleaning system 1010 for cleaning one or more perception sensors 1018 with heated fluid, and for recirculating the heated fluid, configured in accordance with an embodiment of the present technology. In the illustrated embodiment, a washer fluid pump 1004 is configured to pump washer fluid 1001 from a reservoir 1002 to a delivery system 1006 (e.g., a valve system, manifold, etc.) having a plurality of distribution valves 1008. A parasitic heater 1012 is arranged in parallel to the delivery system 1006 and configured to heat the fluid 1001 by transferring heat generated by a vehicle engine 1014 (or other system) to the fluid 1001. The valves 1008 and/or one or more additional valves of the delivery system 1006 (e.g., a 3-way bypass valve) can be selectively opened/closed to permit the fluid 1001 to flow (i) to the heater 1012 for heating and subsequently back into the delivery system 1006 and/or (ii) from the delivery system 1006 and along one or more parallel delivery channels 1028 to corresponding holding chambers 1016. As described in detail above, the delivery system 1006 can selectively route all, none, or a portion of the fluid 1001 to the heater 1012 to heat the fluid 1001 to a desired temperature before directing the fluid 1001 to one or more of the holding chambers 1016.

In the illustrated embodiment, each of the holding chambers 1016 is fluidly connected to a nozzle 1017 via a three-way pre-nozzle valve 1019. The three-way pre-nozzle valve 1019 is configured to selectively fluidly connect the holding chamber 1016 to (i) the nozzle 1017 or (ii) a return channel 1026 configured to return the fluid 1001 to the reservoir 1002 and/or the delivery system 1006. The return channels 1026 can be coupled to the delivery system 1006 (e.g., to return the fluid 1001 thereto) and/or to the reservoir 1002 (e.g., to return the fluid 1001 thereto). In some embodiments, the holding chamber 1016 is configured to hold a volume of fluid of between about one and five times the volume of the fluid 1001 generally delivered via the nozzles 1017 to the sensors 1018. In one aspect of the present technology, the holding chambers 1016 allow the system 1010 to deliver the heated fluid 1001 when needed and for the volume to be quickly flushed and replaced with warmer fluid 1001 when recirculated. In some embodiments, the holding chambers 1016 can have a lower ratio of surface area to volume than the delivery channels 1028 through which the fluid 1001 generally flows, such that the fluid 1001 cools more slowly in the holding chambers 1016 than in the delivery channels 1028. In some embodiments, the holding chambers 1016 can include heating elements and/or can be thermally insulated to reduce the rate of heat loss from the fluid 1001.

In the illustrated embodiment, a controller 1024 is operably coupled to the pump 1004, a temperature sensor 1025 configured to sense the temperature of the fluid 1001 in and/or proximate to the delivery system 1006, the delivery system 1006, the three-way pre-nozzle valves 1019, and the sensors 1018. Periodically, the controller 1024 can recirculate the fluid 1001 in one or more of the delivery channels 1028 to ensure that the fluid 1001 within the holding chambers 1016 is within a desired temperature range. More specifically, to recirculate the fluid 1001 within the delivery channels, the controller 1024 can (i) open the corresponding distribution valves 1008 to pump the fluid 1001 into the selected delivery channels 1028 to move the fluid 1001 from the holding chambers 1016 into the three-way pre-nozzle valves 1019, and (ii) actuate the three-way pre-nozzle valves 1019 to route the fluid 1001 into the return channels 1026. The controller 1024 can elect to recirculate the fluid 1001 in one or more the holding chambers 1016 based on signals received from the temperature sensor 1025, an elapsed time, an ambient temperature, and/or other information. In some embodiments, the controller 1024 can also control the pump 1004 to pump the fluid 1001 at a rate selected for fluid recirculation and may choose to heat the fluid 1001 to different temperatures by selectively routing a portion of the flow to the heater 1012 (e.g., based on signals received from the temperature sensor 1025). These parameters may be varied for each of sensors 1018 and the corresponding delivery channels 1028. When the controller 1024 determines that one or more of the perception sensors 1018 are occluded, the controller 1024 can selectively engage the pump 1004 and the associated one or more of the distribution valves 1008 to route the fluid 1001 along the selected delivery channels 1028 to the nozzles 1017 corresponding to the occluded sensors 1018 to clean the corresponding occluded sensors 1018.

In the illustrated embodiment, the holding chambers 1016 are positioned proximate to the corresponding nozzles 1017 to minimize a channel distance/volume therebetween. In one aspect of the present technology, the volume of the fluid 1001 held between the holding chambers 1016 and the nozzles 1017 is not recirculated (e.g., because it is positioned beyond the three-way pre-nozzle valves 1019) and therefore must be ejected from the nozzles 1017 before heated fluid is delivered. Thus, positioning the holding chambers 1016 proximate to the corresponding nozzles 1017 can minimize the inefficient ejection of cooled fluid 1001. Additionally, by locating the holding chambers 1016 and the three-way pre-nozzle valves 1019 close to the nozzles 1017, the time required to initiate and to complete a dose of washer fluid 1001 is reduced.

In some embodiments, to simplify plumbing of the flow-containing channels of the sensor cleaning system 1010, each channel is constructed of dual lumen tubing 1029 (shown in cross-section in FIG. 10), wherein one lumen contains the fluid 1001 traveling from the delivery system 1006 to the three-way pre-nozzle valve 1019, and the other lumen carries the fluid 1001 traveling from the three-way pre-nozzle valve 1019 to the delivery system 1006 and/or the reservoir 1002. That is, the delivery channels 1028 and the return channels 1026 can be combined in the dual lumen tubing 1029. In some embodiments, dual lumen tubing can be used to transport the fluid 1001 between the delivery system 1006 and the heater 1012.

Figure 11:
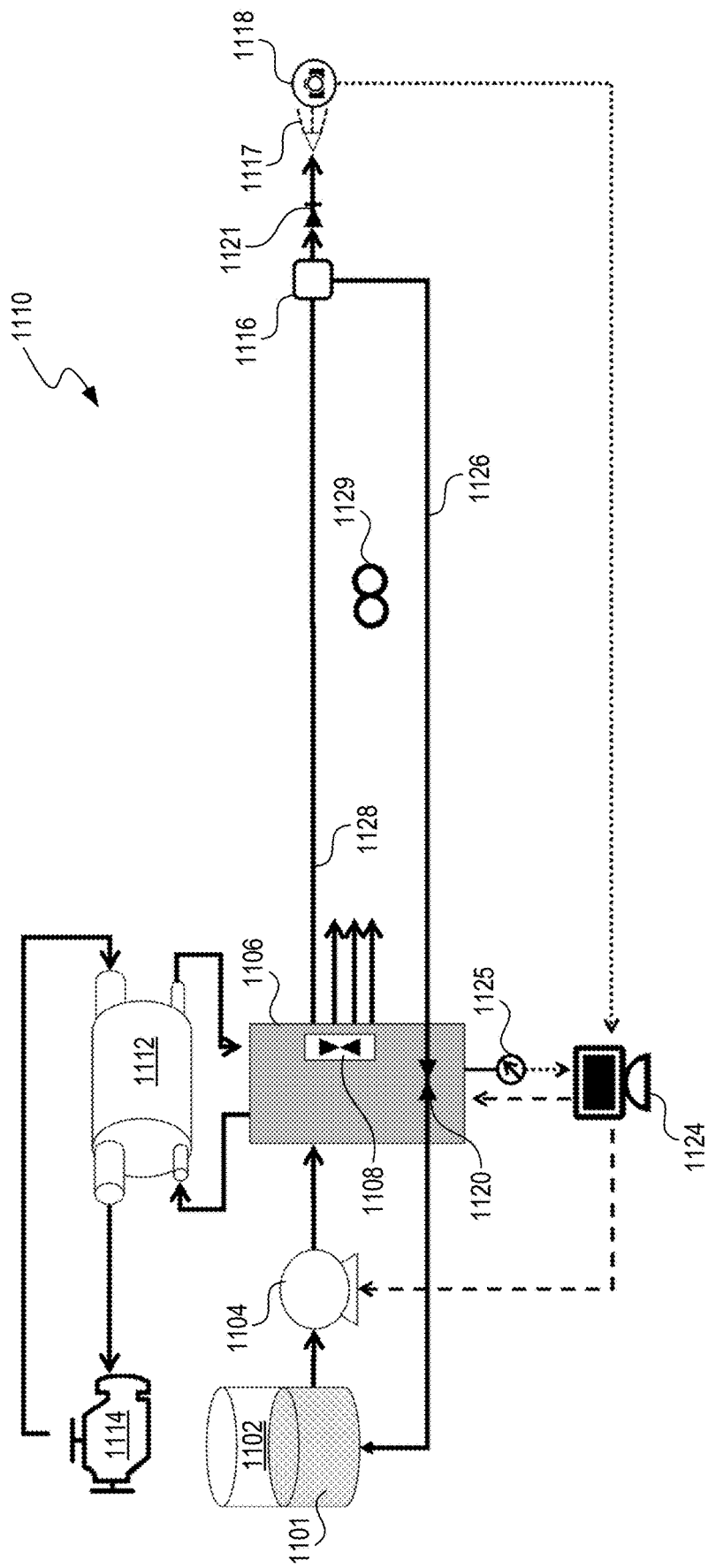
FIG. 11 is a schematic illustration of a perception surface cleaning system for cleaning one or more sensors with heated fluid, and for recirculating the heated fluid, configured in accordance with another embodiment of the present technology.

FIG. 11 is a schematic illustration of a perception surface cleaning system 1110 for cleaning one or more perception sensors 1118 with heated fluid, and for recirculating the heated fluid, configured in accordance with another embodiment of the present technology. In the illustrated embodiment, a washer fluid pump 1104 is configured to pump washer fluid 1101 from a reservoir 1102 to a delivery system 1106 (e.g., a manifold, valve system, etc.) having a plurality of delivery valves 1108 and a plurality of return valves 1120. In some embodiments, one or more of the delivery valves 1108, the return valves 1120, and/or other valves of the delivery system 1106 can be individually controlled solenoid valves or can be combined into a rotary valve system. A parasitic heater 1112 is arranged in parallel to the delivery system 1106 and configured to heat the fluid 1101 by transferring heat generated by a vehicle engine 1114 (or other system) to the fluid 1101. The delivery valves 1108 and/or one or more other valves (e.g., a 3-way bypass valve) can be selectively opened/closed to permit the fluid 1101 to flow (i) to the heater 1112 for heating and subsequently back into the delivery system 1106 and/or (ii) from the delivery system 1106 and along one or more parallel delivery channels 1128 to corresponding holding chambers 1116. As described in detail above, the delivery system 1106 can selectively route all, none, or a portion of the fluid 1101 to the heater 1112 to heat the fluid 1101 to a desired temperature before directing the fluid 1101 to one or more of the holding chambers 1116.

In the illustrated embodiment, each of the holding chambers 1116 is fluidly connected to a nozzle 1117 via a pre-nozzle check valve 1121. The nozzles 1117 are configured to distribute or spray the fluid 1101 onto corresponding ones of the sensors 1118 to clean the sensors 1118 (e.g., clear the sensors 1118 of occlusions). The pre-nozzle check valves 1121 are configured to selectively fluidly connect the holding chambers 1116 to corresponding (i) ones of the nozzles 1117 or (ii) return channels 1126 configured to return the fluid 1101 to the reservoir 1102 and/or the delivery system 1106. The return channels 1126 can be coupled to the delivery system 1106 (e.g., to return the fluid 1101 thereto) and/or to the reservoir 1102 (e.g., to return the fluid 1101 thereto). For example, in the illustrated embodiment the return valves 1120 are fluidly coupled to corresponding ones of the return channels 1126.

A controller 1124 can be operably coupled to the pump 1104, a temperature sensor 1125 configured to sense the temperature of the fluid 1101 in and/or proximate to the delivery system 1106, the delivery system 1106, and the sensors 1118. Periodically, the controller 1124 can recirculate the fluid 1101 in one or more of the delivery channels 1128 to ensure that the fluid 1101 within the holding chambers 1116 is within a desired temperature range. More specifically, to recirculate the fluid 1101 within a selected one of the holding chambers 1116, the controller 1124 can open both the delivery valve 1108 and the return valve 1120 of the delivery system 1106 that correspond to the selected one of the holding chambers 1116. This permits the fluid 1101 to return along the corresponding return channel 1126, as the pressure at the pre-nozzle check valve 1121 remains below the cracking pressure of the pre-nozzle check valve 1121. When the return valve 1120 is open, the pre-nozzle check valve 1121 is closed such that the fluid 1101 does not exit the nozzle 1117. When the controller 1124 determines that one or more of the perception sensors 1118 are occluded, the controller 1124 can selectively engage the pump 1104 and the associated one or more of the delivery valves 1108 to route the fluid 1101 along the selected delivery channels 1128 to the nozzles 1117 corresponding to the occluded sensors 1118 to clean the corresponding occluded sensors 1118. Specifically, with the return valves 1120 closed, the pressure at the pre-nozzle check valves 1121 exceeds the cracking pressures of the pre-nozzle check valves 1121—allowing the fluid 1101 to pass therethrough to the nozzles 1117. As described in detail above, the delivery channels 1128, the return channels 1126, and/or other components of the system 1110 can comprise a dual lumen tubing 1129 (shown in cross-section in FIG. 11).

Figure 12:
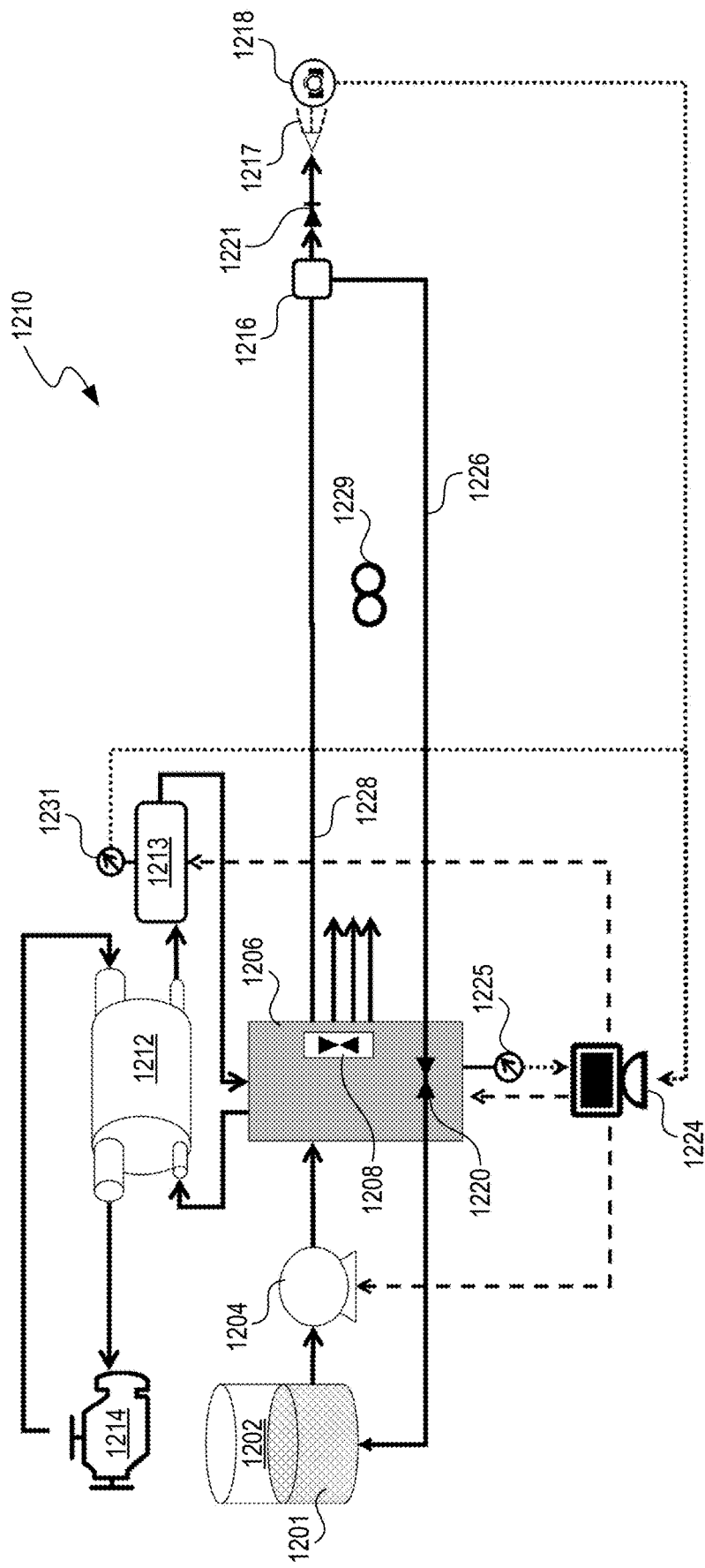
FIG. 12 is a schematic illustration of a perception surface cleaning system for cleaning one or more sensors with heated fluid, and for recirculating the heated fluid, configured in accordance with another embodiment of the present technology.

FIG. 12 is a schematic illustration of a perception surface cleaning system 1210 for cleaning one or more sensors 1218 with heated fluid, and for recirculating the heated fluid, configured in accordance with another embodiment of the present technology. In the illustrated embodiment, a washer fluid pump 1204 is configured to pump washer fluid 1201 from a reservoir 1202 to a delivery system 1206 having a plurality of delivery valves 1208 and a plurality of return valves 1220. A parasitic heater 1212 and an electric heater 1213 are arranged (i) in series with each other and (ii) in parallel (e.g., to form a hybrid parasitic-electric heater) with the delivery system 1206. The parasitic heater 1212 is configured to heat the fluid 1201 by transferring heat generated by a vehicle engine 1214 (or other system) to the fluid 1201, while the electric heater 1213 is configured to receive the fluid 1201 (heated or unheated) from the parasitic heater 1212 and heat the fluid 1201 via, for example, a resistive heating element. The delivery valves 1208 and/or one or more other valves (e.g., a 3-way bypass valve) can be selectively opened/closed to permit the fluid 1201 to flow to (i) the parasitic heater 1212 and electric heater 1213 for heating and subsequently back into the delivery system 1206 and/or (ii) from the delivery system 1206 and along one or more parallel delivery channels 1228 to corresponding holding chambers 1216.

In the illustrated embodiment, each of the holding chambers 1216 is fluidly connected to a nozzle 1217 via a pre-nozzle check valve 1221. The nozzles 1217 are configured to distribute or spray the fluid 1201 onto corresponding ones of the sensors 1218 to clean the sensors 1218 (e.g., to clear the sensors 1218 of occlusions). The pre-nozzle check valves 1221 are configured to selectively fluidly connect the holding chambers 1216 to corresponding (i) ones of the nozzles 1217 or (ii) return channels 1226 configured to return the fluid 1201 to the delivery system 1206 via the return valves 1220.

A controller 1224 can be operably coupled to the pump 1204, a first temperature sensor 1225 configured to sense the temperature of the fluid 1201 in and/or proximate to the delivery system 1206, the delivery system 1206, and the sensors 1218. Periodically, the controller 1224 can recirculate the fluid 1201 in one or more of the delivery channels 1228 to ensure, that the fluid 1201 within the holding chambers 1216 is within a desired temperature range. More specifically, as described in detail above, the controller 1224 can control the delivery valves 1208 and the return valves 1220 of the delivery system 1206 to control recirculation and disbursement of the fluid 1201. For example, when the pump 1204 moves the fluid 1201 through the delivery valves 1208 and along the delivery channels 1228, the pre-nozzle check valves 1221 are (i) open to permit the fluid 1201 to be forced through the nozzles 1217 when the return valves 1220 are closed and (ii) closed to cause the fluid 1201 to be forced through the return channels 1226 when the return valves 1220 are open. The delivery channels 1228, the return channels 1226, and/or other components of the system 1210 can comprise a dual lumen tubing 1229 (shown in cross-section in FIG. 12).

In some embodiments, the controller 1224 is also operably coupled to a second temperature sensor 1231 configured to sense/detect a temperature of the fluid 1201 at and/or proximate to the electric heater 1213. When fluid circulating between the engine 1214 and the parasitic heater 1212 is not hot (e.g., when the engine 1214 is not hot after a vehicle incorporating the engine 1214 first starts up), the parasitic heater 1212 may not sufficiently heat the washer fluid 1201. In this case, the controller 1224 can receive a temperature signal from the second temperature sensor 1231 indicating that the fluid 1201 is below a threshold temperature, and can selectively activate the electric heater 1213 to provide supplemental heating to the washer fluid 1201 before it returns to the delivery system 1206. In some embodiments, the controller 1224 is configured to selectively disengage the electric heater 1213 when the hot fluid 1201 recirculating between the engine 1214 and the parasitic heater 1212 is sufficiently warm (e.g., after a predetermined time period, when the vehicle is put into drive, and/or under some other condition).

Figure 13:
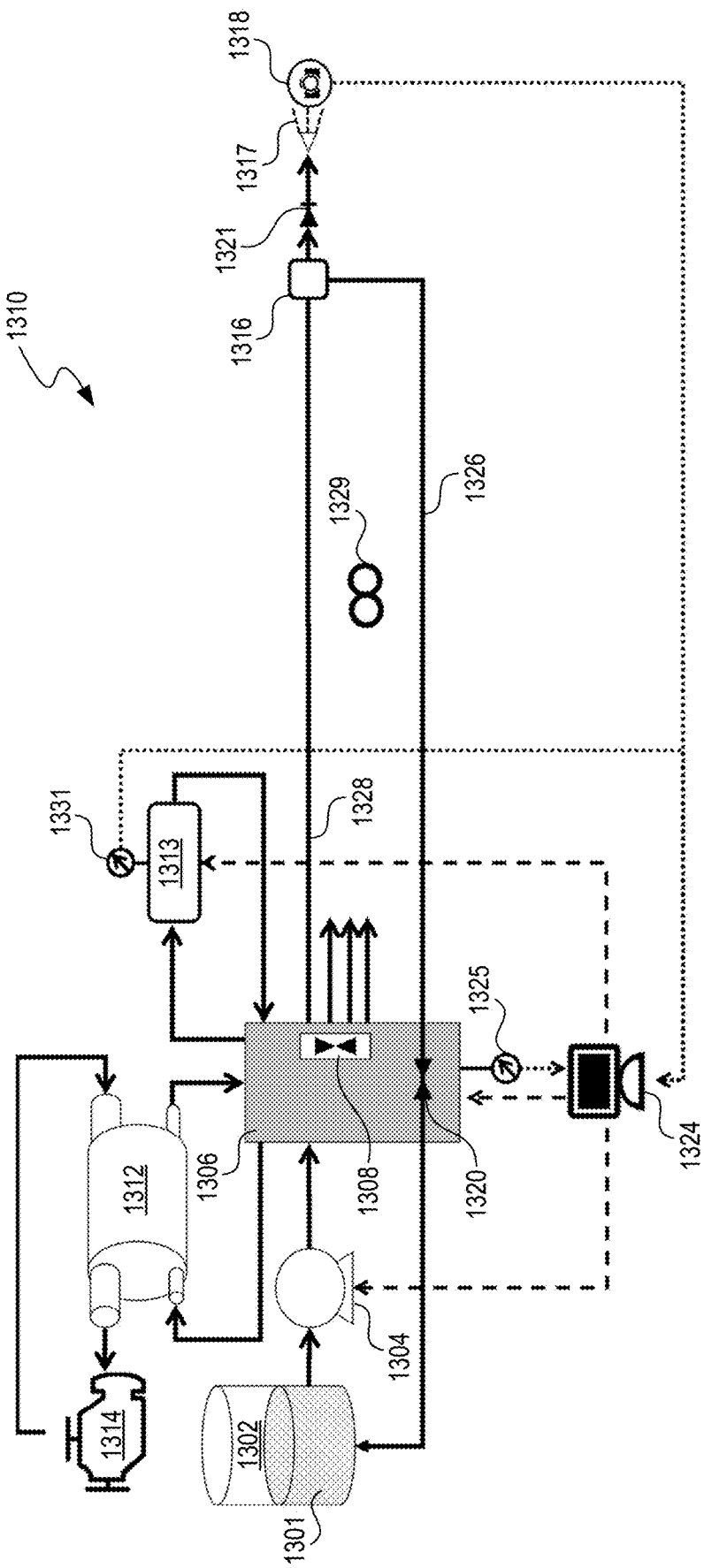
FIG. 13 is a schematic illustration of a perception surface cleaning system for cleaning one or more sensors with heated fluid, and for recirculating the heated fluid, configured in accordance with another embodiment of the present technology.

FIG. 13 is a schematic illustration of a perception surface cleaning system 1310 for cleaning one or more perception sensors 1318 with heated fluid, and for recirculating the heated fluid, configured in accordance with another embodiment of the present technology. In the illustrated embodiment, a washer fluid pump 1304 is configured to pump washer fluid 1301 from a reservoir 1302 to a delivery system 1306 having a plurality of delivery valves 1308 and a plurality of return valves 1320. A parasitic heater 1312 and an electric heater 1313 are individually connected to the delivery system 1306. The parasitic heater 1312 is configured to heat the fluid 1301 by transferring heat generated by a vehicle engine 1314 (or other system) to the fluid 1301, while the electric heater 1313 is configured to heat the fluid 1301 via, for example, a resistive heating element. More specifically, one or more of the delivery valves 1308 and/or one or more other valves (e.g., a 3-way bypass valve) can be opened to route all, none, or a portion of the fluid 1301 to the parasitic heater 1312 and/or to the electric heater 1313. For example, in some embodiments all the fluid 1301 can be routed to the parasitic heater 1312 for heating, and can be routed to the electric heater 1313 only if the parasitic heater 1312 is unable to heat the fluid 1301 to a predetermined temperature. In other embodiments, a first portion of the fluid 1301 can be routed to the parasitic heater 1312 and a second portion of the fluid 1301 can be routed to the electric heater 1313. The first and second portions can have the same or different volumes. That is, the delivery system 1306 can selectively route the fluid 1301 to the electric heater 1313, the parasitic heater 1312, to neither, or to both.

Regardless of the one of or combination of the parasitic heater 1312 and the electric heater 1313 used to heat the fluid 1301, the delivery valves 1308 can be selectively opened/closed to permit the heated fluid 1301 to flow to from the delivery system 1306 and along one or more parallel delivery channels 1328 to corresponding holding chambers 1316. In the illustrated embodiment, each of the holding chambers 1316 is fluidly connected to a nozzle 1317 via a pre-nozzle check valve 1321. The nozzles 1317 are configured to distribute or spray the fluid 1301 onto corresponding ones of the sensors 1318 to clean the sensors 1318 (e.g., to clear the sensors 1318 of occlusions). The pre-nozzle check valves 1321 are configured to selectively fluidly connect the holding chambers 1316 to corresponding (i) ones of the nozzles 1317 or (ii) return channels 1326 configured to return the fluid 1301 to the delivery system 1306 via the return valves 1320.

A controller 1324 can be operably coupled to the pump 1304, a first temperature sensor 1325 configured to sense the temperature of the fluid 1301 in and/or proximate to the delivery system 1306, the delivery system 1306, and the sensors 1318. Periodically, the controller 1324 can recirculate the fluid 1301 in one or more of the delivery channels 1328 to ensure, that the fluid 1301 within the holding chambers 1316 is within a desired temperature range. More specifically, as described in detail above, the controller 1324 can control the delivery valves 1308 and the return valves 1320 of the delivery system 1306 to control recirculation and disbursement of the fluid 1301. For example, when the pump 1304 moves the fluid 1301 through the delivery valves 1308 and along the delivery channels 1328, the pre-nozzle check valves 1321 are (i) open to permit the fluid 1301 to be forced through the nozzles 1317 when the return valves 1320 are closed and (ii) closed to cause the fluid 1301 to be forced through the return channels 1326 when the return valves 1320 are open. The delivery channels 1328, return channels 1326, and/or other components of the system 1310 can comprise a dual lumen tubing 1329 (shown in cross-section in FIG. 13).

In some embodiments, the controller 1324 is also operably coupled to a second temperature sensor 1331 configured to sense/detect a temperature of the fluid 1301 at and/or proximate to the electric heater 1313. When fluid circulating between the engine 1314 and the parasitic heater 1312 is not hot (e.g., when the engine 1314 is not hot after a vehicle incorporating the engine 1314 first starts up), the parasitic heater 1312 may not sufficiently heat the washer fluid 1301. In this case, the controller 1324 can receive a temperature signal from the second temperature sensor 1331 indicating that the fluid 1301 is below a threshold temperature, and can operate the delivery system 1306 to selectively direct all or a portion of the fluid 1301 to the electric heater 1313 to sufficiently heat the fluid 1301. In some embodiments, the controller 1324 is configured to selectively disengage the electric heater 1313 when the hot fluid recirculating between the engine 1314 and the parasitic heater 1312 is sufficiently warm (e.g., after a predetermined time period, when the vehicle is put into drive, and/or under some other condition).

Figure 14:
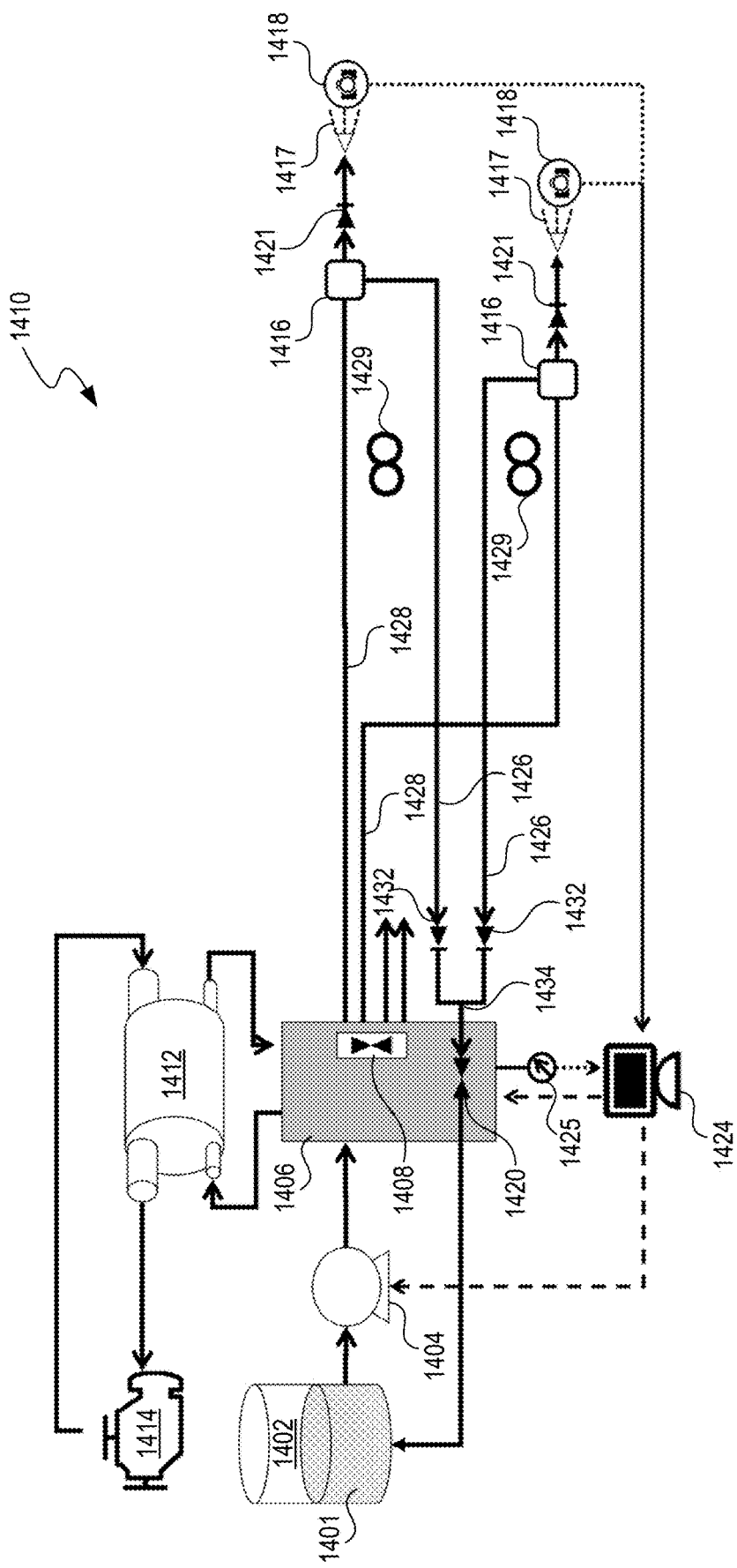
FIG. 14 is a schematic illustration of a perception surface cleaning system for cleaning one or more sensors with heated fluid, and for recirculating the heated fluid, configured in accordance with another embodiment of the present technology.

FIG. 14 is a schematic illustration of a perception surface cleaning system 1410 for cleaning one or more perception sensors 1418 with heated fluid, and for recirculating the heated fluid, configured in accordance with another embodiment of the present technology. In the illustrated embodiment, a washer fluid pump 1404 is configured to pump washer fluid 1401 from a reservoir 1402 to a delivery system 1406 having a plurality of delivery valves 1408 and a single return valve 1420. A parasitic heater 1412 is arranged in parallel with the delivery system 1406 and configured to heat the fluid 1401 by transferring heat generated by a vehicle engine 1414 (or other system) to the fluid 1401. The delivery valves 1408 and/or one or more other valves (e.g., a 3-way bypass valve) can be selectively opened/closed to permit the fluid 1401 to flow to (i) the heater 1412 for heating and subsequently back into the delivery system 1406 and/or (ii) from the delivery system 1406 and along one or more parallel delivery channels 1428 to corresponding holding chambers 1416. As described in detail above, the delivery system 1406 can selectively route all, none, or a portion of the fluid 1401 to the heater 1412 to heat the fluid 1401 to a desired temperature before directing the fluid 1401 to one or more of the holding chambers 1416.

In the illustrated embodiment, each of the holding chambers 1416 is fluidly connected to a nozzle 1417 via a pre-nozzle check valve 1421. The nozzles 1417 are configured to distribute or spray the fluid 1401 onto corresponding ones of the perception sensors 1418 to clean the sensors 1418 (e.g., to clear the sensors 1418 of occlusions). The pre-nozzle check valves 1421 are configured to selectively fluidly connect the holding chambers 1416 to corresponding (i) ones of the nozzles 1417 or (ii) return channels 1426 configured to return the fluid 1401 to the reservoir 1402 and/or the delivery system 1406. In the illustrated embodiment, each of the return channels 1426 includes a return check valve 1432, and the return channels 1426 are merged together via a return T-connector 1434 into a single channel received by the single return valve 1420 of the delivery system 1406. In some embodiments, the delivery channels 1428, the return channels 1426, and/or other components of the system 1410 can comprise a dual lumen tubing 1429 (shown in cross-section in FIG. 14).

A controller 1424 can be operably coupled to the pump 1404, a temperature sensor 1425 configured to sense the temperature of the fluid 1401 in and/or proximate to the delivery system 1406, the delivery system 1406, and the sensors 1418. Periodically, the controller 1424 can recirculate the fluid 1401 in one or more of the delivery channels 1428 to ensure, that the fluid 1401 within the holding chambers 1416 is within a desired temperature range. More specifically, to recirculate the fluid 1401 within one or more of the holding chambers 1416 and the delivery channels 1428, the controller 1424 can open (i) selected ones of the delivery valves 1408 and (ii) the return valve 1420. In this case, when the pump 1404 moves the fluid 1401 through the delivery valves 1408 and along the delivery channels 1428, the fluid 1401 in the holding chambers 1416 is forced along the return channels 1426, through the return check valves 1432, through the return T-connector 1434, and through the return valve 1420 of the delivery system 1406. Because the return valve 1420 is open during recirculation, the pressure in the holding chambers 1416 does not exceed the threshold pressure required to open the pre-nozzle check valves 1421. In one aspect of the present technology, the dimensions (e.g., length, diameter, etc.) of the return check valves 1432, the return T-connector 1434, the return valve 1420, and the return channels 1426 (e.g., tubing) is selected to limit the pressure drop in this flow path. This can ensure that the pressure at the pre-nozzle check valves 1421 does not exceed the cracking pressure of these valves during recirculation—which would permit the fluid 1401 to pass therethrough. The return check valves 1432 are configured to inhibit or prevent back flow of the fluid 1401 from, for example, the delivery system 1406 into the return channels 1426 during recirculation.

When the controller 1424 determines that one or more of the perception sensors 1418 are occluded, the controller 1424 can close the return valve 1420 and selectively engage the pump 1404 and the associated one or more of the delivery valves 1408 to route the fluid 1401 along the selected delivery channels 1428 to the nozzles 1417 corresponding to the occluded sensors 1418 to clean the corresponding occluded sensors 1418. Specifically, when the pump 1404 is activated with the return valve 1420 closed, the pressure in the delivery channels 1428 can increase until pressure at the pre-nozzle check valves 1421 exceeds the cracking pressures of the pre-nozzle check valves 1421—allowing the fluid 1401 to pass therethrough to the nozzles 1417.

IV. SELECTED EMBODIMENTS OF SYSTEMS FOR CLEANING AND THERMALLY MANAGING VEHICLE COMPONENTS

As set forth above, many vehicle components require or can benefit from surface cleaning with a fluid (e.g., heated washer fluid). Often, the same vehicle components and/or other proximate components can also benefit from temperature control. For example, in some instances one component requires surface cleaning while a different nearby component requires cooling. When these components are near to each other, it can be advantageous to provide a combined system for cleaning and thermal management. Accordingly, referring again to FIG. 1, in some embodiments of the present technology a cleaning system (e.g., the cleaning system 110) can be configured to deliver fluid, such as washer fluid, to one or more vehicle components (e.g., the sensors 108 and/or the perception surfaces 109) to both thermally manage (e.g., heat and/or cool) the vehicle components and to clean the vehicle components. In one aspect of the present technology, the present technology can advantageously use the same or generally similar components to route and distribute fluid for cleaning and temperature control. For example, the cleaning system 110 can be configured to route warmed fluid or cooled fluid to components of the vehicle 100, utilizing the same or similar washer fluid reservoir, washer fluid, fluid pump, delivery system, distribution tubing, controller, temperature sensors, etc., as described in detail above with reference to FIGS. 2-14.

Washer fluid commonly used in vehicles is frequently a mix of water and up to 50% alcohol by volume (e.g., methanol ($CH_3OH$) or ethanol ($C_2H_6O$), depending on local regulations). Such washer fluid is commonly used across a range of temperatures from −30-65° C., and has well understood thermal properties including a heat capacity between 3.0-4.1 joules per milliliter per degree Celsius, depending on the temperature and composition of the washer fluid. Because of its broad operating temperature range and reasonably high heat capacity, such washer fluid may serve as a heat transfer medium in addition to a surface cleaning solution.

In some embodiments, the cleaning system 110 (e.g., a sensor cleaning and temperature control system) is configured to pump washer fluid from a fluid reservoir and deliver the fluid to a distribution system comprising valves, pathways directing fluid flow, sensors, and connectors. Fluid within the distribution system may be selectively routed by the actuation of valves to be heated, to be cooled, or to do neither (e.g., leaving the fluid at ambient temperature or a temperature of the fluid in the reservoir). The distribution system can selectively route this fluid to one or more selected channels (e.g., tubes, conduits, etc.) that direct the fluid to a selected destination (e.g., to one of the components of the vehicle 100) for cleaning and/or temperature control. In some embodiments, the channels are selected by opening or closing one or more valves. The valves may be located distant from each other or near each other. For example, the valves can be electrically-actuated solenoid valves mounted to or built into a shared manifold. In other embodiments, the control of flow in each channel may be directed through adjusting the position of one or more multi-position valves such as rotary valves or may be directed through the combination of different types of valves such as rotary valves and solenoid valves.

In some embodiments, heated washer fluid may be highly desirable for cleaning perception components or other vehicle components during particular times of the year, such as when ambient temperatures are low, and snow and ice can occlude perception surfaces. In contrast, cooled washer fluid may be highly desirable for cooling the same vehicle components during times of the year when ambient temperatures are higher. Further, some vehicle components may require cooling at the same times of the year that their surfaces require cleaning, necessitating the delivery of both hot and cold fluid.

In some embodiments, the cleaning system 110 is configured to deliver fluid for temperature control and for cleaning at different locations on or features of a vehicle component. For example, cleaning fluid may be sprayed on the lens of a camera, while temperature control fluid may pass through a heat exchanger mounted to the rear or the side of the camera. Similarly, cleaning fluid may be sprayed on the surface of a headlamp, while temperature control fluid may pass through a heat exchanger mounted to the rear or one of the sides of the headlamp.

In some embodiments, the cleaning system 110 includes a recirculating function including, for example, any of the components, features, and/or configurations described in detail above with reference to FIGS. 10-14. For example, in some embodiments the cleaning system 110 can (i) route fluid to a fluid heater and then through a channel to a position proximate a desired delivery point, and (ii) selectively route the fluid from the position proximate the delivery point, where it may have cooled over time, to return to the washer fluid reservoir. By this arrangement/method, warm fluid is maintained proximate to a desired point of delivery. Similarly, when component cooling is desired, the fluid may be routed to a chiller and then through a channel to a heat exchanger on the component to be cooled, and then returned to the fluid reservoir. The channel which carries the warmed fluid may be the same as the channel which carries the cooled fluid, or warmed and cooled fluids may be carried in separate channels.

In one aspect of the present technology, the cleaning system 110 can thermally manage vehicle components intended to be fully hermetically sealed, but that may not be completely sealed (e.g., 100%) during operation. More particularly, complete hermetic sealing is desirable to protect internal electrical/electronic componentry of perception sensors such as cameras (which are expected to be the most common type of perception sensor in vehicles) and headlamp assemblies. However, if the sealing is not perfect, contaminants (e.g., dust) and moisture can degrade the performance of these components. For example, condensation on the internal and/or external surfaces of a camera can cause temporary and permanent malfunction of the camera. Likewise, cold camera lenses or headlamp lenses can condense moisture in the form of water droplets, which eventually dry out and leave a film on the internal side of the lens. With headlamps, such contaminants can cause oncoming glare to approaching vehicles, while also deteriorating visibility for the driver of the offending vehicle. With cameras, any condensed moisture or traces of dust or film on the inside of the camera lens can make it difficult to generate a clear image.

More specifically, electronic cameras (e.g., as used in vehicle camera perception systems) can be particularly susceptible to permanent internal electrical malfunction when moisture condenses on electric/electronic circuitry and causes electrolysis corrosion that can interfere with and damage this circuitry. Moreover, such corrosion can also generate oxidation gasses that condense on the inside surface of the camera lens—further degrading the camera. Such electrolysis/corrosion can happen at an increased rate in higher population and industrial areas which commonly precipitate atmospheric dust that, when combined with condensed water, can form an electrolyte and result in accelerated electrolysis corrosion.

Similarly, whenever a cold vehicle enters a warm ambient environment (which will often contain higher levels of air moisture than cold outside air)—as might happen when a car operating on a cold winter day enters a warm garage, parking structure, or service area—the higher moisture ambient air will tend to condense as water droplets on the cold surfaces of the vehicle, including those of the perception cameras. In a reverse manner, when a car that has been parked inside a warm garage drives outside into cold air, the warm higher moisture air contained within the car—and thus within vehicle perception cameras or sensors—will tend to condense into water and interrupt camera/sensor function. Even though electronic cameras generate some heat, the rate of heat generation may not be great enough to prevent condensation or to quickly dry out moisture. Accordingly, in one aspect of the present technology, the cleaning system 110 can provide thermal heating to such cameras and/or other vehicle components to rapidly warm the cameras to reduce the above-noted deleterious effects of condensation.

Figure 15:
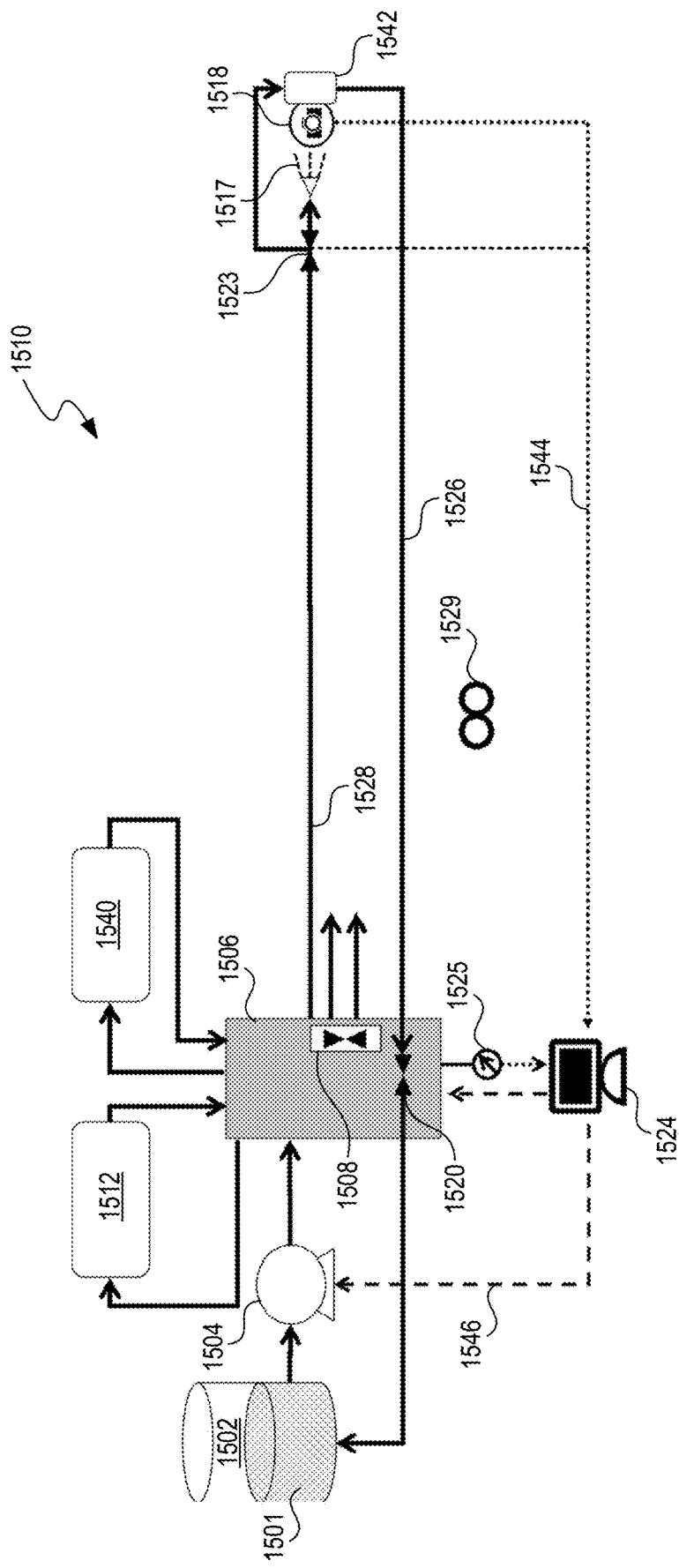
FIG. 15 is a schematic illustration of a perception surface cleaning and temperature control system configured in accordance with an embodiment of the present technology.
Figure 16:
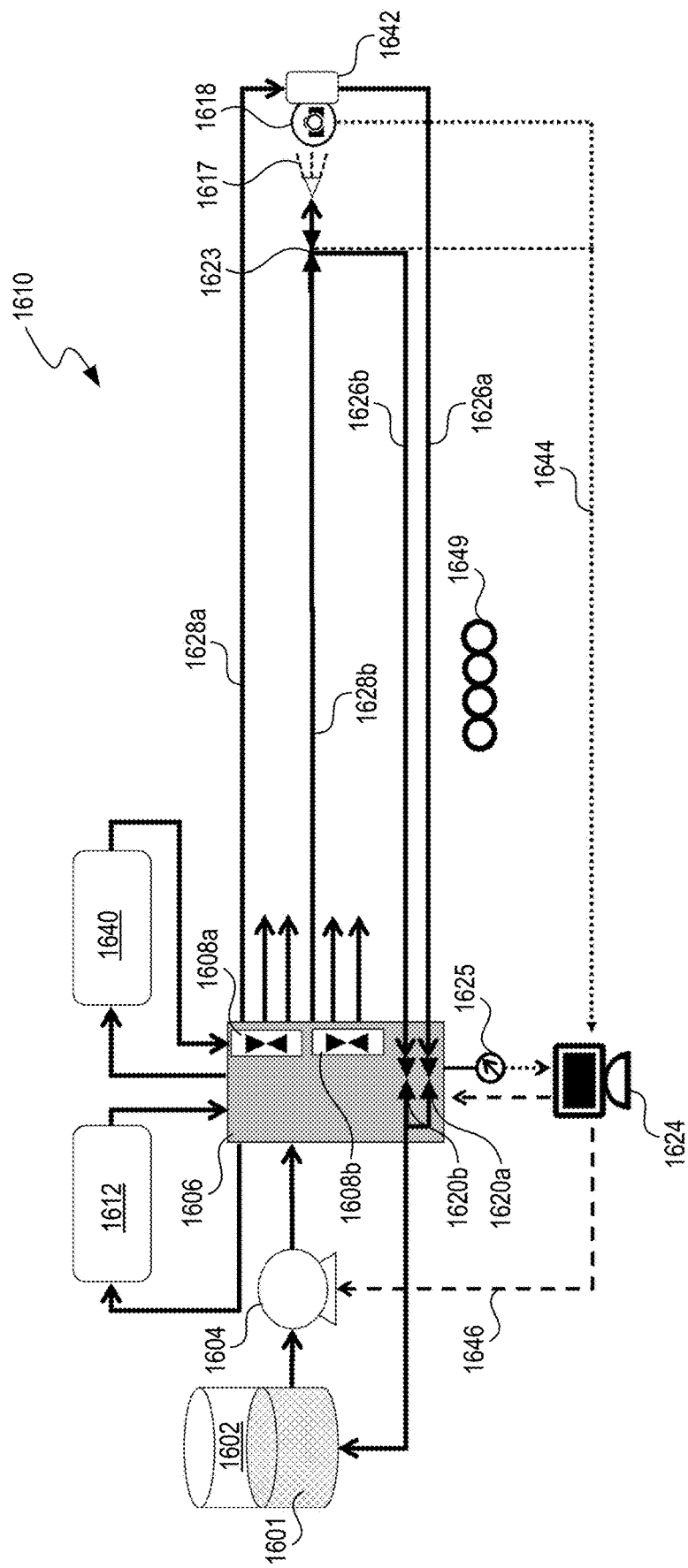
FIG. 16 is a schematic illustration of a perception surface cleaning and temperature control system configured in accordance with another embodiment of the present technology.
Figure 17:
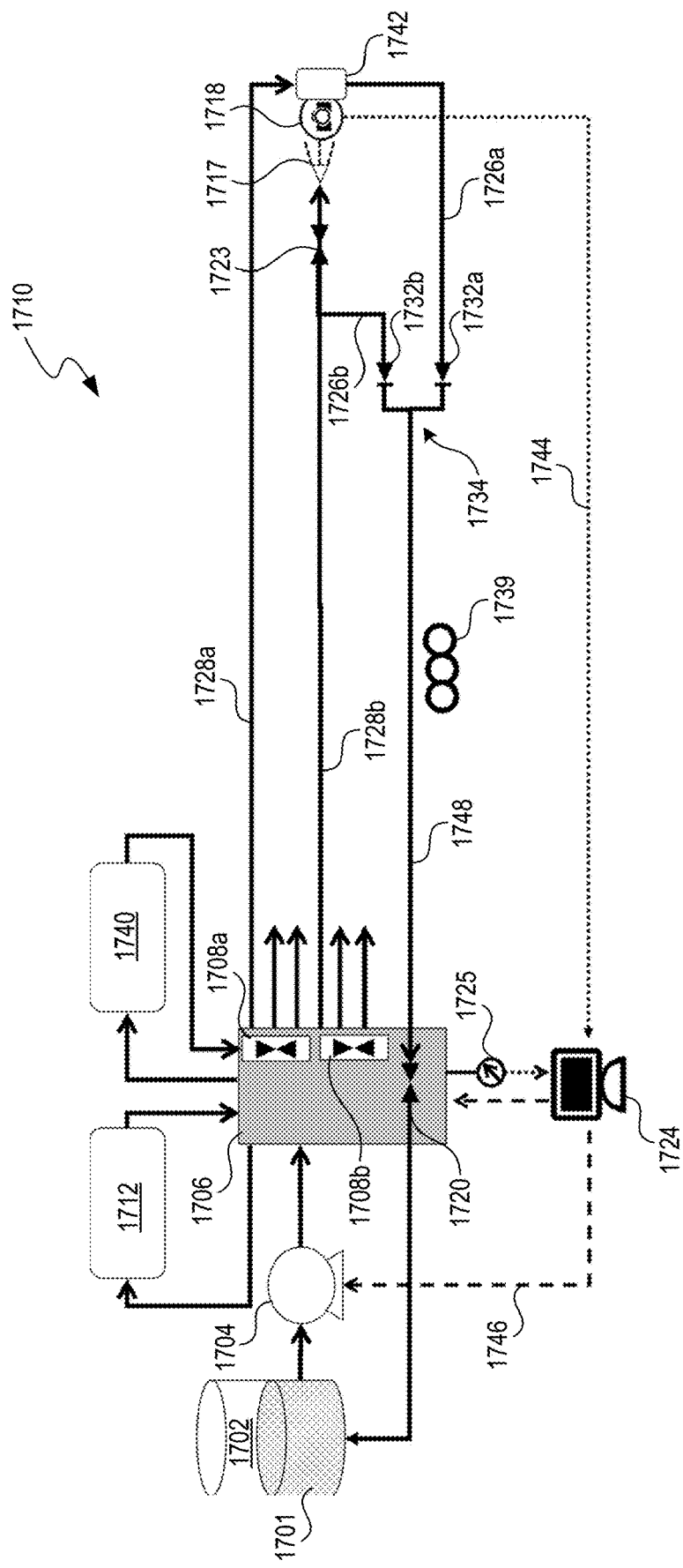
FIG. 17 is a schematic illustration of a perception surface cleaning and temperature control system configured in accordance with another embodiment of the present technology.

FIGS. 15-17 are schematic illustrations more specifically illustrating various embodiments of closed-loop systems for cleaning and temperature control of vehicle components configured in accordance with embodiments of the present technology. The detailed description of each embodiment focuses mainly on those components that are new/different as compared to other embodiments. However, one skilled in the art will appreciate that the various embodiments can (i) include the same or generally similar features (e.g., components, configurations, etc.), (ii) operate the same or generally similarly, and/or (iii) that the various embodiments can be combined. Further, one skilled in the art will appreciate that the various embodiments discussed with reference to FIGS. 15-17 can (i) include the same or generally similar features (e.g., components, configurations, etc.) as those embodiments discussed with reference to FIGS. 2-14, (ii) operate the same or generally similarly as those embodiments discussed with reference to FIGS. 2-14, and/or (iii) that the various embodiments can be combined with each other and/or the embodiments discussed with reference to FIGS. 2-14. Moreover, one of ordinary skill in the art will appreciate that the number of components can vary in the following embodiments. For example, the systems of the present technology can have any number of delivery channels, return channels, sensors, heaters, chillers, heat exchangers, nozzles, etc.

FIG. 15 is a schematic illustration of a perception surface cleaning and temperature control system 1510 configured in accordance with an embodiment of the present technology. In the illustrated embodiment, a washer fluid pump 1504 is configured to pump washer fluid 1501 from a reservoir 1502 to a delivery system 1506 (e.g., a manifold, valve system, etc.) having a plurality of delivery valves 1508 and a plurality of return valves 1520. A fluid heater 1512 and a fluid cooler or chiller 1540 are individually connected to the delivery system 1506. The fluid heater 1512 can comprise a parasitic heater configured to heat the fluid 1501 by transferring heat generated by a vehicle engine (or other system) to the fluid 1501, an electric heater configured to heat the fluid 1501 via a resistive heating element, another type of heater, and/or a combination of heaters (e.g., including an electric heater and a parasitic heater). In some embodiments, the fluid cooler 1540 is configured to cool the fluid 1501 via exchange with a cold fluid, such as air or liquid cooled by an air conditioning system of a vehicle. One or more of the delivery valves 1508 and/or one or more other valves (e.g., a 3-way bypass valve) can be opened to route all, none, or a portion of the fluid 1501 to the heater 1512 and/or to the fluid cooler 1540. For example, a first portion of the fluid 1501 can be routed to the fluid heater 1512 and a second portion of the fluid 1501 can be routed to the fluid cooler 1540. The first and second portions can have the same or different volumes. In other embodiments, all of the fluid 1501 can be routed to the heater 1512, such as when only heated fluid is required/desirable. Put differently, the fluid 1501 can be selectively directed to the fluid heater 1512, the fluid cooler 1540, to neither, or to both.

Regardless of the one or more combinations of the fluid heater 1512 and the fluid cooler 1540 used to heat/cool the fluid 1501, the delivery valves 1508 can be selectively opened/closed to permit the heated/cooled fluid 1501 to flow from the delivery system 1506 and along one or more parallel delivery channels 1528 to corresponding pre-sensor valves 1523. The pre-sensor valves 1523 are configured to selectively fluidly connect each of the delivery channels 1528 to (i) a nozzle 1517 configured to spray the fluid 1501 onto a corresponding perception sensor 1518 or (ii) a heat exchanger 1542 configured to heat and/or cool the sensor 1518 by generating a temperature differential between the fluid 1501 therein and the sensor 1518. In the illustrated embodiment, the nozzle 1517 and the heat exchanger 1542 clean and cool/heat, respectively, the same component—the sensor 1518. In other embodiments, the nozzle 1517 and the heat exchanger 1542 can operate with respect to different vehicle components. For example, the nozzle 1517 could be configured to clean the sensor 1518 (e.g., a camera) while the heat exchanger 1542 could be configured to cool a different nearby component (e.g., another camera, a sensor, etc.). As further shown in FIG. 15, return channels 1526 fluidly connect the heat exchangers 1542 to the return valves 1520 of the delivery system 1506 and are configured to return the fluid 1501 to the delivery system 1506 and/or the reservoir 1502.

A controller 1524 can be operably coupled to the pump 1504, a temperature sensor 1525 configured to sense the temperature of the fluid 1501 in and/or proximate to the delivery system 1506, the delivery system 1506, the sensors 1518, and/or the pre-sensor valves 1523. In operation, the controller 1524 is configured to receive a signal (e.g., a signal 1544) from one or more of the sensors 1518 and determine whether the sensors 1518 require cleaning and/or thermal management. Based on the determination, the controller 1524 can operate the pump 1504 (e.g., by sending a control signal 1546) and the delivery system 1506 to selectively heat and/or cool the fluid 1501 before opening one or more of the delivery valves 1508 to route the heated/cooled fluid 1501 along the delivery channels 1528 corresponding to the sensors 1518 requiring cleaning and/or thermal management. The controller 1524 can then operate (e.g., actuate) the pre-sensor valves 1523 to selectively direct the fluid 1501 to the nozzles 1517 and/or the heat exchangers 1542. Any of the fluid 1501 directed to the heat exchangers 1542 is subsequently returned to the delivery system 1506 and/or the reservoir 1502 via the return valves 1520.

In some embodiments, one or more of the delivery valves 1508, the return valves 1520, and/or other valves of the delivery system 1506 can be individually controlled solenoid valves or can be combined into a rotary valve system. In some embodiments, the delivery channels 1528, the return channels 1526, and/or other components of the system 1510 can comprise a dual lumen tubing 1529 (shown in cross-section in FIG. 15).

FIG. 16 is a schematic illustration of a perception surface cleaning and temperature control system 1610 configured in accordance with another embodiment of the present technology. In the illustrated embodiment, a washer fluid pump 1604 is configured to pump washer fluid 1601 from a reservoir 1602 to a delivery system 1606 having a plurality of first delivery valves 1608a, a plurality of second delivery valves 1608b, a plurality of first return valves 1620a, and a plurality of second return valves 1620b. A fluid heater 1612 and a fluid cooler or chiller 1640 are individually connected to the delivery system 1606. One or more of the first delivery valves 1608a, the second delivery valves 1608b, and/or other valves (e.g., a 3-way bypass valve) can be opened to route all, none, or a portion of the fluid 1601 to the fluid heater 1612 and/or to the fluid cooler 1640 to selectively heat/cool the fluid 1601.

In the illustrated embodiment, the first delivery valves 1608a can be selectively opened/closed to permit the heated/cooled fluid 1601 to flow from the delivery system 1606 and along one or more parallel first delivery channels 1628a to corresponding heat exchangers 1642. The heat exchangers 1642 can be configured to heat and/or cool nearby perception sensors 1618. First return channels 1626a fluidly connect the heat exchangers 1642 to the first return valves 1620a of the delivery system 1606 and are configured to return the fluid 1601 to the delivery system 1606 and/or the reservoir 1602. By this arrangement, the fluid 1601 routed to the heat exchangers 1642 is recirculated within the system 1610. The second delivery valves 1608b can be selectively opened/closed to permit the heated/cooled fluid 1601 to flow from the delivery system 1606 and along one or more parallel second delivery channels 1628b to pre-nozzle delivery valves 1623. Each of the pre-nozzle delivery valves 1623 is configured to selectively route the fluid 1601 to (i) a nozzle 1617 configured to spray the fluid 1601 onto a corresponding one of the perception sensors 1618 or (ii) a second return channel 1626b configured to return the fluid 1601 to the delivery system 1606 and/or the reservoir 1602 via the second return valves 1620b. The pre-nozzle delivery valves 1623 can be three-way valves (e.g., three-way solenoid valves), check valves, and/or other types of valves. As described in detail above with reference to FIGS. 10-14, the pre-nozzle delivery valves 1623 allow for the fluid 1601 in the second delivery channels 1628b to be recirculated back into the delivery system 1606 and/or the reservoir 1602 to be heated again. Moreover, in some embodiments, the system 1610 can include fluid holding chambers (e.g., insulated chambers configured to hold a volume of the fluid 1601 that is between about 1-5 times greater than the expected volume of the fluid 1601 to be delivered by the nozzles 1617) fluidly connected to the second delivery channels 1628b. In some such embodiments, the fluid holding chambers can be positioned near the nozzles 1617 and before the pre-nozzle delivery valves 1623.

A controller 1624 can be operably coupled to the pump 1604, a temperature sensor 1625 configured to sense the temperature of the fluid 1601 in and/or proximate to the delivery system 1606, the delivery system 1606, the sensors 1618, and/or the pre-nozzle delivery valves 1623. In operation, the controller 1624 is configured to receive a signal (e.g., a signal 1644) from one or more of the sensors 1618 and determine whether the sensors 1618 require cleaning and/or thermal management. Based on the determination, the controller 1624 can operate the pump 1604 (e.g., by sending a control signal 1646) and the delivery system 1606 to selectively heat and/or cool the fluid 1601 before opening one or more of the first delivery valves 1608a and/or the second delivery valves 1608b to route the heated/cooled fluid 1601 along the first delivery channels 1628a and/or the second delivery channels 1628b corresponding to the sensors 1618 requiring cleaning and/or thermal management. More specifically, for example, if one the sensors 1618 requires thermal management, the controller 1624 can actuate (e.g., open) the corresponding one of the first delivery valves 1608a to route the fluid 1601 along the first delivery channel 1628a to the heat exchanger 1642. Similarly, if one the sensors 1618 requires cleaning, the controller 1624 can actuate the corresponding one of the second delivery valves 1608b to route the fluid 1601 along the second delivery channel 1628b to the pre-nozzle delivery valve 1623. If the pre-nozzle delivery valve 1623 is a controller-actuatable valve (e.g., a three-way solenoid valve), the controller 1624 can control the pre-nozzle delivery valve 1623 to route the fluid to the nozzle 1617 for cleaning the sensor 1618. If the pre-nozzle delivery valve 1623 is a check valve or other passive valve, the controller 1624 can control the delivery system 1606 to close the corresponding one of the second return valves 1620b such that that the pressure in the second delivery channel 1628b exceeds the cracking pressure of the pre-nozzle delivery valve 1623, allowing the fluid 1601 to exit through the nozzle 1617.

In some embodiments, the controller 1624 is configured to determine that recirculation of the fluid 1601 second delivery channels 1628b is needed or desirable based on a temperature signal received from the temperature sensor 1625 or another temperature sensor (e.g., positioned along one of the second delivery channels 1628b or at a holding chamber coupled thereto). In other embodiments, the controller 1624 can periodically recirculate the second delivery channels 1628b or can base the determination that recirculation is needed on another input or criteria. If the pre-nozzle delivery valves 1623 are controller-actuatable valves (e.g., three-way solenoid valves), the controller 1624 can recirculate the fluid 1601 in the second delivery channels 1628b by controlling the pre-nozzle delivery valves 1623 to route the fluid 1601 to the second return channels 1626b. If the pre-nozzle delivery valves 1623 are check valves or other passive valves, the controller 1624 can recirculate the fluid 1601 in the second delivery channels 1628b by controlling the delivery system 1606 to open the second return valves 1620b such that that the pressure in the second delivery channels 1628b does not exceed the cracking pressure of the pre-nozzle delivery valves 1623, preventing the fluid 1601 from exiting through the nozzles 1617 and allowing the fluid 1601 to flow into the second return channels 1626b.

In some embodiments, the first delivery channels 1628a, the second delivery channels 1628b, the first return channels 1626a, the second return channels 1626b, and/or other components of the system 1610 can comprise a four-lumen tubing 1649 (shown in cross-section in FIG. 16). In some embodiments, the four-lumen tubing 1649 can be co-extruded. Such an arrangement can reduce the number of tubes/conduits required to service each of the sensors 1618.

FIG. 17 is a schematic illustration of a perception surface cleaning and temperature control system 1710 configured in accordance with another embodiment of the present technology. In the illustrated embodiment, a washer fluid pump 1704 is configured to pump washer fluid 1701 from a reservoir 1702 to a delivery system 1706 (e.g., a manifold) having a plurality of first delivery valves 1708a, a plurality of second delivery valves 1708b, and a plurality of return valves 1720. A fluid heater 1712 and a fluid cooler or chiller 1740 are individually connected to the delivery system 1706. One or more of the first delivery valves 1708a, the second delivery valves 1708b, and/or other valves (e.g., a 3-way bypass valve) can be opened to route all, none, or a portion of the fluid 1701 to the fluid heater 1712 and/or to the fluid cooler 1740 to heat/cool the fluid 1701. As described in detail above, the first delivery valves 1708a can be selectively opened/closed to permit the heated/cooled fluid 1701 to flow from the delivery system 1706 and along one or more parallel first delivery channels 1728a to corresponding heat exchangers 1742 configured to heat and/or cool nearby perception sensors 1718. First return channels 1726a are fluidly connected to the heat exchangers 1742 and are configured to receive the fluid 1701 after it has been heated/cooled by the heat exchangers 1742. The second delivery valves 1708b can be selectively opened/closed to permit the heated/cooled fluid 1701 to flow from the delivery system 1706 and along one or more parallel second delivery channels 1728b to pre-nozzle delivery valves 1723 (e.g., controller-operable solenoid valves, check valves, etc.). Each of the pre-nozzle delivery valves 1723 is configured to selectively route the fluid 1701 to (i) a nozzle 1717 configured to spray the fluid 1701 onto a corresponding one of the sensors 1718 or (ii) a second return channel 1126b.

In the illustrated embodiment, each of the first return channels 1726a includes a first return check valve 1732a and each of the second return channels 1726b includes a second return check valve 1732b. The first return channels 1726a and the second return channels 1726b corresponding to the same one of the sensors 1718 are merged together via a return T-connector 1734 into a single return channel 1748 received by a corresponding one of the return valves 1720 of the delivery system 1706. In the illustrated embodiment, three channels are used to carry the fluid 1701 between the delivery system 1706 (e.g., the first delivery channels 1728a, the second delivery channels 1728b, and the single return channel 1748) and each of the sensors 1718. In some embodiments, these channels can comprise a three-lumen tubing 1739 (shown in cross-section in FIG. 17) that can be, for example, co-extruded. Such an arrangement can reduce the number of tubes/conduits required to service each of the sensors 1718.

A controller 1724 can be operably coupled to the pump 1704, a temperature sensor 1725 configured to sense the temperature of the fluid 1701 in and/or proximate to the delivery system 1706, the delivery system 1706, the sensors 1718, and/or the pre-nozzle delivery valves 1723. In operation, the controller 1724 is configured to receive a signal (e.g., a signal 1744) from one or more of the sensors 1718 and determine whether the sensors 1718 require cleaning and/or thermal management. Based on the determination, the controller 1724 can operate the pump 1704 (e.g., by sending a control signal 1746) and the delivery system 1706 to selectively heat and/or cool the fluid 1701 before opening one or more of the first delivery valves 1708a and/or the second delivery valves 1708b to route the heated/cooled fluid 1701 along the first delivery channels 1728a and/or the second delivery channels 1728b corresponding to the sensors 1718 requiring cleaning and/or thermal management. As described in detail above with reference to FIGS. 10-14 and 17, the pre-nozzle delivery valves 1723 allow for the fluid 1701 in the second delivery channels 1728b to be recirculated back into the delivery system 1706 and/or the reservoir 1702 to be reheated. For example, to recirculate the fluid 1701 in the second delivery channels 1728b, the controller 1724 can activate the pump 1704 to pump the fluid 1701 through the second delivery valves 1708b while (i) opening the return valves 1720 of the delivery system 1706 if the pre-nozzle delivery valves 1723 are check valves (or other passive valves) or (ii) actuating the pre-nozzle delivery valves 1723 to direct the fluid 1701 to the second return channels 1726b if the pre-nozzle delivery valves 1723 are controller-operable valves (e.g., solenoid valves). The first return check valves 1732a and the second return check valves 1732b are configured to inhibit or prevent back flow of the fluid 1701 from, for example, the delivery system 1706 into the first return channels 1726a and second return channels 1726b during recirculation.

Moreover, in some embodiments, the system 1710 can include fluid holding chambers (e.g., insulated chambers configured to hold a volume of the fluid 1701 that is between about 1-5 times greater than the expected volume of the fluid 1701 to be delivered by the nozzles 1717) fluidly connected to the second delivery channels 1728b. In some such embodiments, the fluid holding chambers can be positioned near the nozzles 1717 and before the pre-nozzle delivery valves 1723.

Accordingly, referring to FIGS. 15-17 together, a perception surface cleaning and temperature control system configured in accordance with the present technology can include (i) combined delivery channels for routing fluid together to a nozzle and a heat exchanger and a single return channel for recirculating the fluid from the heat exchanger (FIG. 15), (ii) separate delivery channels for routing fluid to a nozzle and a heat exchanger and separate return channels for recirculating the fluid from the heat exchanger and proximate to the nozzle (FIG. 16), and/or (iii) separate delivery channels for routing fluid to a nozzle and a heat exchanger and a combined return channel for recirculating the fluid from the heat exchanger and proximate to the nozzle (FIG. 17).

V. SELECTED EMBODIMENTS OF SYSTEMS FOR CLEANING AND DRYING VEHICLE COMPONENTS

As set forth above, many perception components require or can benefit from surface cleaning with a fluid (e.g., heated washer fluid). Often, the same perception components and/or other components can also benefit from drying or cleaning via forced air. For example, in some instances a perception sensor's ability to "see" may be hindered by the presence of water or dust on the surface of the sensor. Water droplets may occur due to rain, condensation, spraying of cleaning fluid, or some other source. While washer fluid might remove dust, the surface might require a second air drying step before vision is fully restored. Accordingly, referring again to FIG. 1, in some embodiments of the present technology a cleaning system (e.g., the cleaning system 110) can be configured to deliver forced air to one or more vehicle components (e.g., the sensors 108 and/or the perception surfaces 109). For example, the cleaning system 110 can deliver forced air to one or components of the vehicle 100 to remove water droplets, dust, and/or other contaminants therefrom. That is, the cleaning system can selectively blow air across one or more perception surfaces to provide improved surface cleaning, clearing, and drying. In some embodiments, the cleaning system 110 is configured to deliver air at high velocities, pre-dry the air, and/or warm the air. In some embodiments, the cleaning system 110 can also deliver washer fluid to clean the vehicle components and/or deliver fluid to thermally control the components.

The source of forced air can be a blower, an air compressor, an air accumulator and/or another source. In some embodiments, the cleaning system 110 includes a valve system that selectively routes the air to a heating and/or drying system and back to the valve system before being routed to one or more air distribution channels. In some embodiments, the valve system does not select an air flow containing conduit, but rather pressurizes a plenum which delivers forced air to multiple channels at once. In some embodiments, forced air is delivered continuously during vehicle operation, as forced air may help prevent occlusion of vehicle components. In other embodiments, forced air can be selectively provided.

In some embodiments, washer fluid and forced air may be routed from a central valve system (e.g., manifold) to a plurality of nozzles configured to deliver the air and fluid. The air and fluid may be delivered through the same nozzle or nozzles, or may be delivered through separate nozzles. In other embodiments, washer fluid and forced air may be routed from a central valve system to one or more peripheral valve systems (e.g., hierarchical manifolds), which route the washer fluid and air to the nozzles.

In some embodiments, the cleaning system 110 includes (i) a washer fluid manifold and valve system configured to direct flow to a flow channel (e.g., a hose, tube, etc.) corresponding to a vehicle component to be cleaned and (ii) an air flow manifold and valve system configured to direct airflow to a flow channel (e.g., a hose, tube, etc.) corresponding to the vehicle component to be cleaned and/or dried. In other embodiments, distribution of washer fluid and air is accomplished via a common manifold in which either washer fluid or compressed air may be selected as the input fluid and routed—via a tube that may hold either washer fluid or compressed air—to a common nozzle which applies the washer fluid and/or the air to the vehicle component.

In some embodiments, the cleaning system 110 can be configured to recirculate washer fluid. For example, the cleaning system 110 can include a tube configured to carry fluid from a valve system to a nozzle, and another tube configured to carry fluid back from the nozzle to the valve system. Washer fluid may be pumped so as to recirculate in the tubes without spraying out of the nozzle. When a surface needs cleaning, the recirculation of fluid is stopped and compressed air is allowed to flow into the tubes, forcing washer fluid out of the nozzle under high pressure. Subsequently, the recirculation pathway can be re-opened, forcing liquid out of the remainder of the tubing flowing towards the nozzle. When the tubing behind the nozzle has cleared of liquid, the recirculation pathway can be closed again, causing the forced air to exit the nozzle to dry the surface.

In some embodiments, tubes for carrying air and fluid can be combined into a dual-lumen tubing. For example, the air and fluid can be carried by a coaxial conduit including an inner channel for carrying washer fluid and an outer channel for carrying air. In some such embodiments, the inherent proximity of the inner and outer channels provides for advantageous heat transfer between the air and the liquid washer fluid. Alternatively, the flow channels may be side-by-side in parallel tubes or in co-extruded multi-lumen tubing. As the volumetric flow rates of washer fluid and air may differ significantly, the diameters of the flow paths within the tubing may not be the same.

FIGS. 18-23 are schematic illustrations more specifically illustrating various embodiments of closed-loop systems for cleaning and/or drying vehicle components configured in accordance with embodiments of the present technology. The detailed description of each embodiment focuses mainly on those components that are new/different as compared to other embodiments. However, one skilled in the art will appreciate that the various embodiments can (i) include the same or generally similar features (e.g., components, configurations, etc.), (ii) operate the same or generally similarly, and/or (iii) that the various embodiments can be combined. Further, one skilled in the art will appreciate that the various embodiments discussed with reference to FIGS. 18-23 can (i) include the same or generally similar features (e.g., components, configurations, etc.) as those embodiments discussed with reference to FIGS. 2-17, (ii) can operate the same or generally similarly as those embodiments discussed with reference to FIGS. 2-17, and/or (iii) can be combined with each other and/or the embodiments discussed with reference to FIGS. 2-17. Moreover, one of ordinary skill in the art will appreciate that the number of components can vary in the following embodiments. For example, the systems of the present technology can have any number of delivery channels, return channels, sensors, heaters, chillers, heat exchangers, nozzles, etc.

Figure 18:
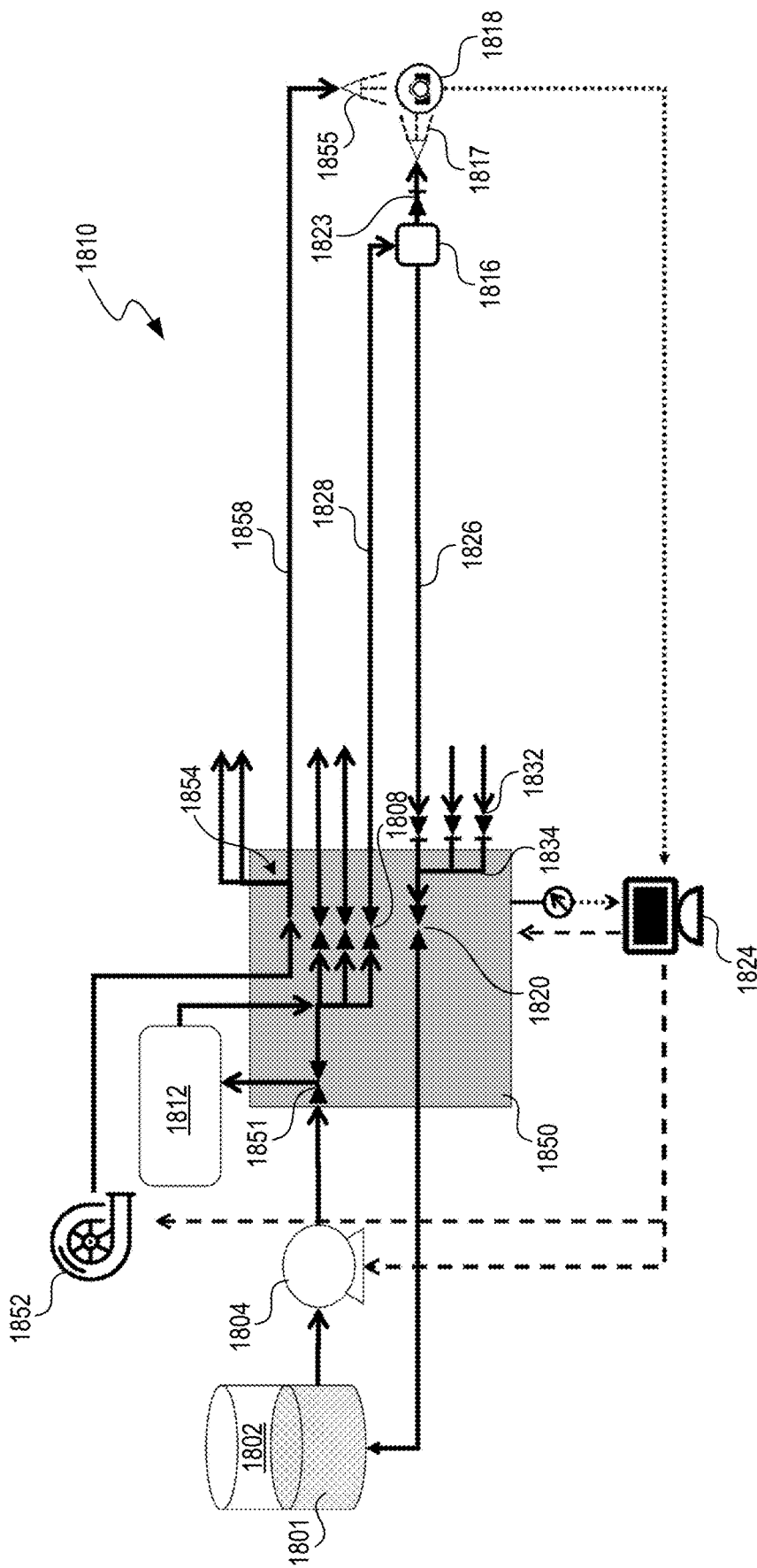
FIG. 18 is a schematic illustration of a perception surface cleaning and drying system configured in accordance with an embodiment of the present technology.

FIG. 18 is a schematic illustration of a perception surface cleaning and drying system 1810 configured in accordance with an embodiment of the present technology. In the illustrated embodiment, the system 1810 includes a washer fluid pump 1804 configured to pump washer fluid 1801 from a reservoir 1802 to a delivery system 1850 (e.g., a manifold, valve system, etc.) having a plurality of fluid delivery valves 1808 and a single return valve 1820. A heater 1812 (e.g., a parasitic and/or electric heater) is configured to heat the fluid 1801. A bypass valve (e.g., a three-way bypass valve) 1851 can be selectively opened/closed to permit the fluid 1801 to flow to the heater 1812 for heating and subsequently back into the delivery system 1850. The fluid delivery valves 1808 can be selectively opened/closed to permit the fluid 1801 to flow from the delivery system 1850 and along one or more parallel fluid delivery channels 1828 to corresponding holding chambers 1816. Each of the holding chambers 1816 is fluidly connected to a nozzle 1817 via a pre-nozzle check valve 1821. The nozzles 1817 are configured to distribute or spray the fluid 1801 onto corresponding perception sensors 1818 to clean the sensors 1818 (e.g., clear the sensors 1818 of occlusions). The pre-nozzle check valves 1821 are configured to selectively fluidly connect the holding chambers 1816 to corresponding (i) ones of the nozzles 1817 or (ii) return channels 1826 configured to return the fluid 1801 to the reservoir 1802 and/or the delivery system 1850. In the illustrated embodiment, each of the return channels 1826 includes a return check valve 1832, and the return channels 1826 are merged together via a return T-connector 1834 into a single channel received by the single return valve 1820 of the delivery system 1850. As described in detail above, this arrangement can enable the selective recirculation of the fluid 1801 from the holding chambers 1816.

In the illustrated embodiment, the system 1810 further includes a forced air source 1852 (e.g., a blower, an air compressor, and/or a compressed air accumulator) configured to provide air flow to the delivery system 1850. More specifically, the delivery system 1850 can include an air manifold 1854 that divides the air flow from the air source 1852 into one or more parallel air delivery channels 1858. In operation, the air flows through the air delivery channels 1858 to nozzles 1855 configured to direct the air against corresponding ones of the sensors 1818. In one aspect of this embodiment, the delivery system 1850 does not select an air flow containing conduit, but rather pressurizes the air manifold 1854 which delivers forced air to all of the air delivery channels 1858 at once.

A controller 1824 can be operably coupled to the pump 1804, the air source 1852, the delivery system 1850, and the sensors 1818. When the controller 1824 determines that one or more of the perception sensors 1818 are occluded, the controller 1824 can close the return valve 1820 and selectively engage the pump 1804 and the associated one or more of the fluid delivery valves 1808 to route the fluid 1801 along the selected fluid delivery channels 1828 to the nozzles 1817 corresponding to the occluded sensors 1818 to clean the corresponding occluded sensors 1818. Similarly, the controller 1824 can control the air source 1852 to provide air flow at the sensors 1818. In some embodiments, the controller 1824 is configured to trigger air flow soon after and/or during delivery of the fluid 1801 to one or more of the sensors 1818. For example, forced air can be provided immediately after delivery of the fluid 1801 to dry the sensors 1818.

In some embodiments, the air source 1852 is operated continuously during operation of a vehicle incorporating the system 1810 to, for example, help prevent occlusion of the sensors 1818. In other embodiments, the controller 1824 can selectively engage the air source 1852 during operation.

Figure 19:
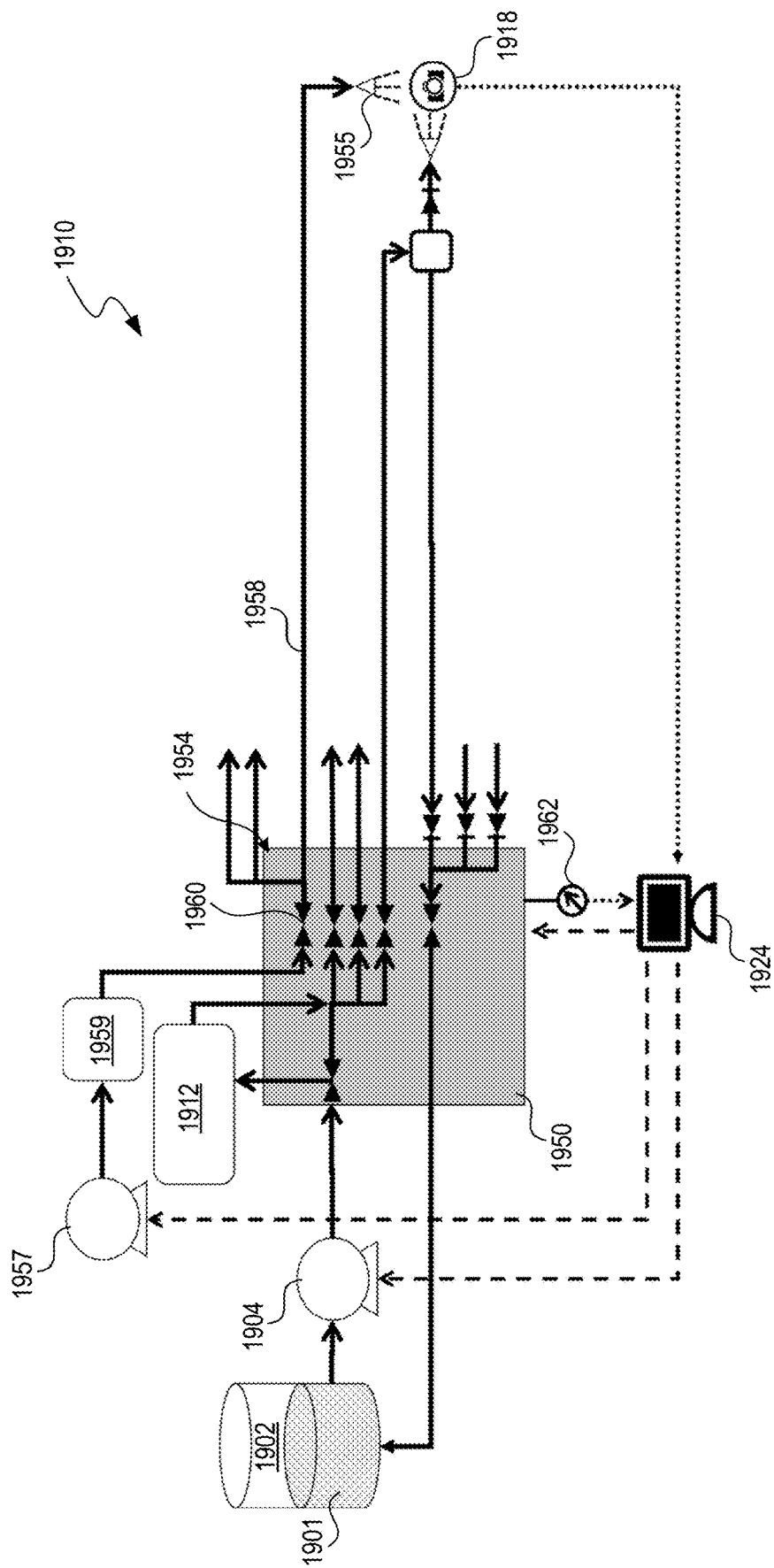
FIG. 19 is a schematic illustration of a perception surface cleaning and drying system configured in accordance with another embodiment of the present technology.

FIG. 19 is a schematic illustration of a perception surface cleaning and drying system 1910 configured in accordance with another embodiment of the present technology. In the illustrated embodiment, a fluid pump 1904 is configured to deliver washer fluid 1901 from a reservoir 1902 to a delivery system 1950 for heating via a heater 1912 and subsequent delivery to one or more perception sensors 1918 and/or recirculation to the reservoir 1902, as described in detail above. In some embodiments, the fluid delivery components of the system 1910 are identical to those of the system 1810 described in detail above with reference to FIG. 18.

In the illustrated embodiment, however, the system 1910 includes an air source comprising an air compressor 1957 and a compressed air accumulator 1959 configured to provide air flow to the delivery system 1950. For example, the delivery system 1950 can include an air manifold 1954 that divides the air flow from the air source into one or more parallel air delivery channels 1958. In the illustrated embodiment, the delivery system 1950 includes an air accumulator valve 1960 that can be opened/closed to allow air flow into the air manifold 1954. When the air accumulator valve 1960 is open and the air source is activated, air flows through the air delivery channels 1958 to nozzles 1955 configured to direct the air against corresponding ones of the sensors 1918.

A controller 1924 can be operably coupled to the pump 1904, the air source (e.g., the air compressor 1957), the delivery system 1950, the sensors 1918, and one or more delivery system sensors 1962 (e.g., temperature sensors, pressure gauges, transducers, and/or other sensors for sensing a condition, parameter, etc., of the fluid 1901 and/or air within and/or proximate to the delivery system 1950). When the controller 1924 determines that one or more of the sensors 1918 are occluded, the controller 1924 can route the fluid 1901 to the nozzles 1917 corresponding to the occluded sensors 1918 to clean the corresponding occluded sensors 1918. Similarly, the controller 1924 can control the air source (e.g., the air compressor 1957) and open the air accumulator valve 1960 to provide air flow at the sensors 1918. In some embodiments, the controller 1924 is configured to trigger air flow soon after and/or during delivery of the fluid 1901 to one or more of the sensors 1918. For example, forced air can be provided immediately after delivery of the fluid 1901 to dry the sensors 1918.

Figure 20:
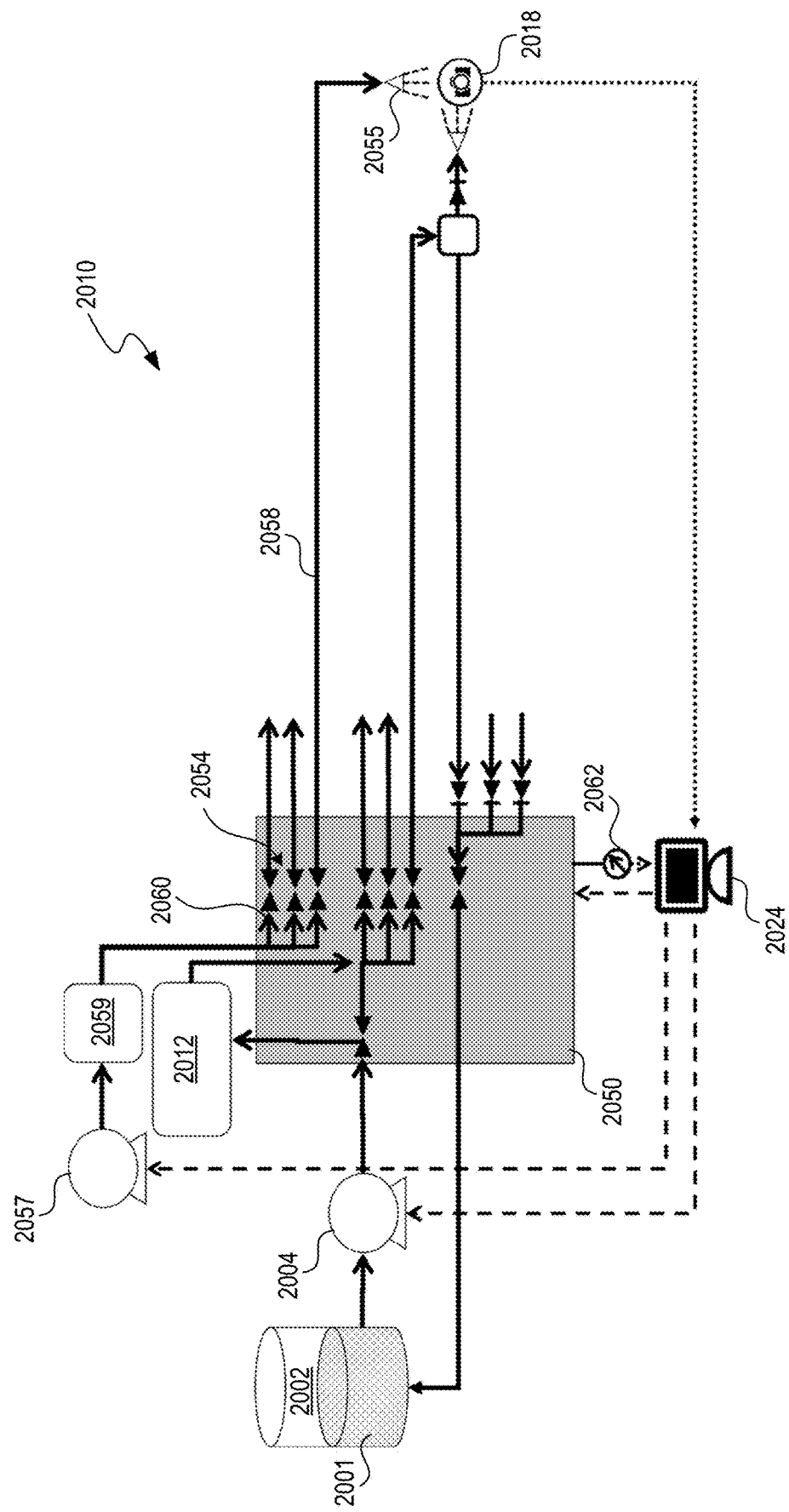
FIG. 20 is a schematic illustration of a perception surface cleaning and drying system configured in accordance with another embodiment of the present technology.

FIG. 20 is a schematic illustration of a perception surface cleaning and drying system 2010 configured in accordance with another embodiment of the present technology. In the illustrated embodiment, a fluid pump 2004 is configured to deliver washer fluid 2001 from a reservoir 2002 to a delivery system 2050 for heating via a heater 2012 and subsequent delivery to one or more perception sensors 2018 and/or recirculation to the reservoir 2002, as described in detail above. In some embodiments, the fluid delivery components of the system 2010 are identical to those of the system 1810 and/or the system 1910 described in detail above with reference to FIGS. 18 and 19. Likewise, the system 2010 includes an air source comprising an air compressor 2057 and a compressed air accumulator 2059 configured to provide air flow to the delivery system 2050.

In the illustrated embodiment, however, the delivery system 2050 includes an air manifold 2054 that divides the air flow from the air source into one or more parallel air delivery channels 2058, and a plurality of air delivery valves 2060 that can be selectively opened/closed to allow air flow into individual ones of the air delivery channels 2058. That is, one or more of the air delivery valves 2060 can be selectively opened to allow air to flow through a corresponding one of the air delivery channels 2058 to a nozzle 2055 configured to direct the air against a corresponding one of the sensors 2018.

A controller 2024 can be operably coupled to the pump 2004, the air source (e.g., the air compressor 2057), the delivery system 2050, the sensors 2018, and one or more delivery system sensors 2062 (e.g., temperature sensors, pressure gauges, transducers, and/or other sensors for sensing a condition, parameter, etc., of the fluid 2001 and/or air within and/or proximate to the delivery system 2050). When the controller 2024 determines that one or more of the sensors 2018 are occluded, the controller 2024 can route the fluid 2001 to the nozzles 2017 corresponding to the occluded sensors 2018 to clean the corresponding occluded sensors 2018. Similarly, the controller 2024 can control the air source (e.g., the air compressor 2057) and selectively open one or more of the air delivery valves 2060 to provide air flow to corresponding ones of the sensors 2018.

Figure 21:
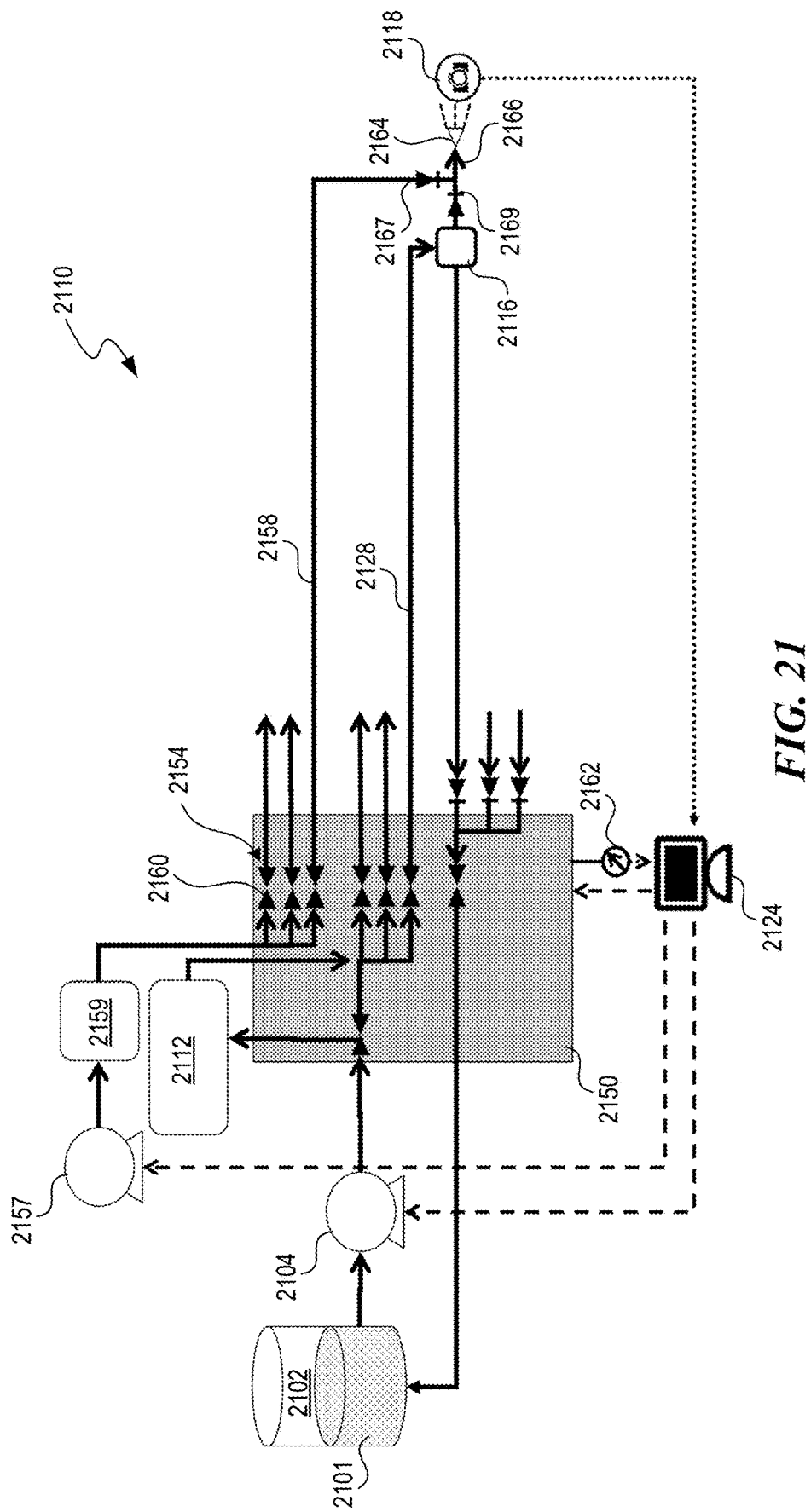
FIG. 21 is a schematic illustration of a perception surface cleaning and drying system configured in accordance with another embodiment of the present technology.

FIG. 21 is a schematic illustration of a perception surface cleaning and drying system 2110 configured in accordance with another embodiment of the present technology. In the illustrated embodiment, a fluid pump 2104 is configured to deliver washer fluid 2101 from a reservoir 2102 to a delivery system 2150 for heating via a heater 2112. The delivery system 2150 is configured to selectively deliver (e.g., via actuation of one or more delivery valves) the fluid 2101 along one or more parallel fluid delivery channels 2128 to corresponding holding chambers 2116. The system 2110 further includes an air source comprising an air compressor 2157 and a compressed air accumulator 2159 configured to provide air flow to the delivery system 2150. The delivery system 2150 includes an air manifold 2154 that divides the air flow from the air source into one or more parallel air delivery channels 2158, and a plurality of air delivery valves 2160 that can be selectively opened/closed to allow air flow into individual ones of the air delivery channels 2158.

In the illustrated embodiment, the air delivery channels 2158 and the fluid delivery channels 2128 for each of the sensors 2118 are joined together via a T-connector 2166 connected to an air and fluid delivery nozzle 2164. That is, the nozzles 2164 are configured to both (i) distribute or spray the fluid 2101 onto the sensors 2118 to clean the sensors 2118 (e.g., to clear the sensors 2118 of occlusions) and (ii) direct the air against the sensors 2118 to clean, dry, etc., the sensors 2118. In the illustrated embodiment, an air flow check valve 2167 inhibits or prevents back flow of the fluid 2101 into the air delivery channels 2158. Similarly, a fluid flow check valve 2169 inhibits or even prevents back flow of air into the fluid delivery channels 2128.

A controller 2124 can be operably coupled to the pump 2104, the air source (e.g., the air compressor 2157), the delivery system 2150, the sensors 2118, and one or more delivery system sensors 2162. When the controller 2124 determines that one or more of the sensors 2118 are occluded, the controller 2124 can route the fluid 2101 to the nozzles 2164 corresponding to the occluded sensors 2118 to clean the corresponding occluded sensors 2118. Similarly, the controller 2124 can control the air source (e.g., the air compressor 2157) and selectively open one or more of the air delivery valves 2160 to provide air flow to the occluded sensors 2118 via the same nozzles 2164. In some embodiments, air can be delivered after the fluid 2101 to, for example, dry the sensors 2118. In other embodiments, the fluid 2101 and air can be delivered simultaneously, or air can be delivered before the fluid 2101.

Figure 22:
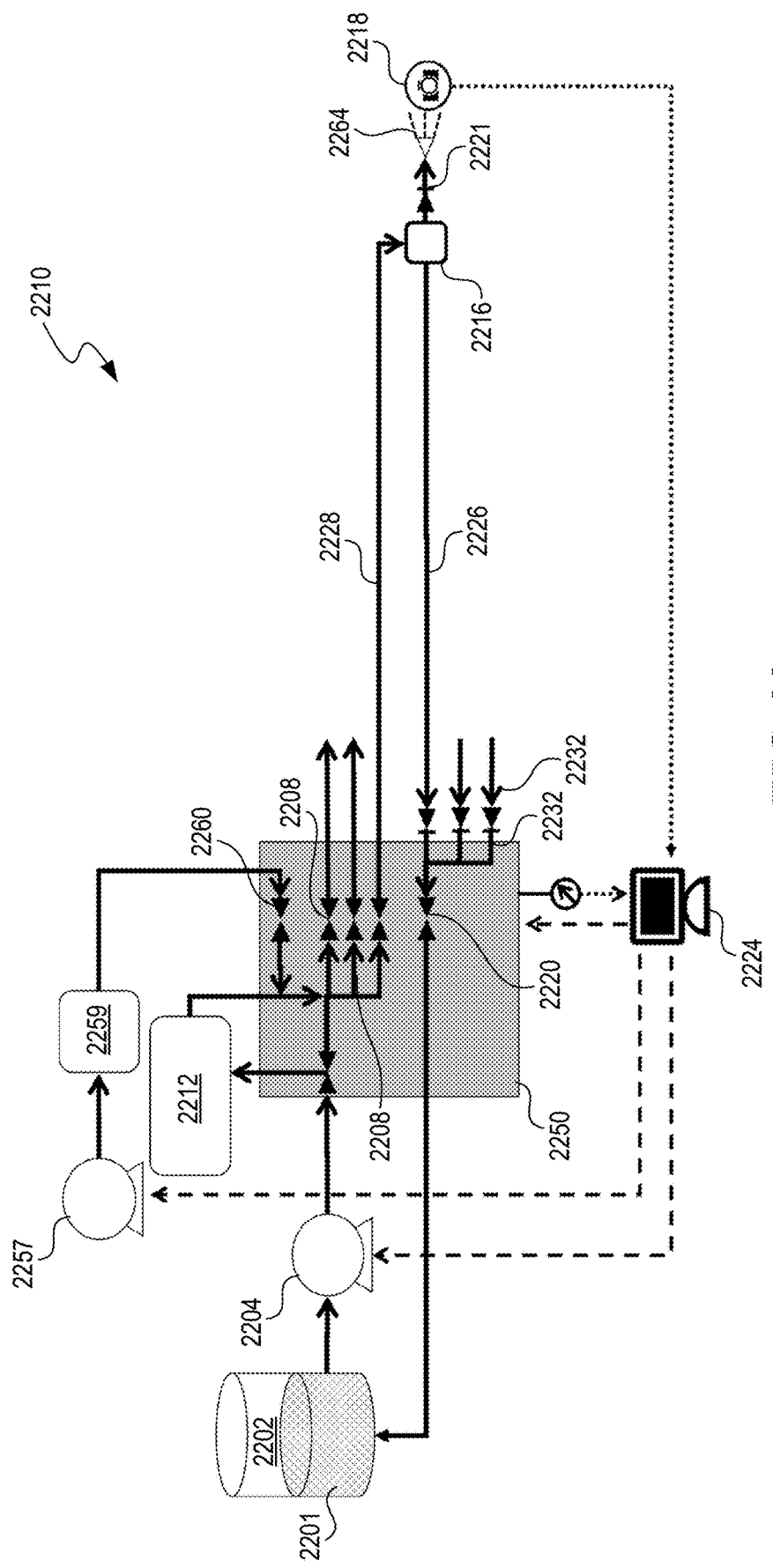
FIG. 22 is a schematic illustration of a perception surface cleaning and drying system configured in accordance with another embodiment of the present technology.

FIG. 22 is a schematic illustration of a perception surface cleaning and drying system 2210 configured in accordance with another embodiment of the present technology. In the illustrated embodiment, a pump 2204 is configured to deliver washer fluid 2201 from a reservoir 2202 to a delivery system 2250 for heating via a heater 2212. The delivery system 2250 includes a fluid and air delivery manifold 2268 including a plurality of delivery valves 2208. The system 2210 further includes an air source comprising an air compressor 2257 and a compressed air accumulator 2259 configured to provide air flow to the delivery system 2250. More specifically, in the illustrated embodiment the air source is selectively connected to the delivery manifold 2268 via an air delivery valve 2260. By this arrangement, the delivery manifold 2268 is connected to both the air source and the fluid reservoir 2202 and is configured to divide and deliver the fluid 2201 along one or more parallel delivery channels 2228 to holding chambers 2216.

Each of the holding chambers 2216 is fluidly connected to an air and fluid delivery nozzle 2264 via a pre-nozzle check valve 2221. The pre-nozzle check valves 2221 are configured to selectively fluidly connect the holding chambers 2216 to corresponding (i) ones of the nozzles 2217 or (ii) return channels 2226 configured to return the fluid 2201 to the reservoir 2202 and/or the delivery system 2206. For example, in the illustrated embodiment each of the return channels 2226 includes a return check valve 2232, and the return channels 2226 are merged together via a return T-connector 2234 into a single channel received by a single return valve 2220 of the delivery system 2250. As described in detail above, this arrangement allows for the recirculation of the fluid 2201 from the holding chambers 2216 to the fluid reservoir 2202.

A controller 2224 can be operably coupled to the pump 2204, the air source (e.g., the air compressor 2257), the delivery system 2250, the sensors 2218, and one or more delivery system sensors. When the controller 2224 determines that one or more of the sensors 2218 are occluded, the controller 2224 can route the fluid 2201 to the nozzles 2264 corresponding to the occluded sensors 2218 to clean the corresponding occluded sensors 2218. More specifically, the controller 2224 can close the return valve 2220 of the delivery system 2250 while operating the pump 2204 and/or the air source (e.g., the air compressor 2257) to increase the pressure in the delivery channels 2228 above the cracking-pressure of the pre-nozzle check valves 2221. That is, either or both of the pump 2204 and the air source can be selectively operated to provide the required pressure for delivering the fluid 2201 from the nozzles 2264.

When the air source is used to initiate delivery of the fluid 2201, the air flows behind the fluid 2201 in the delivery channels 2228, thereby driving the fluid 2201. In one aspect of the present technology, as the fluid 2201 is ejected from the holding chambers 2216 through the nozzles 2264, the fluid 2201 within the delivery channels 2228 flows to refill the holding chamber 2216, while compressed air fills part or all of the delivery manifold 2268, and possibly a portion of the delivery channels 2228. Pressure moves through the fluid 2201 at the speed of sound resulting in nearly instantaneous commencement of fluid flow from the nozzles 2264. Moreover, the fluid 2201 is expelled through the nozzle 2264 at a high rate depending on the pressure in and the volume of the air source. In some embodiments, for example, the fluid 2201 can be expelled at a rate of about 50 milliliters per second. Delivery of 5 milliliters of the fluid 2201 can therefore occur within about 0.1 second of the opening of the air delivery valve 2260.

To stop delivery of the fluid 2201 from the nozzles 2264, the controller 2224 can close the air delivery valve 2260, open the return valve 2220, and/or close the selected delivery valves 2208. If forced air delivery to the sensors 2218 is not desired, the air delivery valve 2260 is closed, and the pump 2204 can pump the fluid 2201 through the delivery system 2250 to (i) refill the selected delivery channels 2228 and the holding chambers 2216 and (ii) expel any remaining air entrapped in the delivery manifold 2268 and/or the delivery channels 2228 into the washer fluid reservoir 2202. If forced air delivery to the sensors 2218 is desired, the air delivery valve 2260 and the return valve 2220 are opened (or remain open). This allows pressurized air to continue to drive the fluid 2201 out of the selected delivery channels 2228 and the holding chambers 2216. After a short period (e.g., less than about 3 seconds, less than about 1 second, less than about 0.5 second, etc.) in which the fluid 2201 is forced through the return channels 2226 and into the reservoir 2202, the return valve 2220 can be closed. This allows the air source to increase the pressure within the holding chambers 2216 above the cracking pressure of the pre-nozzle check valves 2221 so that the pre-nozzle check valves 2221 open, thereby allowing air to be expelled onto the sensors 2218.

In some embodiments, the delivery channels 2228 (e.g., tubes) can have a relatively small inner diameter (e.g., about 4 millimeters) such that the volume per unit length of the delivery channels 2228 is relatively small (e.g., about 12.6 milliliters per meter of length of a 4-millimeter inner diameter tube). The volume of the fluid 2201 desired to be delivered to the sensors 2218 can vary depending on the size of the sensors 2218 (e.g., a surface size), the type of occlusion, environmental factors, etc. However, the volume to be delivered may be quite small, such as 1 milliliter per square centimeter. A small (e.g., 2.5-centimeter diameter circular surface of one of the sensors 2218) might require 5 milliliters of hot washer fluid or less.

Figure 23:
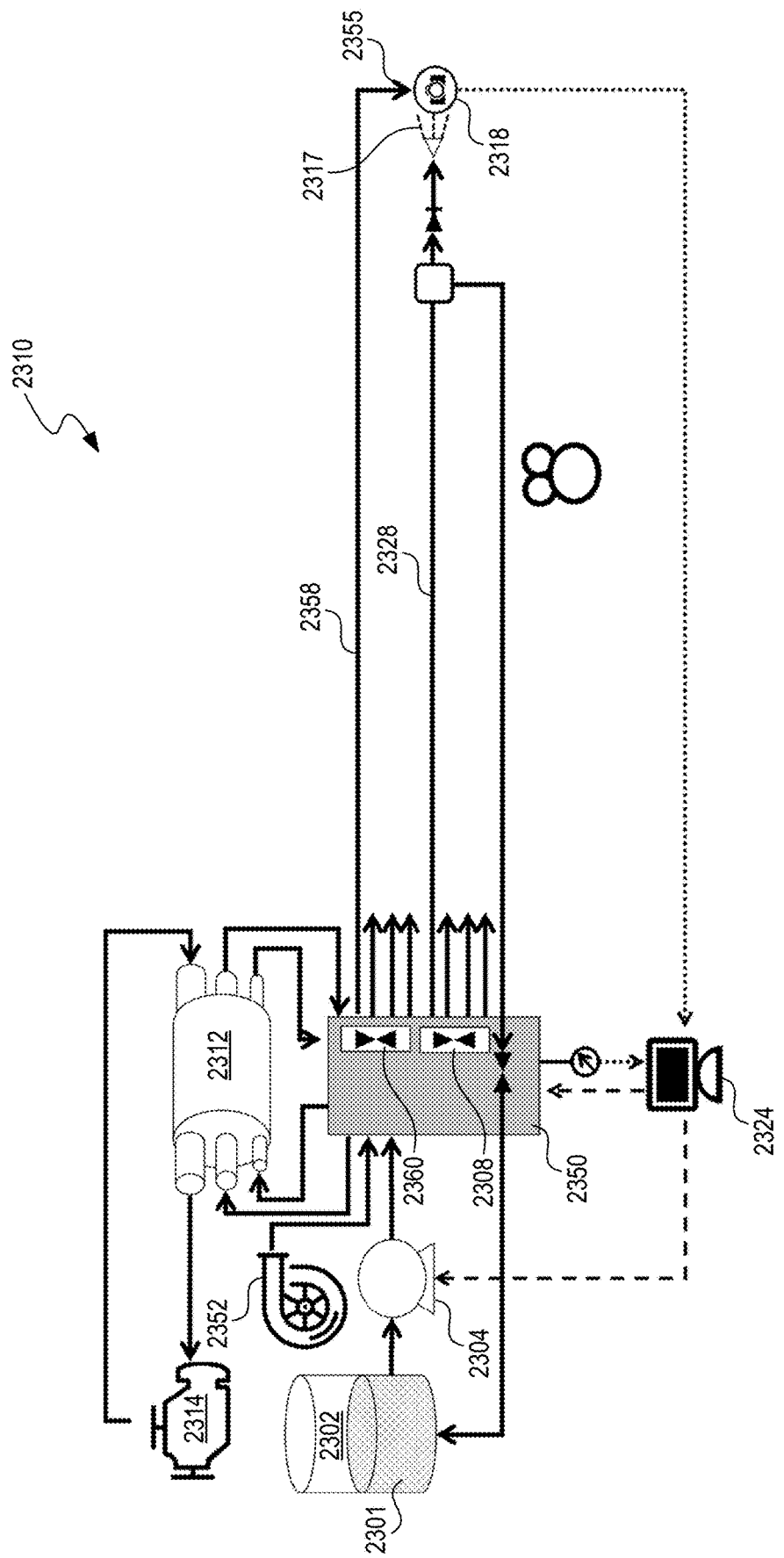
FIG. 23 is a schematic illustration of a perception surface cleaning and drying system configured in accordance with another embodiment of the present technology.

FIG. 23 is a schematic illustration of a perception surface cleaning and drying system 2310 configured in accordance with another embodiment of the present technology. In the illustrated embodiment, a fluid pump 2304 is configured to deliver washer fluid 2301 from a reservoir 2302 to a delivery system 2350 for heating via a heater 2312 (e.g., a parasitic heater configured to transfer heat generated by a vehicle engine 2314 (or other system) to the fluid 2301. The delivery system 2350 is configured to selectively deliver the fluid 2301—via actuation of one or more fluid delivery valves 2308—along one or more parallel fluid delivery channels 2328 to perception sensors 2318 to clean the sensors 2318. The system 2310 further includes an air source 2352 comprising a blower. The delivery system 2350 includes an air manifold that divides the air flow from the air source 2352 into one or more parallel air delivery channels 2358, and a plurality of air delivery valves 2360 that can be selectively opened/closed to allow air flow into individual ones of the air delivery channels 2358.

In the illustrated embodiment, the delivery system 2350 is configured to selectively route the air from the air source 2352 to the heater 2312 to heat the air. More specifically, a controller 2324 can be operably coupled to the delivery system 2350, the air source 2352, the sensors 2318, the pump 2304, temperature sensors, pressure sensors, and/or other components of the system 2310. In some embodiments, the controller 2324 can control the delivery system 2350 and/or the air source 2352 to selectively route all of the air to the heater 2312 or to bypass the heater 2312 and remain unheated. In other embodiments, the delivery system 2350 may direct only a first portion/volume of air to the heater 2312 for heating. The first portion can subsequently mix with a remaining second portion/volume of air that bypasses the heater 2312 within a volume of the delivery system 2350 (e.g., within the air manifold) to achieve an air temperature in between that of the air exiting the air source 2352 and the air exiting the heater 2312. For example, in some embodiments the delivery system 2350 may contain a variable aperture valve to direct a portion of the air to the heater 2312. In other embodiments, the delivery system 2350 can include a three-way valve that selectively connects (e.g., based on a control signal from the controller 2324) the air source 2352 to (i) the air manifold and the air delivery valves 2360 or (ii) the heater 2312. In yet other embodiments, the various valves of the delivery system 2350 can be individually controlled solenoid valves or may be combined into a rotary valve system.

When the controller 2324 determines that one or more of the sensors 2318 are occluded, the controller 2324 can route the fluid 2301 to fluid delivery nozzles 2317 corresponding to the occluded sensors 2318 to clean the corresponding occluded sensors 2318. Similarly, the controller 2324 can control the air source 2352 and the delivery system 2350 to provide heated and/or unheated air flow to the occluded sensors 2318 via nozzles 2355.

As one of ordinary skill in the art will appreciate, any of the embodiments described with reference to FIGS. 18-22 can be modified to include heating air prior to delivering the air to one or more occluded sensors.

VI. SELECTED EMBODIMENTS OF SYSTEMS FOR CLEANING, DRYING, AND THERMALLY MANAGING VEHICLE COMPONENTS

As set forth above, many vehicle components require or can benefit from surface cleaning with a fluid (e.g., heated washer fluid), surface cleaning or drying via forced air, and/or temperature control. Accordingly, referring again to FIG. 1, in some embodiments of the present technology a cleaning system (e.g., the cleaning system 110) can be configured to (i) heat and deliver fluid, such as washer fluid, to one or more vehicle components (e.g., the sensors 108 and/or the perception surfaces 109), (ii) to deliver forced air to clean, dry, remove contaminants, etc., from the vehicle components, and (iii) control a temperature (heat and/or cool) of the vehicle components.

Figure 24:
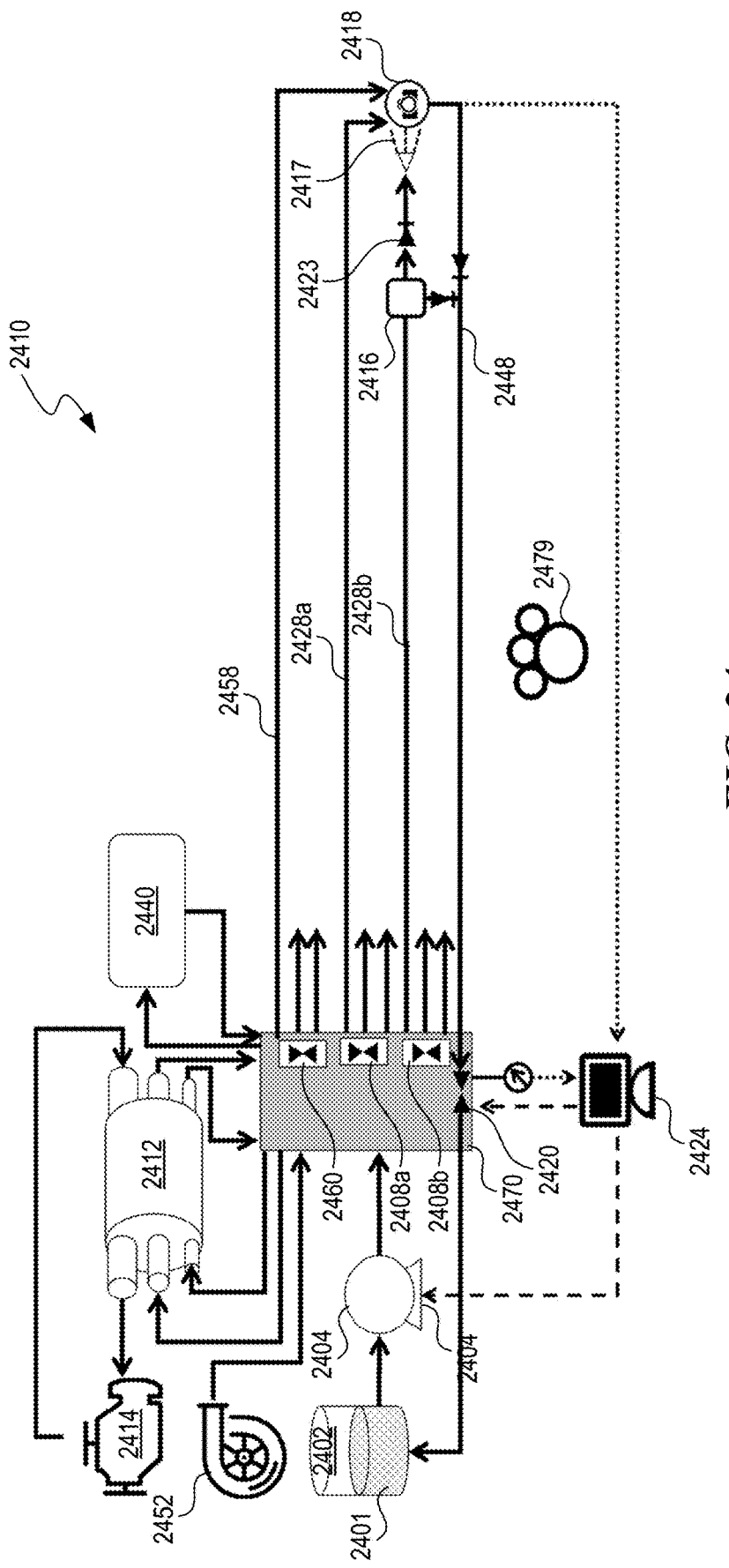
FIG. 24 is a schematic illustration of a perception surface cleaning, drying, and thermal management system configured in accordance with an embodiment of the present technology.
Figure 25:
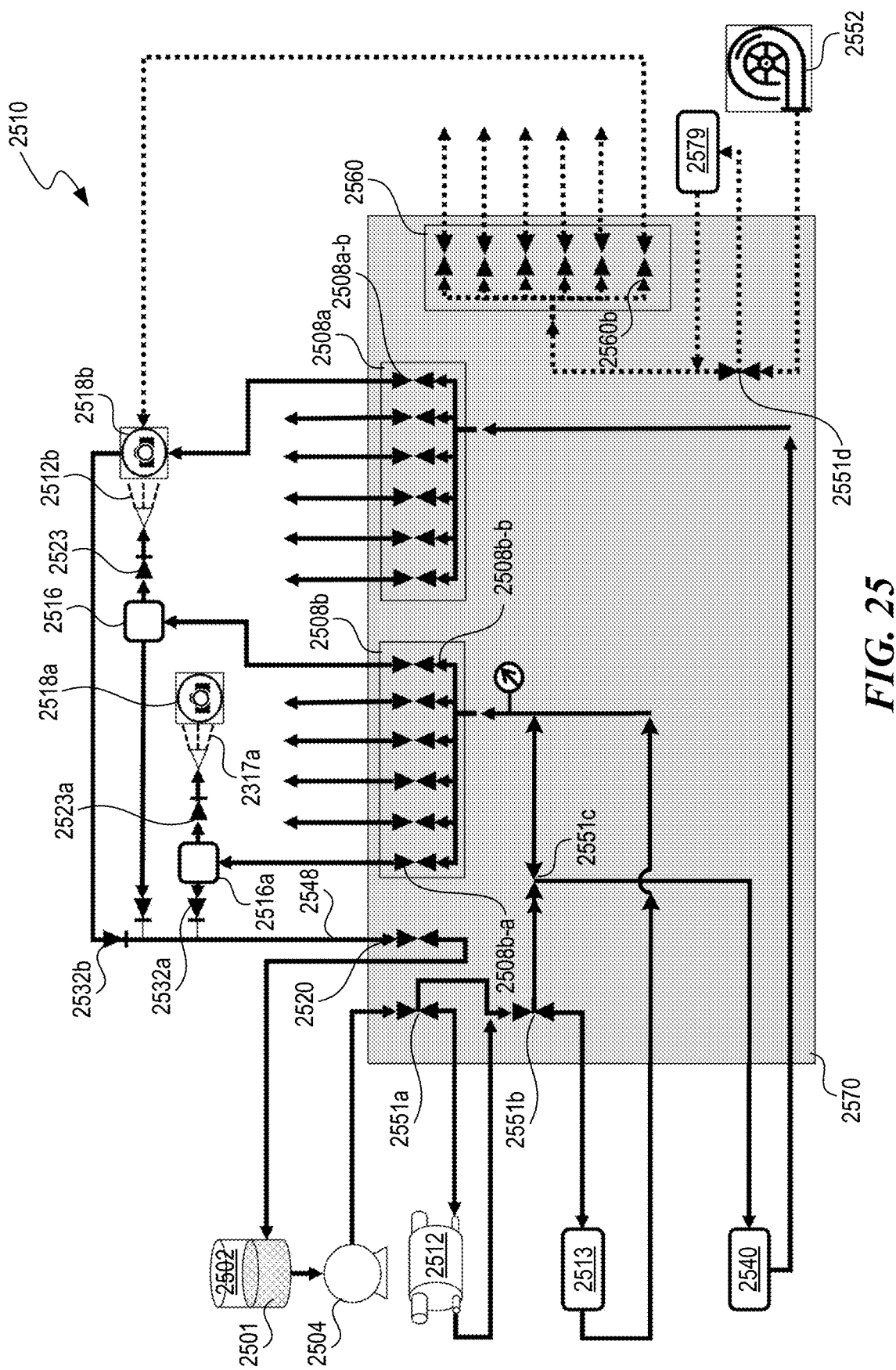
FIG. 25 is a schematic illustration of a perception surface cleaning, drying, and thermal management system configured in accordance with another embodiment of the present technology.

Accordingly, FIGS. 24 and 25 are schematic illustrations more specifically illustrating various embodiments of closed-loop systems for cleaning, drying, and thermally managing vehicle components configured in accordance with embodiments of the present technology. The detailed description of each embodiment focuses mainly on those components that are new/different as compared to other embodiments. However, one skilled in the art will appreciate that the various embodiments can (i) include the same or generally similar features (e.g., components, configurations, etc.), (ii) operate the same or generally similarly, and/or (iii) that the various embodiments can be combined. Further, one skilled in the art will appreciate that the various embodiments discussed with reference to FIGS. 24 and 25 can (i) include the same or generally similar features (e.g., components, configurations, etc.) as those embodiments discussed with reference to FIGS. 2-23, (ii) operate the same or generally similarly as those embodiments discussed with reference to FIGS. 2-23, and/or (iii) that the various embodiments can be combined with each other and/or with the embodiments discussed with reference to FIGS. 2-23. Moreover, one of ordinary skill in the art will appreciate that the number of components can vary in the following embodiments. For example, the systems of the present technology can have any number of delivery channels, return channels, sensors, heaters, chillers, heat exchangers, nozzles, etc.

FIG. 24 is a schematic illustration of a vehicle component cleaning, drying, and thermal management system 2410 configured in accordance with an embodiment of the present technology. In the illustrated embodiment, a washer fluid pump 2404 is configured to pump washer fluid 2401 from a reservoir 2402 to a delivery system 2470 having a plurality of first fluid delivery valves 2408a, a plurality of second fluid delivery valves 2408b, a plurality of air delivery valves 2460, and a plurality of return valves 2420. A fluid heater 2412 (e.g., a parasitic heater configured to transfer heat generated by a vehicle engine 2414 (or other system) to the fluid 2401) and a fluid cooler or chiller 2440 are individually connected to the delivery system 2470. The delivery system 2470 is configured to route all or a portion of the fluid 2401 to the fluid heater 2412 and/or to the fluid cooler 2440 to heat/cool the fluid 2401. The system 2410 also includes an air source 2452 configured to provide air flow to the delivery system 2450 (e.g., to an air manifold).

The air delivery valves 2460 can be selectively opened/closed to allow air to flow from the delivery system 2470 and along one or more parallel air delivery channels 2458 to air delivery nozzles (not shown) configured to direct the air against perception sensors 2418. The first fluid delivery valves 2408a can be selectively opened/closed to permit the heated/cooled fluid 2401 to flow from the delivery system 2470 and along one or more parallel first fluid delivery channels 2428a to corresponding heat exchangers (not shown) configured to heat and/or cool the perception sensors 2418. The second fluid delivery valves 2408b can be selectively opened/closed to permit the heated/cooled fluid 2401 to flow from the delivery system 2470 and along one or more parallel second fluid delivery channels 2428b to holding chambers 2416 and pre-nozzle delivery valves 2423 (e.g., controller-operable solenoid valves, check valves, etc.). Each of the pre-nozzle delivery valves 2423 is configured to selectively route the fluid 2401 to a nozzle 2417 configured to spray the fluid 2401 onto a corresponding one of the sensors 2418. The fluid 2401 from the heat exchangers and/or recirculated from the holding chambers 2416 is aggregated in a single, common return channel 2448.

A controller 2424 can be operably coupled to the pump 2404, the air source 2452, the delivery system 2470, the sensors 2418, temperature sensors, pressure sensors, and/or other components. When the controller 2424 determines that one or more of the sensors 2418 are occluded and/or require thermal management, the controller 2424 can operate the pump 2404 and the delivery system 2470 to selectively heat and/or cool the fluid 2401 before opening one or more of the first fluid delivery valves 2408a and/or the second fluid delivery valves 2408b to route the heated/cooled fluid 2401 along the first fluid delivery channels 2428a and/or the second fluid delivery channels 2428b corresponding to the sensors 2418 requiring cleaning and/or thermal management. Similarly, the controller 2424 can control the air source 2452 and/or selectively open one or more of the air delivery valves 2460 to provide air flow to the occluded sensors 2418. In some embodiments, air can be delivered after the fluid 2401 to, for example, dry the sensors 2418. In other embodiments, the fluid 2401 and air can be delivered simultaneously, or air can be delivered before the fluid 2401.

In some embodiments, to simplify plumbing of the various channels, a quad-lumen tubing 2449 can be used—wherein (i) a first lumen carries the fluid 2401 traveling from the delivery system 2470 to the holding chambers 2416, (ii) a second lumen carries the fluid 2401 returning/recirculating from the heat exchangers and/or holding chambers 2416 to the delivery system 2470 and the reservoir 2402, (iii) a third lumen carries cooling fluid from the delivery system 2470 to the heat exchangers, and (iv) a fourth lumen carries air from the delivery system 2470 to the sensors 2418.

FIG. 25 is a schematic illustration of a vehicle component cleaning, drying, and thermal management system 2510 configured in accordance with another embodiment of the present technology. The system 2510 is generally similar to the system 2410 described in detail with reference to FIG. 34, but the valving of delivery system 2570 is illustrated in greater detail. In the illustrated embodiment, a washer fluid pump 2504 is configured to pump washer fluid 2501 from a reservoir 2502 to the delivery system 2570. A first 3-way valve 2551a receives the flow of the fluid 2501 and either directs the flow to a parasitic heater 2512 or bypasses the flow past the parasitic heater 2512. In either case, a second 3-way valve 2551b receives the flow of the fluid 2501 and directs the flow to an electric heater 2513 or bypasses the flow past the electric heater 2513. Any of the fluid 2501 exiting the electric heater 2513 is routed to second fluid delivery valves 2508b. Any of the fluid 2501 bypassing the electric heater 2513 is received by a third 3-way valve 2551c and directs the flow (i) to the second fluid delivery valves 2508b or (ii) to a fluid chiller or cooler 2540 for cooling. Cooled fluid 2501 from the fluid cooler is directed to first fluid delivery valves 2508a. The first fluid delivery valves 2508a can be selectively opened/closed to permit the cooled fluid 2501 to flow from the delivery system 2570 and along one or more parallel first fluid delivery channels 2528a to corresponding heat exchangers (not shown) configured to heat and/or cool nearby perception sensors 2518. The second fluid delivery valves 2508b can be selectively opened/closed to permit the heated/unheated fluid 2501 to flow from the delivery system 2570 and along one or more parallel second fluid delivery channels 2528b to holding chambers 2516 and pre-nozzle check valves 2523 (e.g., controller-operable solenoid valves, check valves, etc.). While six first fluid delivery channels 2528a and six second fluid delivery channels 2528b are shown in FIG. 25, the system 2510 can include any number of delivery channels.

To provide hot fluid 2501 during normal hot engine operation, the delivery system 2570 is configured to route the fluid 2501 (i) from the first 3-way valve 2551a to the parasitic heater 2512, (ii) from the parasitic heater 2512 to the second 3-way valve 2551b, (iii) from the second 3-way valve 2551b to the second fluid delivery valves 2508b. To provide hot fluid 2501 during engine startup (or when the parasitic heater 2512 is otherwise unable to provide heated fluid), the delivery system 2570 is configured to route the fluid 2501 (i) from the first 3-way valve 2551a to the second 3-way valve 2551b bypassing the parasitic heater 2512, (ii) from the second 3-way valve 2551b to the electric heater 2513, and (iii) from the electric heater 2513 to the second fluid delivery valves 2508b. To provide unheated fluid 2501, the delivery system 2570 is configured to route the fluid 2501 (i) from the first 3-way valve 2551a to the second 3-way valve 2551b bypassing the parasitic heater 2512, (ii) from the second 3-way valve 2551b to the third 3-way valve 2551c bypassing the electric heater 2513, and (iii) from the third 3-way valve 2551c to the second fluid delivery valves 2508b bypassing the fluid cooler 2540. To provide cooled fluid 2501, the delivery system 2570 is configured to route the fluid 2501 (i) from the first 3-way valve 2551a to the second 3-way valve 2551b bypassing the parasitic heater 2512, (ii) from the second 3-way valve 2551b to the third 3-way valve 2551c bypassing the electric heater 2513, and (iii) from the third 3-way valve 2551c to fluid cooler 2540, and (iv) from the fluid cooler 2540 to the first fluid delivery valves 2508a.

As one example, in the illustrated embodiment a first perception sensor 2518a needs to be cleaned and so hot fluid 2501 is directed to its surface by opening a first one of the second fluid delivery valves 2508b-a and closing a return valve 2520 of the delivery system 2570 so that the pressure in a first holding chamber 2516a exceeds the cracking pressure of a first pre-nozzle check valve 2523a and the fluid 2501 flows through and exits a first nozzle 2517a. To maintain hot fluid 2501 in the first holding chamber 2516a, the fluid 2501 may be recirculated by opening (i) the first one of the second fluid delivery valves 2508b-a and (ii) opening the return valve 2520 while pumping heated fluid 2501 to the second fluid delivery valves 2508b. The fluid 2501 returning to the reservoir 2502 goes through a first return check valve 2532a to a single return channel 2548 connected to the return valve 2520

The system 2510 further includes an air source 2552 connected to the delivery system 2570. In the illustrated embodiment, a fourth 3-way valve 2551d receives the air flow from the air source 2552 and directs the air flow (i) to an air heater 2579 (which could be the parasitic heater 2512 and/or the electric heater 2513) or (ii) to bypass the air heater 2579. In either case, the air is directed to air delivery valves 2560. The air delivery valves 2560 can be selectively opened/closed to allow air to flow from the delivery system 2570 and along one or more parallel air delivery channels 2558 to air delivery nozzles (not shown) configured to direct the air against the sensors 2518.

As a second example, in the illustrated embodiment a second perception sensor 2518b needs to be cleaned, cooled, and air dried. Accordingly, heated fluid 2501 can be directed to a second nozzle 2517b by opening a second one of the second fluid delivery valves 2508b-b and closing the return valve 2520, as described in detail above. Similarly, a cooled fluid 2501 can be directed to the second perception sensor 2518b by opening a second one of the first fluid delivery valves 2508a-b and opening the return valve 2520. The fluid 2501 used to cool the second perception sensor 2518b is subsequently returned to the delivery system 2570 via a second return check valve 2532b to the return channel 2548. Similarly, heated or unheated air can be directed against the second perception sensor 2518b by opening a second one of the air delivery valves 2560b.

In some embodiments, any of the 3-way valves 2551a-2551d can be variable aperture valves or other types of valves.

VII. SELECTED EMBODIMENTS OF PERCEPTION SURFACE CLEANING SYSTEMS WITH MULTIPLE DELIVERY SYSTEMS

Referring again to FIG. 1, in some embodiments of the present technology a cleaning system (e.g., the cleaning system 110) can distribute fluids to clean and/or cool vehicle components (e.g., the sensors 108 and/or the perception surfaces 109) using any suitable combination of valves, manifolds, etc. For example, in some embodiments the cleaning system 110 can distribute fluid to one or more channels by selectively opening/closing one or more valves (e.g., electrically-actuated solenoid valves) co-located at (e.g., mounted to or built into) a shared delivery system or manifold. In other embodiments, the valves may be located distant from one another. In other embodiments, the cleaning system 110 includes one or more rotary valves that are adjustable to distribute the fluid to the channels.

In some embodiments, the cleaning system includes two or more delivery systems arranged hierarchically. That is, for example, a central collection of valves (e.g., a first or central delivery system) can route fluid to a plurality of first channels which can each distribute the fluid (i) either to a vehicle component to be cleaned (ii) or to another collection of valves (e.g., a second or peripheral delivery system), which can route the fluid on to one or more second channels. In some such embodiments, each delivery system is configured to selectively direct flow to between three and eight channels, using between three and eight valves. In some embodiments, the delivery systems are connected in series to comprise a system capable of selectively directing flow to a larger number of channels. In some embodiments, if the delivery systems provide more channels than are required, one or more of the channels can be plugged instead of fluidly connected to a valve. In some embodiments, each delivery system connects to an electronic circuit board (e.g., via a modular electrical connector) configured to control the function of the valves.

In one aspect of the present technology, the use of multiple delivery system is advantageous when multiple sensors are located near to each other but remote from a central delivery system. For example, a central delivery system may be in the engine compartment of a vehicle, a cluster of sensors may be located on the rear bumper of the vehicle, and another cluster of sensors may be located on the roof of the vehicle. By utilizing multiple delivery systems to hierarchically route the fluid, the length and size of tubing traversing the vehicle may be greatly reduced.

Figure 26:
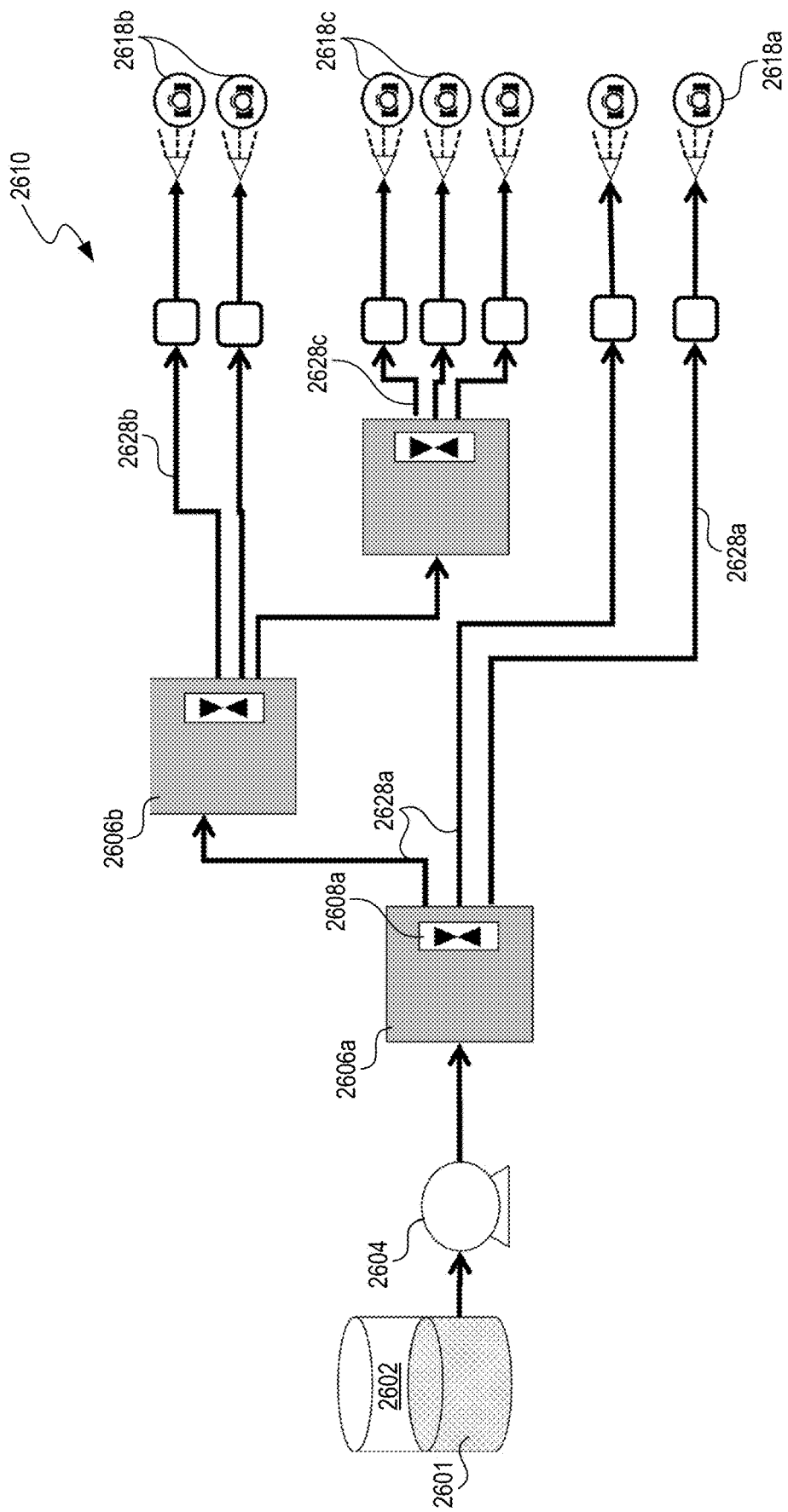
FIG. 26 is a schematic illustration of a perception surface cleaning system including multiple, hierarchically arranged delivery systems configured in accordance with an embodiment of the present technology.
Figure 27:
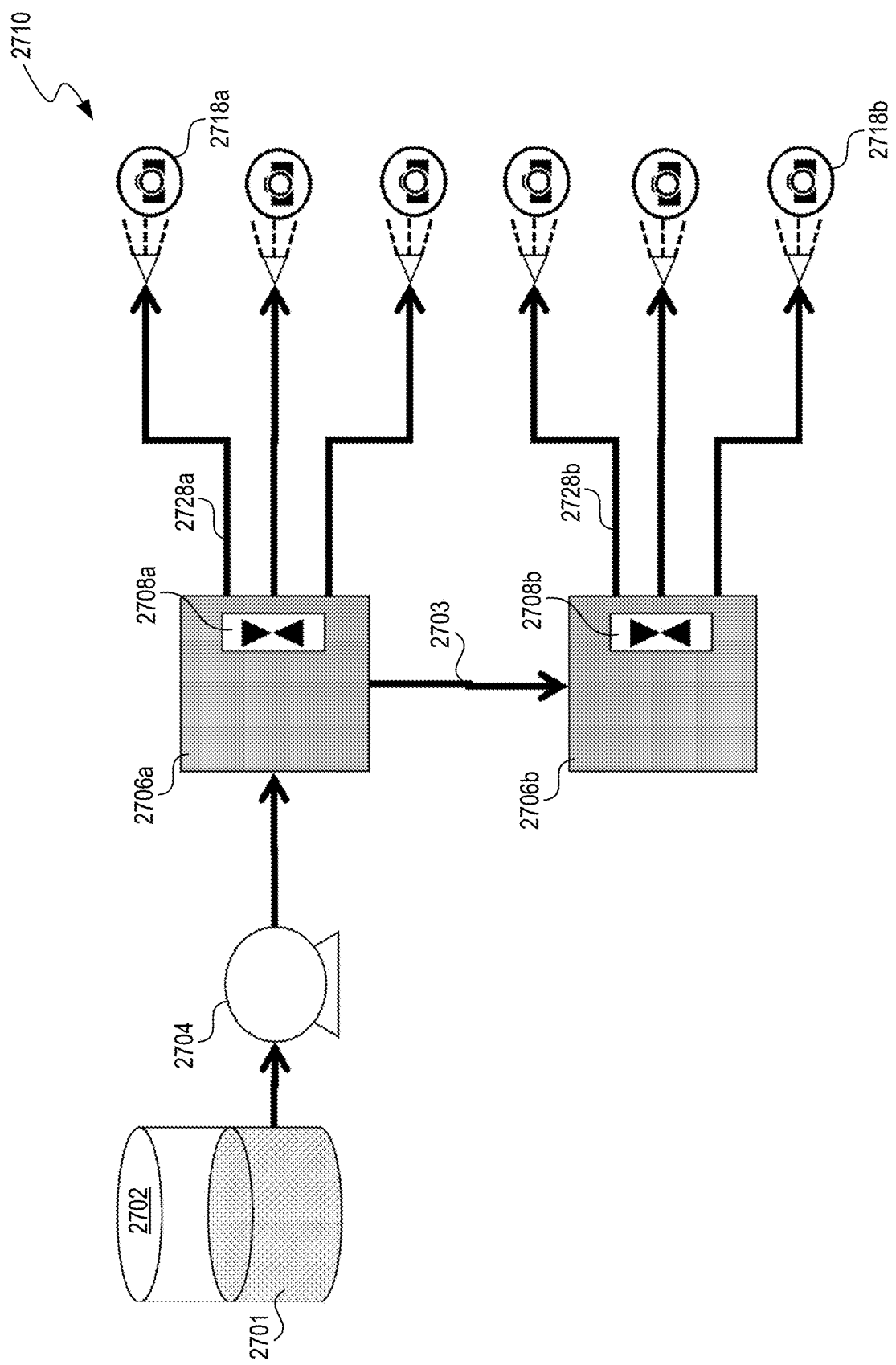
FIG. 27 is a schematic illustration of a perception surface cleaning system including multiple parallel delivery systems configured in accordance with an embodiment of the present technology.
Figure 28:
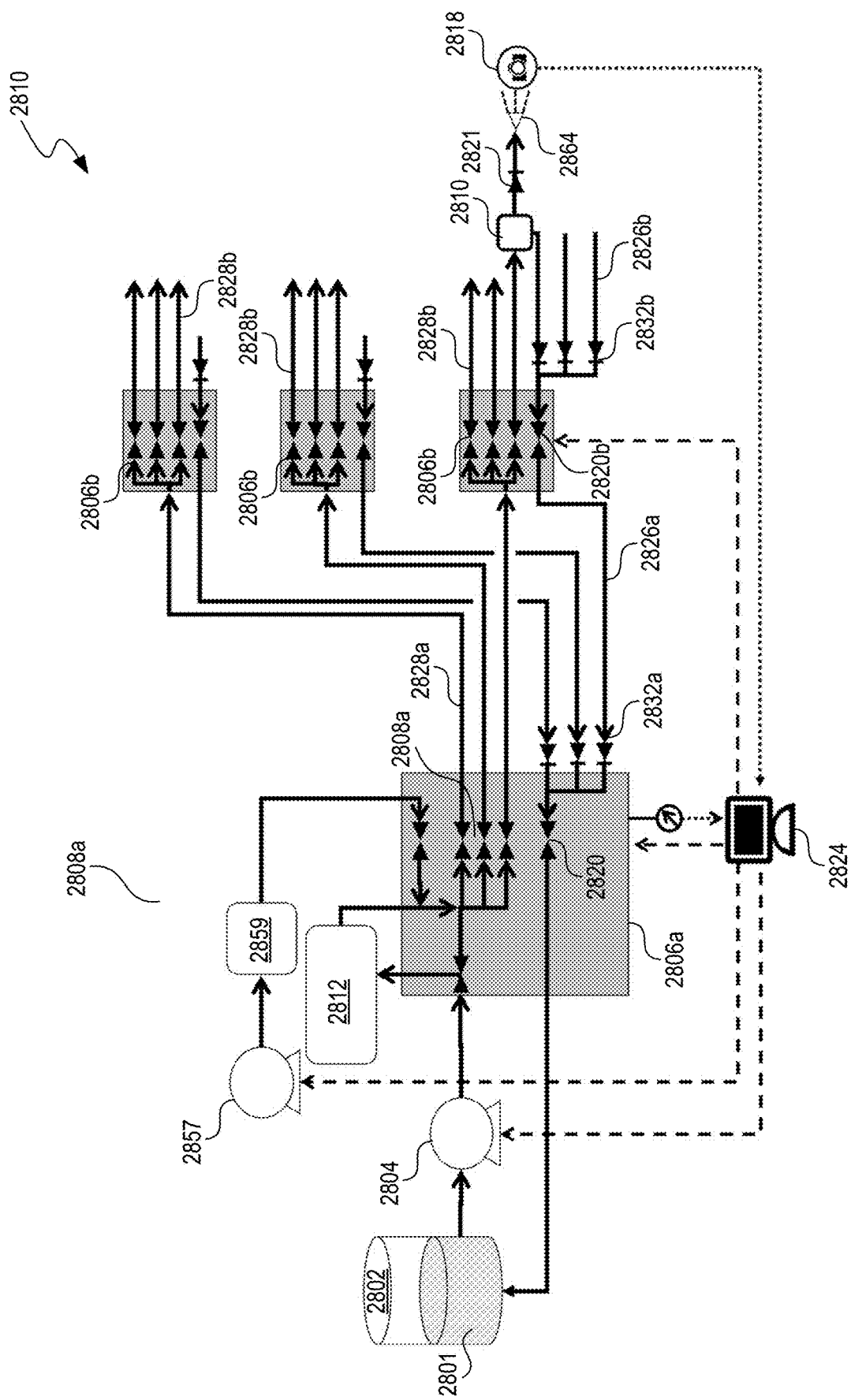
FIG. 28 is a schematic illustration of a perception surface cleaning system including multiple delivery systems configured in accordance with another embodiment of the present technology.

Accordingly, FIGS. 26-28 are schematic illustrations more specifically illustrating various embodiments of closed-loop systems for cleaning vehicle components and including multiple, distributed delivery systems configured in accordance with embodiments of the present technology. The detailed description of each embodiment focuses mainly on those components that are new/different as compared to other embodiments. However, one skilled in the art will appreciate that the various embodiments can (i) include the same or generally similar features (e.g., components, configurations, etc.), (ii) operate the same or generally similarly, and/or (iii) that the various embodiments can be combined. Further, one skilled in the art will appreciate that the various embodiments discussed with reference to FIGS. 26-28 can (i) include the same or generally similar features (e.g., components, configurations, etc.) as those embodiments discussed with reference to FIGS. 2-25, (ii) operate the same or generally similarly as those embodiments discussed with reference to FIGS. 2-25, and/or (iii) that the various embodiments can be combined with each other and/or with the embodiments discussed with reference to FIGS. 2-25. Moreover, one of ordinary skill in the art will appreciate that the number of components can vary in the following embodiments. For example, the systems of the present technology can have any number of delivery channels, return channels, sensors, heaters, chillers, heat exchangers, nozzles, etc.

FIG. 26 is a schematic illustration of a perception surface cleaning system 2610 including multiple, hierarchically arranged delivery systems configured in accordance with an embodiment of the present technology. In the illustrated embodiment, the system 2610 includes a washer fluid pump 2604 configured to pump washer fluid 2601 from a reservoir 2602 to a first delivery system 2606a (e.g., a manifold, valve system, etc.) having a plurality of first fluid delivery valves 2608a. The first fluid delivery valves 2608a can be selectively opened/closed to permit the fluid 2601 to flow from the first delivery system 2606a and along one or more first delivery channels 2628a. The first delivery channels 2628a can direct the fluid 2601 to one or more additional delivery systems 2606 (e.g., a second delivery system 2606b shown in FIG. 26) and/or one or more first perception sensors 2618a to clean the first perception sensors 2618a. The second delivery system 2606b includes a plurality of second fluid delivery valves 2608b configured to selectively route the fluid 2601 along one or more second delivery channels 2628b to one or more additional delivery systems 2606 (e.g., a third delivery system 2606c shown in FIG. 26) and/one or more second perception sensors 2618b to clean the second perception sensors 2618b. The third delivery system 2606c includes a plurality of third fluid delivery valves 2608c configured to selectively route the fluid 2601 along one or more third delivery channels 2628c to one or more third perception sensors 2618c to clean the third perception sensors 2618c. Accordingly, in the arrangement shown in FIG. 26, the delivery systems 2606 are arranged in series.

FIG. 27 is a schematic illustration of a perception surface cleaning system 2710 including multiple delivery systems configured in accordance with an embodiment of the present technology. In the illustrated embodiment, the system 2710 includes a washer fluid pump 2704 configured to pump washer fluid 2701 from a reservoir 2702 to a first delivery system 2706a (e.g., a manifold, valve system, etc.) having a plurality of first fluid delivery valves 2708a. The first fluid delivery valves 2708a can be selectively opened/closed to permit the fluid 2701 to flow from the first delivery system 2706a and along one or more first delivery channels 2728a to clean first perception sensors 2718a. In the illustrated embodiment, the system 2710 further includes a second delivery system 2706b connected to the first delivery system 2706a via a fluid channel 2703 such that the first delivery system 2706a and the second delivery system 2706b are arranged in parallel. The second delivery system 2706b includes a plurality of second fluid delivery valves 2708b that can be selectively opened/closed to permit the fluid 2701 to flow from the second delivery system 2706b and along one or more second delivery channels 2728b to clean second perception sensors 2718b. In other embodiments, one or more additional delivery systems can be arranged in parallel with the first delivery system 2706a and/or the second delivery system 2706b to, for example, increase the number of fluid distribution channels available in a given region of a vehicle. In some embodiments, the first delivery system 2706a and the second delivery system 2706b are modular systems.

FIG. 28 is a schematic illustration of a perception surface cleaning system 2810 including multiple delivery systems configured in accordance with another embodiment of the present technology. More particularly, the system 2810 includes several features generally similar to the system 2210 described in detail above with reference to FIG. 22 but, in the illustrated embodiment, the system 2810 includes multiple hierarchically arranged delivery systems 2850, including a central delivery systems 2850a and a plurality of peripheral delivery systems 2850b. In some embodiments, the peripheral delivery systems 2850b can be closer to perception sensors 2818 than the central delivery system 2850a. In one aspect of the present technology, this architecture may be advantageous when the sensors 2818 are arranged in clusters remote from the central delivery system 2850a. For example, the central delivery system 2850a may be in the engine compartment of a vehicle, while the sensors 2818 may be located in clusters on the rear bumper of the vehicle, on the roof of the vehicle, etc. By utilizing multiple delivery systems to hierarchically route washer fluid, the length and size of tubing traversing the vehicle may be greatly reduced.

In the illustrated embodiment, a pump 2804 is configured to deliver washer fluid 2801 from a reservoir 2802 to the central delivery system 2850a for heating via a heater 2812. An air source comprising an air compressor 2857 and a compressed air accumulator 2859 is configured to provide air flow to the central delivery system 2850a, which includes a plurality of central delivery valves 2808a. The central delivery valves 2808a can be selectively opened/closed to divide and deliver the fluid 2801 and/or air along one or more parallel first delivery channels 2828a to the peripheral delivery systems 2850b.

Individual ones of the peripheral delivery systems 2850b can include peripheral delivery valves 2808b that can be selectively opened/closed to divide and deliver the fluid 2801 and/or air along one or more parallel second delivery channels 2828b to holding chambers 2816. Each of the holding chambers 2816 is fluidly connected to an air and fluid delivery nozzle 2864 via a pre-nozzle check valve 2821. The pre-nozzle check valves 2821 are configured to selectively fluidly connect the holding chambers 2816 to corresponding (i) ones of the nozzles 2864 or (ii) second return channels 2826b configured to return the fluid 2801 and/or air to the peripheral delivery systems 2850b and, more particularly, through second return valves 2820b of the peripheral delivery systems 2850b. For example, in the illustrated embodiment each of the second return channels 2826b includes a second return check valve 2832b, and the second return channels 2826b are merged together (e.g., via a T-connector) into a single channel received by the corresponding one of the second return valves 2820b. Each of the peripheral delivery systems 2850b is, in turn, further connected to the central delivery system 2850a via first return channels 2826a. The first return channels 2826a can each include a first return check valve 2832a and can be merged together (e.g., via a T-connector) into a single channel received by a single first return valve 2820a of the central delivery system 2850a. As described in detail above, this arrangement allows for the recirculation of the fluid 2801 and/or air from the holding chambers 2816 to the fluid reservoir 2802.

A controller 2824 can be operably coupled to the pump 2804, the air source (e.g., the air compressor 2857), the central delivery system 2850a, the peripheral delivery systems 2850b, the sensors 2818, and any one or combination of additional sensors (e.g., temperature sensors, pressure sensors, etc.) When the controller 2824 determines that one or more of the sensors 2818 are occluded, the controller 2824 can route the fluid 2801 and/or air to the nozzles 2864 corresponding to the occluded sensors 2818 to clean and/or dry the corresponding occluded sensors 2818. More specifically, the controller 2824 can close the first return valve 2820a of the central delivery system 2850a and the second return valve 2820b of the corresponding peripheral delivery system 2850b while operating the pump 2804 and/or the air source (e.g., the air compressor 2857) to increase the pressure in the second delivery channels 2828b above the cracking-pressure of the pre-nozzle check valves 2821. To recirculate the fluid 2801, both the first return valve 2820a of the central delivery system 2850a and the second return valve 2820b of the corresponding one of the peripheral delivery systems 2850b can be opened, and the pump 2804 and/or the air source activated to recirculate the fluid 2801 and/or air to the reservoir 2802. The first return check valves 2832a and the second return check valves 2832b are configured to inhibit backflow during recirculation.

VIII. SELECTED EMBODIMENTS OF FLUID HOLDING, FLUID HEATING, AND/OR FORCED AIRFLOW DEVICES

As described in detail above, some embodiments of the present technology can include fluid holding chambers configured to receive fluid (e.g., washer fluid) and hold and/or heat the fluid before delivering the fluid to a nozzle. In some embodiments, the fluid is heated and held within a desired temperature range within the holding chambers so that it is ready to be delivered. The holding chambers can be positioned proximate to the nozzles to, for example, reduce the distance the heated fluid must travel for delivery and therefore reduce fluid heat loss. In some embodiments, a flow divider can be connected to and/or integrally formed with one or more of the holding chambers such that the heated fluid can be subdivided after leaving the holding chamber for, for example, delivery to multiple perception surfaces or sensors.

In one aspect of the present technology, the holding chambers are configured to hold a minimum volume of fluid such that they can (i) vary a fluid pulse volume and/or (ii) deliver a series of fluid pulses in a short period of time. The larger the volume of fluid, the more energy is required for heating, and the longer the fluid will take to heat. Accordingly, the volume of fluid held within each of the heating chambers can be between an upper limit and a lower limit relative to a desired pulse volume. In some embodiments, each of the holding chambers can hold between one and five times the expected pulse volume for a particular channel. For example, if a sensor's required average fluid pulse is five milliliters, the holding chamber can hold between 5-25 milliliters of fluid. Likewise, if a sensor's required average fluid pulse is 25 milliliters, the holding chamber can hold between 25-125 milliliters of fluid. In certain embodiments, the holding chambers are configured to hold about two times the expected pulse volume for an associated sensor surface.

Heat loss from a holding chamber to its surroundings is inefficient and wastes vehicle energy. Accordingly, in some embodiments the heating chambers are configured to minimize heat loss to the surrounding environment. For example, the holding chambers can be designed to minimize a ratio of surface area to volume to minimize heat transfer away from the holding chambers. For example, the heating chambers can have a ratio of surface area (SA) to volume (V) of about 1 $cm^{-1}$, or about the value defined by the function $SA/V=6.2V^{-0.33}$. Moreover, the holding chambers can be thermally insulated. For example, outer surfaces of the holding chambers can be fully or partially covered by an insulating material which reduces conductive heat transfer to the outer surfaces. In some embodiments, each of the holding chambers can be insulated by an outer shell which is separated from the outer surface of the heating chamber by a gap (e.g., an air gap, a vacuum gap, etc.). In yet other embodiments, the outer surfaces of the holding chambers can be covered with material (e.g., a thin layer of foil or other reflective material) which reflects radiated heat emitted from the chambers back into the chambers.

As cooler fluid may be less effective at cleaning surfaces than hotter fluid, delivery of fluid not within the desired temperature range should be minimized. Accordingly, in some embodiments the heating chambers can be located proximate to the nozzles configured to deliver the fluid for cleaning perception sensors or other vehicle components. This can minimize the heat lost by the fluid during transport from the holding chambers to the perception sensors. More specifically, in some embodiments the volume of fluid located in the flow path between the heating chambers and the nozzles is less than 20% of the volume of the average fluid pulse for the corresponding channels. For example, if a fluid pulse of 10 milliliters is used to clean a specific sensor, the volume of fluid between the heating chamber and the nozzle can be less than 2 milliliters. If this fluid is contained within a four-millimeter inner diameter hose, this equates to roughly 15 centimeters of hose length. As a further example, if a fluid pulse of 50 milliliters is used to clean a sensor, the volume of fluid between the heating chamber and the nozzle can be less than about 10 milliliters, or roughly 80 centimeters of four-millimeter inner diameter tubing.

In some embodiments, the fluid channels between the heating chambers and the nozzles can be insulated (e.g., covered with insulation) to reduce conductive and/or radiative heat transfer. In some embodiments, one one-way check valves are built into the heating chambers such that fluid may flow in a direction from the chamber to the nozzle, but not from the nozzle to the heating chamber.

In some embodiments, holding chambers can be configured as heating chambers including heating elements (e.g., electric heating elements) for heating washer fluid therein. In some embodiments, the heating chambers include a phase change material (PCM) used to store thermal energy and to provide the thermal energy to washer fluid flowing into the heating chambers. The electric heating elements may heat the fluid directly, or the electric heating elements may heat the PCM directly, and heat may be transferred to the fluid from the PCM. As described in detail above, in some embodiments unheated fluid is pumped into a holding chamber after fluid is delivered from a holding chamber through a nozzle to replace the delivered fluid. With electric heating only, the speed at which this fluid is heated to the desired temperature is limited by the power of the heater, which in turn may be limited by available electric current from the vehicle. However, when a PCM is present, a substantial amount of thermal energy is available at a constant temperature until the PCM has completely changed phase. Therefore, a lower rate of electric heating may be provided to a heating chamber when washer fluid is not being pumped, and a portion of this energy may be stored in the PCM so that it can be quickly extracted when needed. In some embodiments, a specific PCM can be selected to limit the upper temperature of the washer fluid. For example, the upper limit can be between about 50-65° C. As heat is applied to the PCM, the temperature of the fluid in the holding chamber will rise until it reaches the phase change temperature of the PCM. At that temperature, the addition of thermal energy does not raise the temperature, but rather drives the PCM's phase transition (for example, from solid to liquid phase). In this manner, heating via a PCM may be used as protection for over-heating the fluid. Moreover, the time in which the PCM may heat fluid is limited only by the heat transfer properties internal to the system, which may enable much faster heating than with electric heating only and/or may allow the system to use a lower peak electric current.

In some embodiments, heating chambers are configured to enable the delivery of forced air. For example, in some embodiments a heating chamber can include (i) a fluid inlet port for receiving fluid into the heating chamber, (ii) an air inlet port for receiving airflow into the heating chamber or a separate chamber, and (iii) one or more outlet ports for connecting the air flow and fluid flow to a nozzle. In some such embodiments, the forced air pathway connects with the fluid pathway after the heating chamber such that airflow does not disrupt the contents of the heating chamber, but forces fluid from the outlet port and the nozzle such that air is emitted from the nozzle (e.g., onto a vehicle component to be cleaned). In other embodiments, the forced air pathway connects with the fluid pathway within the heating chamber such that airflow forces fluid from the heating chamber through the nozzle before air flows from the nozzle onto the perception surface to be cleaned. Following the delivery of fluid and air, a fluid pump can refill the heating chamber with washer fluid.

In some embodiments, forced air can be delivered to evacuate fluid tubing to, for example, inhibit of even prevent fluid from freezing within the tubing. For example, a fluid heating and forced airflow device can include a channel including a fluid valve which regulates fluid flow into the channel, a fluid lumen carrying fluid to a heating chamber, an air valve which regulates air flow into the channel, an air lumen carrying air to a point where it joins the fluid outflow of the heating chamber, and a check valve configured to prevent fluid flow into the air lumen. When fluid delivery is desired, the fluid valve can be opened, and a fluid pump can push fluid through the fluid lumen, the heating chamber, and a nozzle configured to receive the fluid and air outflow and direct it against a vehicle component. When air delivery is desired, the fluid pump can be turned off, the fluid valve can be closed, and the air valve can be opened to allow airflow to eject fluid from a short span of tubing between the heating chamber and the nozzle before spraying air on the perception surface. When evacuation of the system is desired for freeze protection, the air valve can be opened to allow air flow to eject liquid from the span of tubing between the heating chamber and the nozzle, and then the fluid valve can be opened to allow the forced air to push fluid out of the heating chamber and out of fluid lumen back into a fluid reservoir. When the system is restarted, the fluid pump can refill the fluid lumen and heating chamber with fluid.

In some embodiments, a heating chamber is configured to enable self-pumping. For example, the heating chamber can include (i) a fluid inlet port controlled by a one-way check valve that only allows fluid flow from the fluid inlet port into the heating chamber and (ii) a fluid outlet port controlled by a variable (e.g., solenoid) valve. Washer fluid can be heated within the heating chamber to a temperature above the boiling point of methanol, causing a rapid rise in the pressure within the heating chamber. When methanol boils, its vapor phase accumulates at the top of the heating chamber, while washer fluid exits towards the solenoid valve and a nozzle from the bottom of the heating chamber. When the solenoid valve opens, the expanding gas forcibly ejects the fluid through the nozzle. When the solenoid valve is closed, the remaining fluid in the chamber will cool, creating a vacuum, pulling fluid from the reservoir back into the chamber.

FIGS. 29-36 are cross-sectional views more specifically illustrating various embodiments of fluid holding, fluid heating, and/or forced airflow devices configured in accordance with embodiments of the present technology. The detailed description of each embodiment focuses mainly on those components that are new/different as compared to other embodiments. However, one skilled in the art will appreciate that the various embodiments can (i) include the same or generally similar features (e.g., components, configurations, etc.), (ii) operate the same or generally similarly, and/or (iii) that the various embodiments can be combined. Further, one skilled in the art will appreciate that the various embodiments discussed with reference to FIGS. 29-36 can be combined/incorporated with each other and/or the embodiments discussed with reference to FIGS. 2-28.

Figure 29:
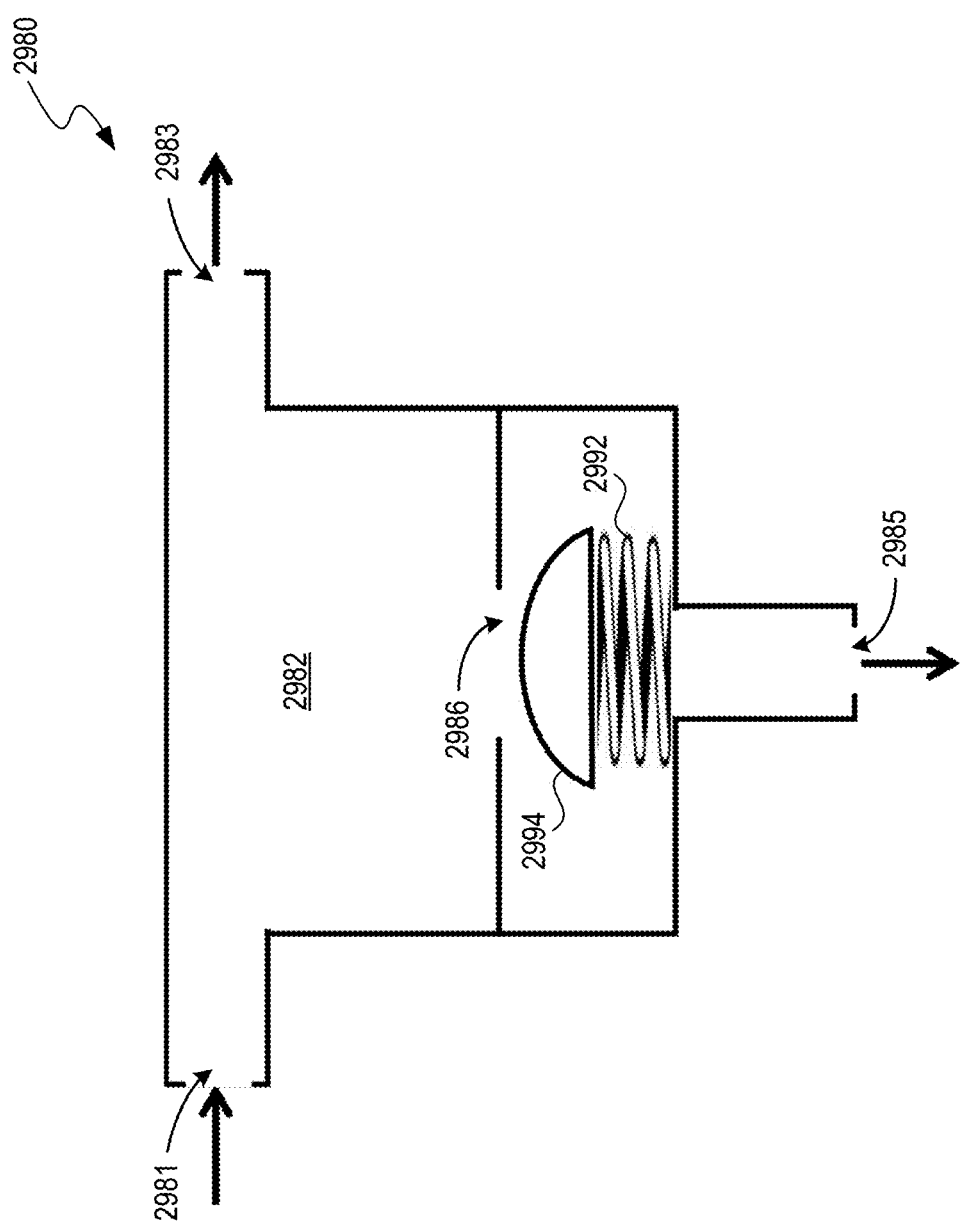
FIG. 29 is a cross-sectional view of a fluid holding device configured in accordance with an embodiment of the present technology.

FIG. 29 is a cross-sectional view of a fluid holding device 2980 configured in accordance with an embodiment of the present technology. In the illustrated embodiment, the fluid holding device 2980 includes a fluid holding chamber 2982 connected to an inlet port 2981, a return/recirculation port 2983, and an outlet port 2985. The fluid holding device 2980 further includes a pressure-actuated check valve (e.g., a pre-nozzle check valve) comprising a spring 2992 and a seal 2994. The seal 2994 is configured to block/seal a check valve aperture 2986 to prevent fluid from flowing from the holding chamber 2982 through the outlet port 2985. More specifically, the check valve aperture 2986 remains blocked when the pressure within the holding chamber 2982 is too low to compress the spring 2992 and depress the seal 2994. However, when the pressure in the holding chamber 2982 exceeds the cracking pressure, the spring 2992 compresses and depresses the seal 2994—unsealing the check valve aperture 2986 and allowing fluid (e.g., washer fluid) to exit via the outlet port 2985 and to flow to, for example, a delivery nozzle.

In one aspect of the embodiment illustrated in FIG. 29, the fluid holding device 2980 includes an integrated check-valve. Therefore, in some embodiments the fluid holding device 2980 comprises a single device that could be incorporated into any of the embodiments described in detail above to integrate a holding chamber into a pre-nozzle check valve. As one representative example, the fluid holding device 2980 could be incorporated into the system 1110 described in detail with reference to FIG. 1110 to replace any pair of the holding chambers 1116 and the pre-nozzle check valves 1121.

Figure 30:
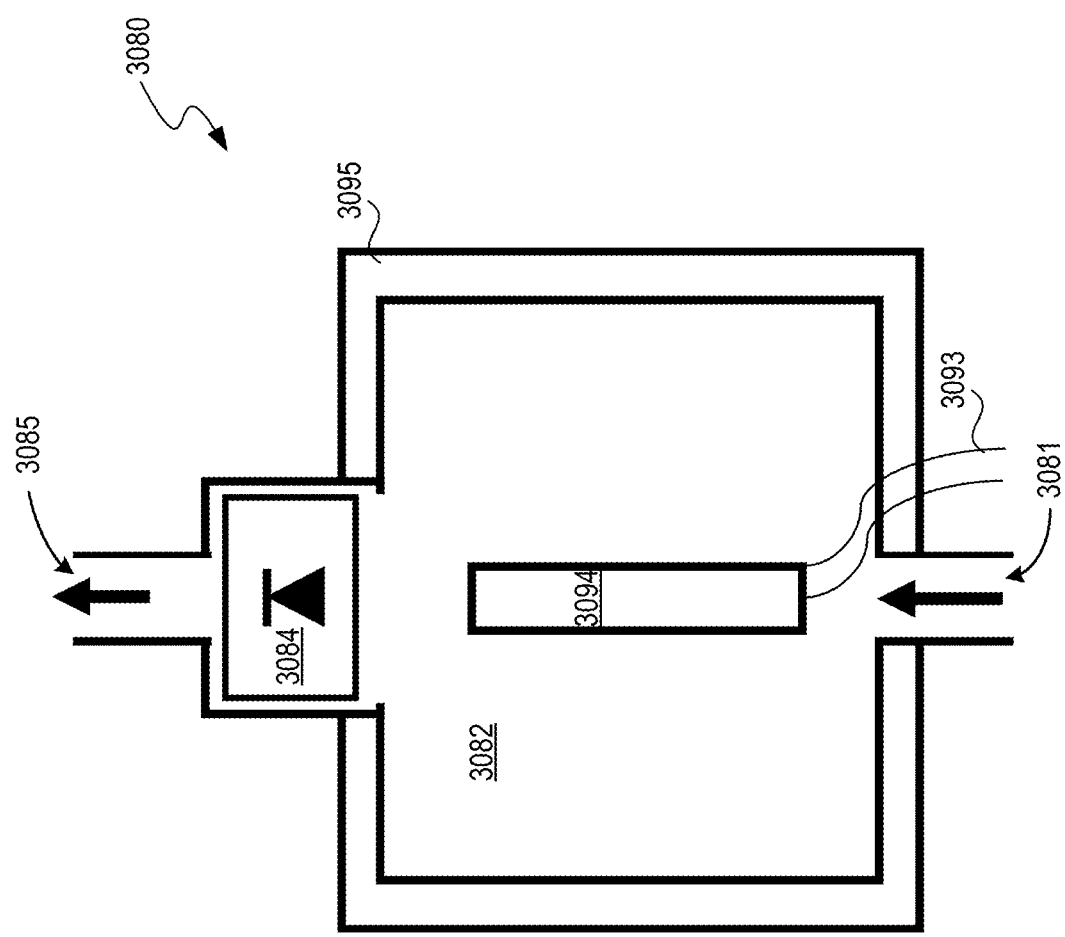
FIG. 30 is a cross-sectional view of a fluid heating device configured in accordance with an embodiment of the present technology.

FIG. 30 is a cross-sectional view of a fluid heating device 3080 configured in accordance with an embodiment of the present technology. In the illustrated embodiment, the device 3080 includes a fluid holding chamber 3082 connected to an inlet port 3081 and an outlet port 3085. Fluid (e.g., washer fluid) can enter the holding chamber 3082 via the inlet port 3081 and can exit the holding chamber 3082 via the outlet port 3085. In some embodiments, a one-way check valve 3084 is positioned within the holding chamber 3082 and configured to prevent fluid back-flow from the outlet port 3085 into the holding chamber 3082. In the illustrated embodiment, the device 3080 includes an electric heating element 3094 configured to heat a fluid in the holding chamber 3082. The electric heating element 3094 can be connected to a controller and/or a power bus by electrical leads 3093. In some embodiments, the leads 3093 can be configured to transmit signals (e.g., temperature signals) sensed from within the holding chamber 3082 (e.g., via one or more sensors; not shown). The device 3080 can also include thermal insulation 3095 configured to limit heat loss from the fluid to the environment.

In some embodiments, the device 3080 can be positioned proximate to a washer fluid nozzle in a cleaning system. Thus, in one aspect of the present technology, the device 3080 is configured to provide localized heating and holding of heated fluids proximate to delivery nozzles or other components for cleaning vehicle components.

Figure 31:
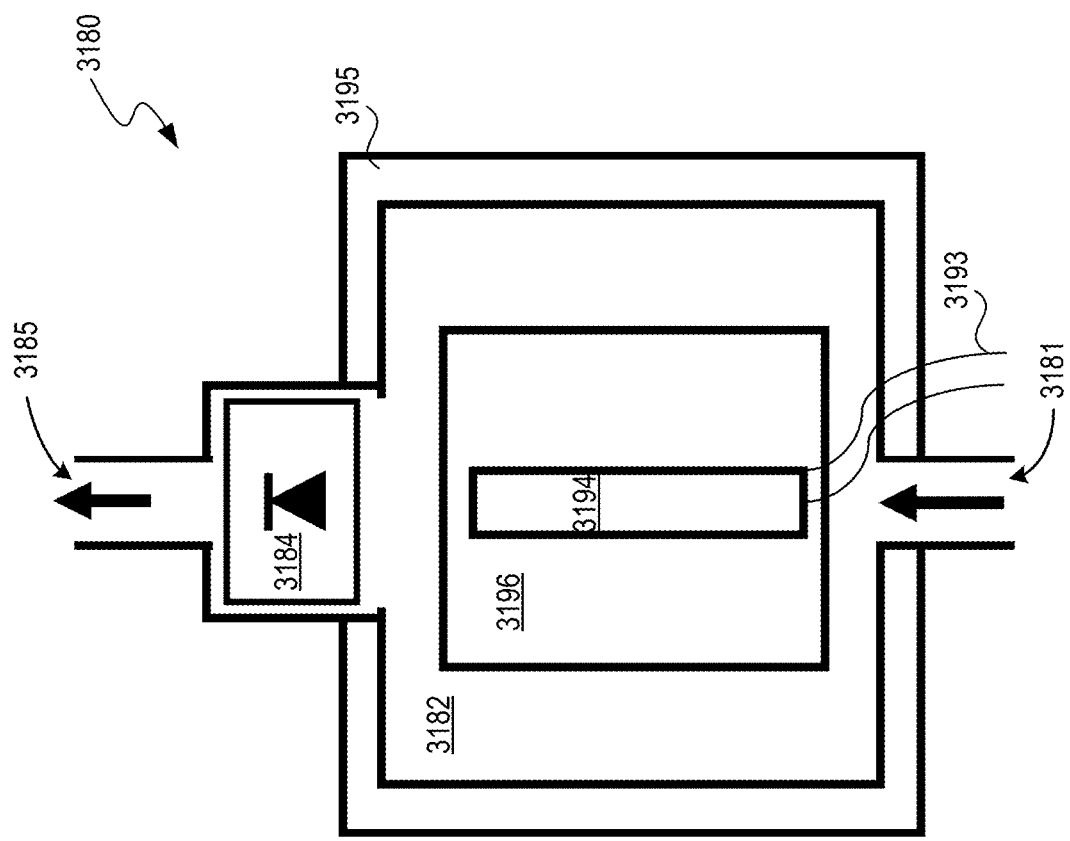
FIG. 31 is a cross-sectional view of a fluid heating device configured in accordance with another embodiment of the present technology.

FIG. 31 is a cross-sectional view of a fluid heating device 3180 configured in accordance with another embodiment of the present technology. In the illustrated embodiment, the device 3180 includes a fluid holding chamber 3182 connected to an inlet port 3181 and an outlet port 3185. Fluid (e.g., washer fluid) can enter the holding chamber 3182 via the inlet port 3181 and can exit the holding chamber 3182 via the outlet port 3185. A one-way check valve 3184 is positioned within the holding chamber 3182 and configured to prevent fluid back-flow from the outlet port 3185 into the holding chamber 3182.

In the illustrated embodiment, the device 3180 further includes a phase change material chamber 3196 positioned within the holding chamber 3182 or otherwise thermally coupled to the holding chamber 3082. An electric heating element 3194 is connected to a controller and/or a power bus by electrical leads 3193 and is configured to heat a phase change material in the phase change material chamber 3196 to thereby heat the fluid in the holding chamber 3182 to, for example, a target temperature range. In some embodiments, the phase change material is selected such that it changes phase within the target temperature range. For example, the target temperature of the fluid in the holding chamber 3182 may be between about 45-55° C. and the phase change material can be selected to shift phases at about 53° C. In some embodiments, the electric heating element 3194 is coupled to a controller configured to provide trickle heating to maintain the temperature of both the washer fluid and the phase change material at 55° C., maintaining the phase change material in its elevated state. When the fluid in the holding chamber 3182 is expelled via the outlet port 3185 (e.g., to be sprayed onto a vehicle component), it can be replaced with cold fluid via the inlet port 3181. The electric heating element 3194 can transfer heat to the cold fluid via the phase change material to thereby accelerate re-heating of the holding chamber 3182 and the fluid therein. In some embodiments, the device 3180 can also include thermal insulation 3195 (e.g., an outer blanket of insulation) configured to limit heat loss from the holding chamber 3182 and the phase change material chamber 3196 to the environment.

In some embodiments, the holding chamber 3182 is configured to hold (e.g., has a volume of about) about 50 milliliters of fluid and the phase change material chamber 3196 is configured to hold about 60 milliliters of an organic phase change material that melts at 63° C. with a latent heat of 150 kilojoules per kilogram and a specific gravity of 0.91. In such embodiments, the thermal energy released by the phase change material as it solidifies is 8.2 kilojoules—enough heat to raise the temperature of 20 milliliters of washer fluid by 120° C. (or twice by 60° C.). In this manner, an electric vehicle including the device 3180 could pre-heat the phase change material and the initial volume of washer fluid in the holding chamber 3182 while charging, and still retain enough energy to deliver 60 milliliters of heated fluid (e.g., in six pulses of 10 milliliters each). The vehicle would only expend energy on maintaining the temperature of the holding chamber 3182 thereafter.

Figure 32:
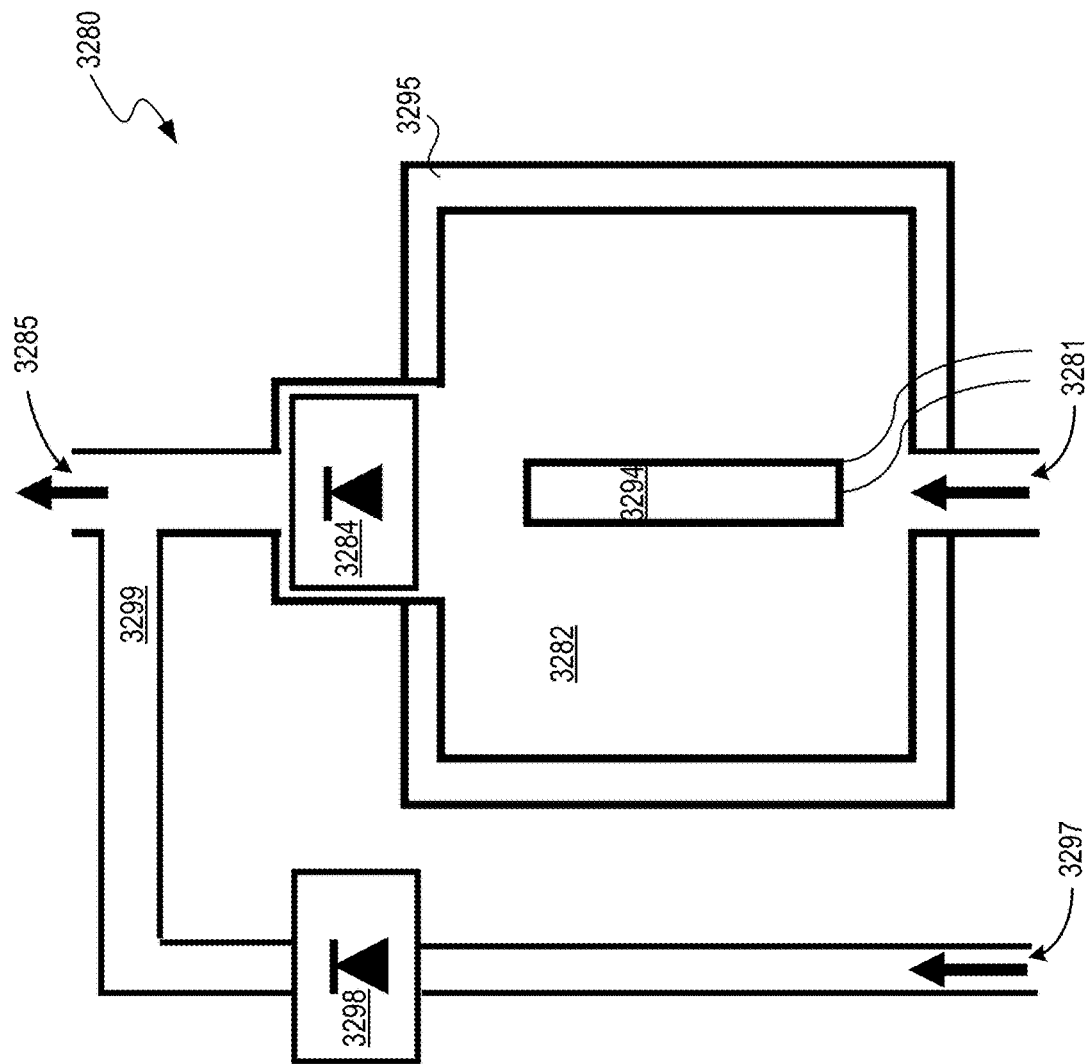
FIG. 32 is a cross-sectional view of a fluid heating and forced airflow device configured in accordance with an embodiment of the present technology.

FIG. 32 is a cross-sectional view of a fluid heating and forced airflow device 3280 configured in accordance with an embodiment of the present technology. In the illustrated embodiment, the device 3280 includes a fluid holding chamber 3282 connected to a fluid inlet port 3281 and a fluid outlet port 3285. Fluid (e.g., washer fluid) can enter the holding chamber 3282 via the fluid inlet port 3281 and can exit the holding chamber 3282 via the fluid outlet port 3285. A one-way check valve 3284 is positioned within the holding chamber 3282 and configured to prevent fluid back-flow from the fluid outlet port 3285 into the holding chamber 3282. An electric heating element 3294 is configured to heat the fluid in the holding chamber 3282, and thermal insulation 3295 is configured to limit heat loss from the holding chamber 3282 to the environment. In the illustrated embodiment, the device 3280 further includes a forced air inlet 3297 and a forced air outlet 3299 separated by a forced air one-way valve 3298. The forced air outlet 3299 can join the fluid outlet port 3285 (e.g., at a T-junction) for outlet and delivery to a nearby vehicle component.

Figure 33:
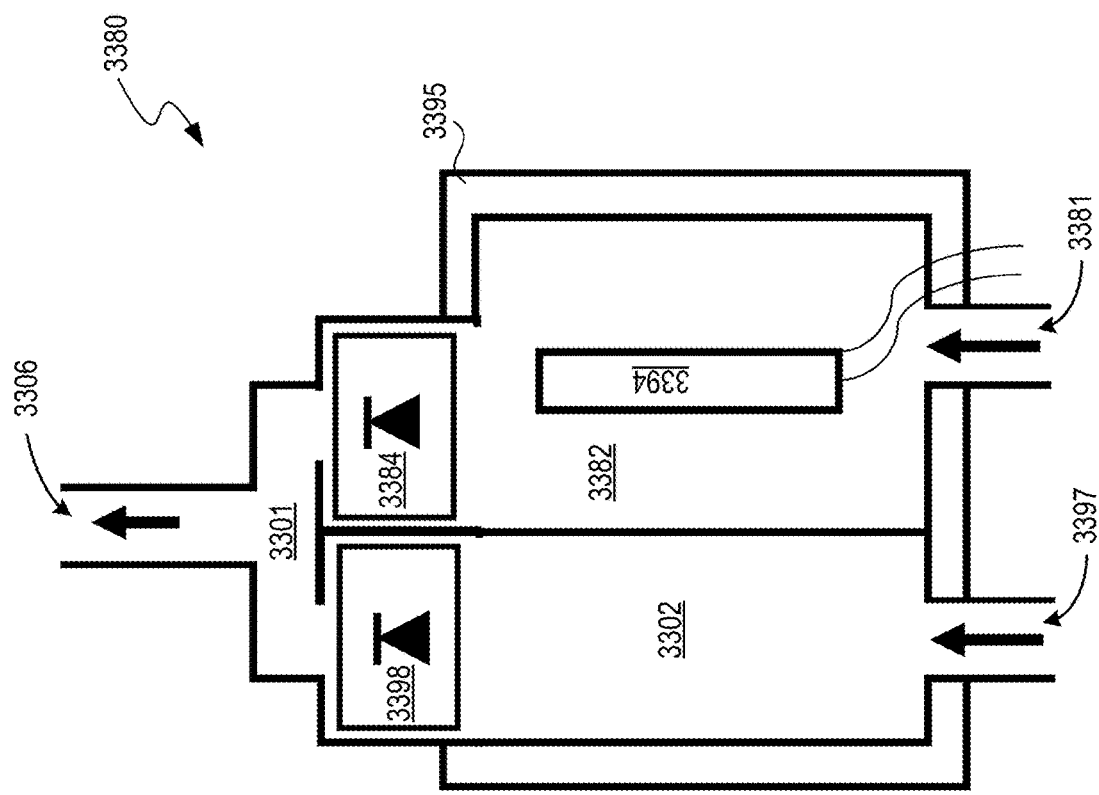
FIG. 33 is a cross-sectional view of a fluid heating and forced airflow device configured in accordance with another embodiment of the present technology.

FIG. 33 is a cross-sectional view of a fluid heating and forced airflow device 3380 configured in accordance with another embodiment of the present technology. In the illustrated embodiment, the device 3380 includes a fluid holding chamber 3382 connected to a fluid inlet port 3381 and an air holding chamber 3302 connected to an air inlet port 3397. The fluid holding chamber 3382 and the air holding chamber 3302 are connected to a common plenum 3301 via a first one-way check valve 3384 and a second one-way check valve 3398, respectively. The plenum 3301 is, in turn, connected to an outlet port 3306 configured to deliver fluid and air to a nearby perception sensor. An electric heating element 3394 is configured to heat the fluid in the fluid holding chamber 3382, and thermal insulation 3395 is configured to limit heat loss from the fluid holding chamber 3382 to the environment. In some embodiments, washer fluid may be provided to outlet port 3306 (e.g., to a nozzle) for cleaning when fluid is pumped, and air may be provided to the outlet port 3306 for surface drying when air flows. Air and washer fluid may be transported to the fluid inlet port 3381 and the air inlet port 3397 by two separate tubes or within two lumens in a dual-lumen tube.

Figure 34:
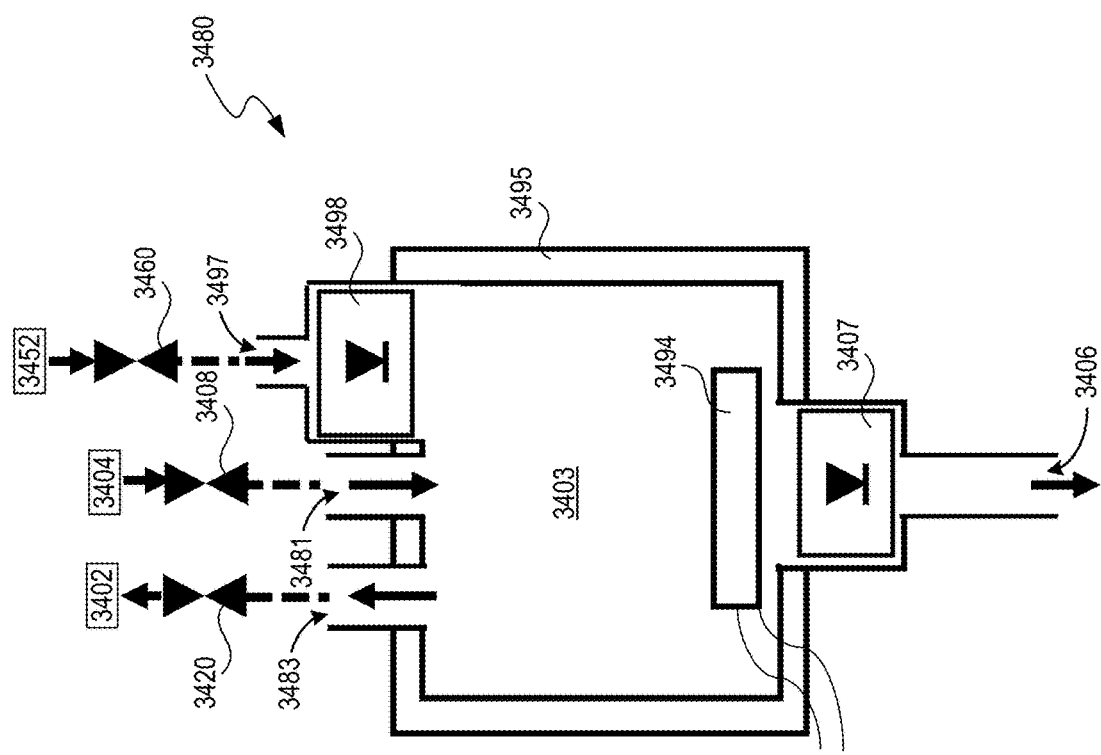
FIG. 34 is a partially-schematic, cross-sectional view of a fluid heating and forced airflow device configured in accordance with another embodiment of the present technology.

FIG. 34 is a partially-schematic, cross-sectional view of a fluid heating and forced airflow device 3480 configured in accordance with another embodiment of the present technology. In the illustrated embodiment, the device 3480 includes a holding chamber 3403 connected to a fluid inlet port 3481, an air inlet port 3497, a return/recirculation port 3483, and a common air and fluid outlet port 3406. The holding chamber 3403 is connected to (i) the outlet port 3406 via a first one-way check valve 3407 and the (ii) air inlet port 3497 via a second one-way check valve 3498. The outlet port 3406 is configured to deliver fluid and/or air to a nearby vehicle component to clean and/or dry the vehicle component. An electric heating element 3494 is configured to heat fluid and/or air in the holding chamber 3403, and thermal insulation 3495 is configured to limit heat loss from the holding chamber 3403 to the environment.

In the illustrated embodiment, a fluid pump 3404 is connected to the fluid inlet port 3481 via a fluid distribution channel and a fluid distribution valve 3408 and is configured to selectively route fluid from a fluid reservoir 3402 to the holding chamber 3403. An air source 3452 is connected to the air inlet port 3497 via an air distribution channel and air distribution valve 3460 and is configured to selectively route air to the holding chamber 3403. The second one-way check valve 3498 can prevent fluid from flowing back into the air inlet port 3497 from the holding chamber 3403. The fluid reservoir 3402 is connected to the return port 3483 of the holding chamber 3403 via a return channel and return valve 3420 which can be selectively opened/closed to allow fluid and/or air to return to the reservoir 3402.

When fluid delivery is desired, the pump 3404 pumps fluid into the holding chamber 3403 while the return valve 3420 remains closed, thereby increasing the pressure within the holding chamber 3403 above the cracking pressure of the first one-way valve 3407. This allows the fluid to flow through the outlet port 3406 to a nozzle or other delivery element. If forced air delivery is subsequently desired, the air source 3452 can pump/force air into the holding chamber 3403 to expel the fluid in the holding chamber 3403 through the first one-way valve 3407 and the outlet port 3406. When the volume of fluid in the holding chamber 3403 has been reduced or depleted, air may then flow out the first one-way valve 3407 and the outlet port 3406 to the nozzle. To refill the holding chamber 3403 with fluid, fluid is pumped into the holding chamber 3403 while the return valve 3420 is open. This allows the holding chamber 3403 to fill with fluid and forces air and fluid through the return port 3483. In some embodiments, if freeze prevention is desired, air may be forced into the holding chamber 3403 while the return valve 3420 is open to evacuate any fluid in the holding chamber 3403.

Figure 35:
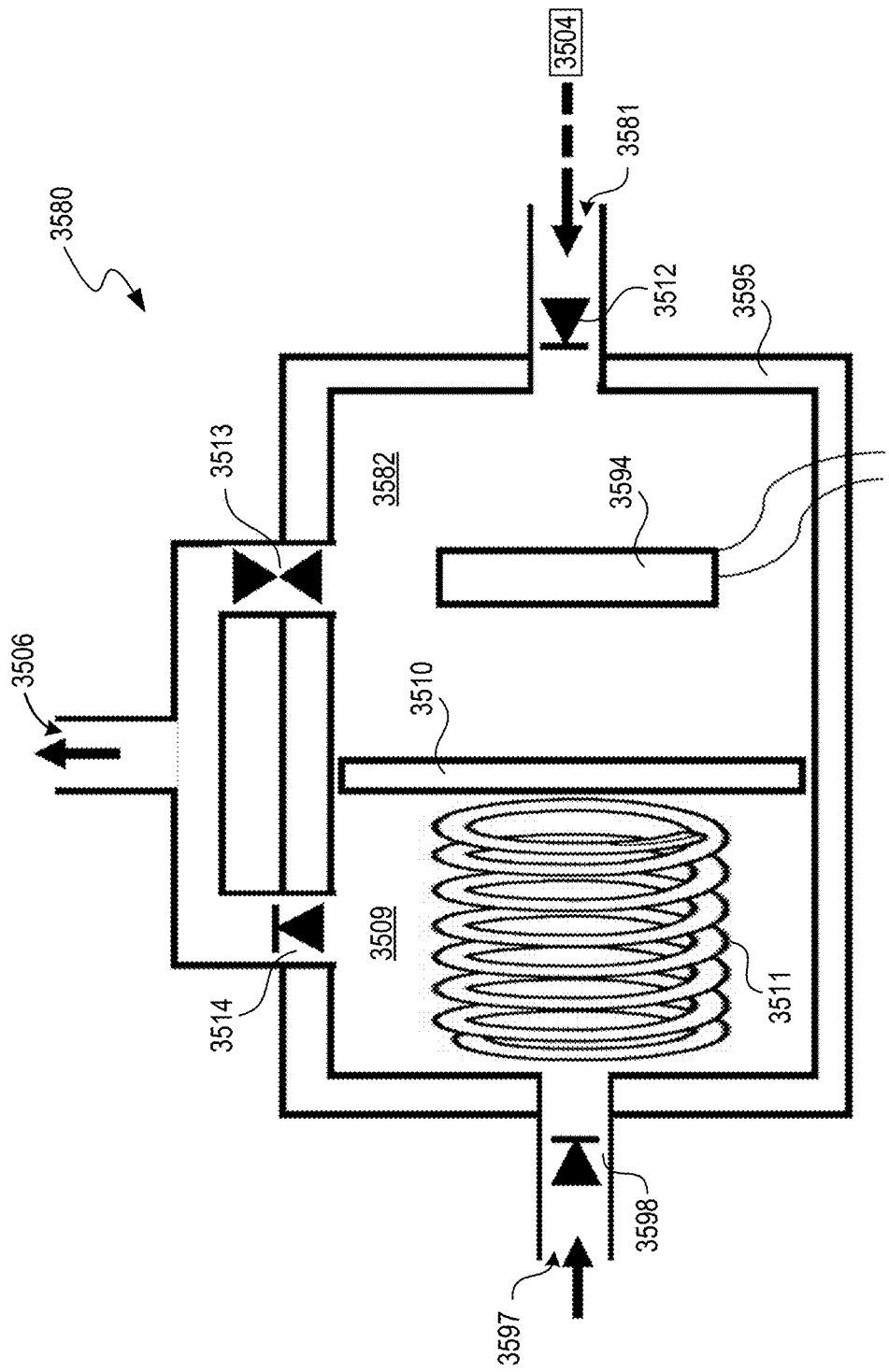
FIG. 35 is a partially-schematic, cross-sectional view of a fluid heating and forced airflow device configured in accordance with another embodiment of the present technology.

FIG. 35 is a partially-schematic, cross-sectional view of a fluid heating and forced airflow device 3580 configured in accordance with another embodiment of the present technology. In the illustrated embodiment, the device 3580 includes (i) a fluid holding chamber 3582 connected to a fluid inlet port 3581 via first one-way check valve 3512 and (ii) an air holding chamber 3509 connected to an air inlet port 3597 via a second one-way valve 3598. The fluid holding chamber 3582 and the air holding chamber 3509 are connected to a common outlet port 3506 via a selectable valve 3513 (e.g., a solenoid valve) and a third one-way check valve 3514, respectively. An electric heating element 3594 is configured to heat the fluid in the fluid holding chamber 3582, and thermal insulation 3595 is configured to limit heat loss from the fluid holding chamber 3582 and/or the air holding chamber 3509 to the environment.

In the illustrated embodiment, a movable piston 3510 separates the fluid holding chamber 3582 from the air holding chamber 3509 and is coupled to a spring 3511. Under normal conditions, the selectable valve 3513 is closed, and the fluid pump 3504 maintains pressure in the washer fluid holding chamber 3582. This pressure drives the piston 3510 toward the air inlet port 3597 (e.g., toward the left of the page in FIG. 35), thereby compressing the spring 3511. When fluid delivery is desired, the selectable valve 3513 is opened and heated fluid exits through the outlet port 3506. This reduces the pressure within the fluid holding chamber 3582 and permits the piston 3510 to be driven toward the fluid inlet port 3581 (e.g., toward the right of the page in FIG. 35) by the spring 3511. Movement of the piston 3510 toward the fluid inlet port 3581 draws air into the air holding chamber 3509. Once a pulse of fluid is ejected through the outlet port 3506, the selectable valve 3513 closes—increasing the pressure in the fluid holding chamber 3582 due to the pressure flow of fluid provided by the pump 3504. This pressure again drives the piston 3510 toward the air inlet port 3597, which drives air from the air holding chamber 3509 and through the outlet port 3506.

Therefore, in one aspect of the present technology, the device 3580 is configured to deliver both heated fluid and forced air using only the pressure from the fluid pump 3504. That is, forced air delivery is achieved without the need for a pressurized air source.

Figure 36:
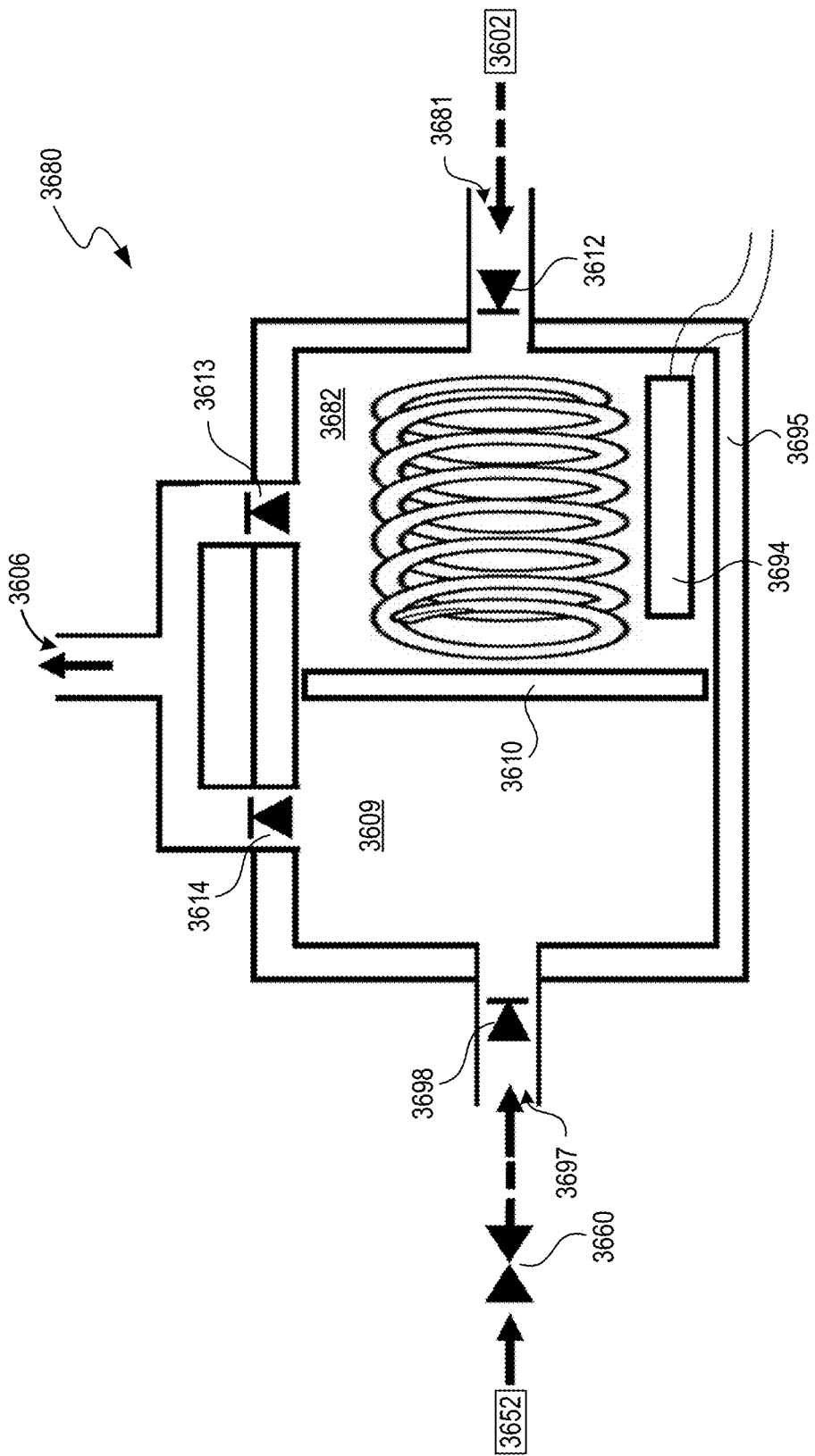
FIG. 36 is a partially-schematic, cross-sectional view of a fluid heating and forced airflow device configured in accordance with another embodiment of the present technology.

FIG. 36 is a partially-schematic, cross-sectional view of a fluid heating and forced airflow device 3680 configured in accordance with another embodiment of the present technology. In the illustrated embodiment, the device 3680 includes (i) a fluid holding chamber 3682 connected to a fluid inlet port 3681 via first one-way check valve 3612 and (ii) an air holding chamber 3609 connected to an air inlet port 3697 via a second one-way valve 3698. The fluid holding chamber 3682 and the air holding chamber 3609 are connected to a common outlet port 3606 via a third one-way check valve 3613 and a fourth one-way check valve 3614, respectively. An electric heating element 3694 is configured to heat the fluid in the fluid holding chamber 3682, and thermal insulation 3695 is configured to limit heat loss from the fluid holding chamber 3682 and/or the air holding chamber 3609 to the environment. A movable piston 3610 separates the fluid holding chamber 3682 from the air holding chamber 3609 and is coupled to a spring 3611.

In the illustrated embodiment, the air inlet port 3697 is connected to an air source 3652 via a selectable valve (e.g., a solenoid valve) 3660. The fluid inlet port 3681 is connected to a fluid reservoir 3602. Under normal conditions, the fluid holding chamber 3682 is filled with fluid and (ii) the air holding chamber 3609 and the fluid holding chamber 3682 are at near-ambient pressure such that the spring 3611 is extended and the piston 3610 is extended (e.g., in a most-extend position) toward the air inlet port 3697 (e.g., toward the left of the page in FIG. 36). When fluid delivery is desired, the selectable valve 3660 is opened and air flows into the air holding chamber 3609. This increases the pressure within the air holding chamber 3609 and drives the piston toward the fluid inlet port 3681 (e.g., toward the right of the page in FIG. 36). Movement of the piston 3610 toward the fluid inlet port 3681 increases the pressure in the fluid holding chamber 3682 until the cracking pressure of the third one-way check valve 3613 is exceeded and fluid is expelled through the outlet port 3606 to a nozzle or other delivery element. The piston 3610 eventually stops moving as the spring 3611 compresses until the air pressure in the air holding chamber 3609 exceeds the cracking pressure of the fourth one-way check valve 3614, which drives air from the air holding chamber 3609 through the fourth one-way check valve 3614 and through the outlet port 3606 to the nozzle or other delivery element. When the selectable valve 3660 is closed, the pressure in the air holding chamber 3609 returns to ambient, and the spring 3611 extends and drives the piston 3610 toward the air inlet port 3697. This movement of the piston 3610 draws fluid from the reservoir 3602 into the fluid holding chamber 3682.

Therefore, in one aspect of the present technology, the device 3680 is configured to deliver both heated fluid and forced air using only the pressure from the air source 3652. That is, heated fluid delivery is achieved without the need for a fluid pump.

IX. SELECTED EMBODIMENTS OF DELIVERY/RETURN CHANNELS

Because washer fluid and forced air distribution systems may be designed to deliver air and/or fluid to twenty or more vehicle components (e.g., surfaces, sensors, etc.), the management of tubing within a vehicle may become quite complex. In some embodiments, the routing, mounting, and tracing may be significantly easier for a co-extruded bundle of tubes than a collection of individual tubes. Similarly, because recirculating washer fluid systems bring washer fluid to and back from component locations around the vehicle, and forced air systems bring air to the same points, using co-extruded multi-lumen tubing may greatly simplify such systems.

Figure 37:
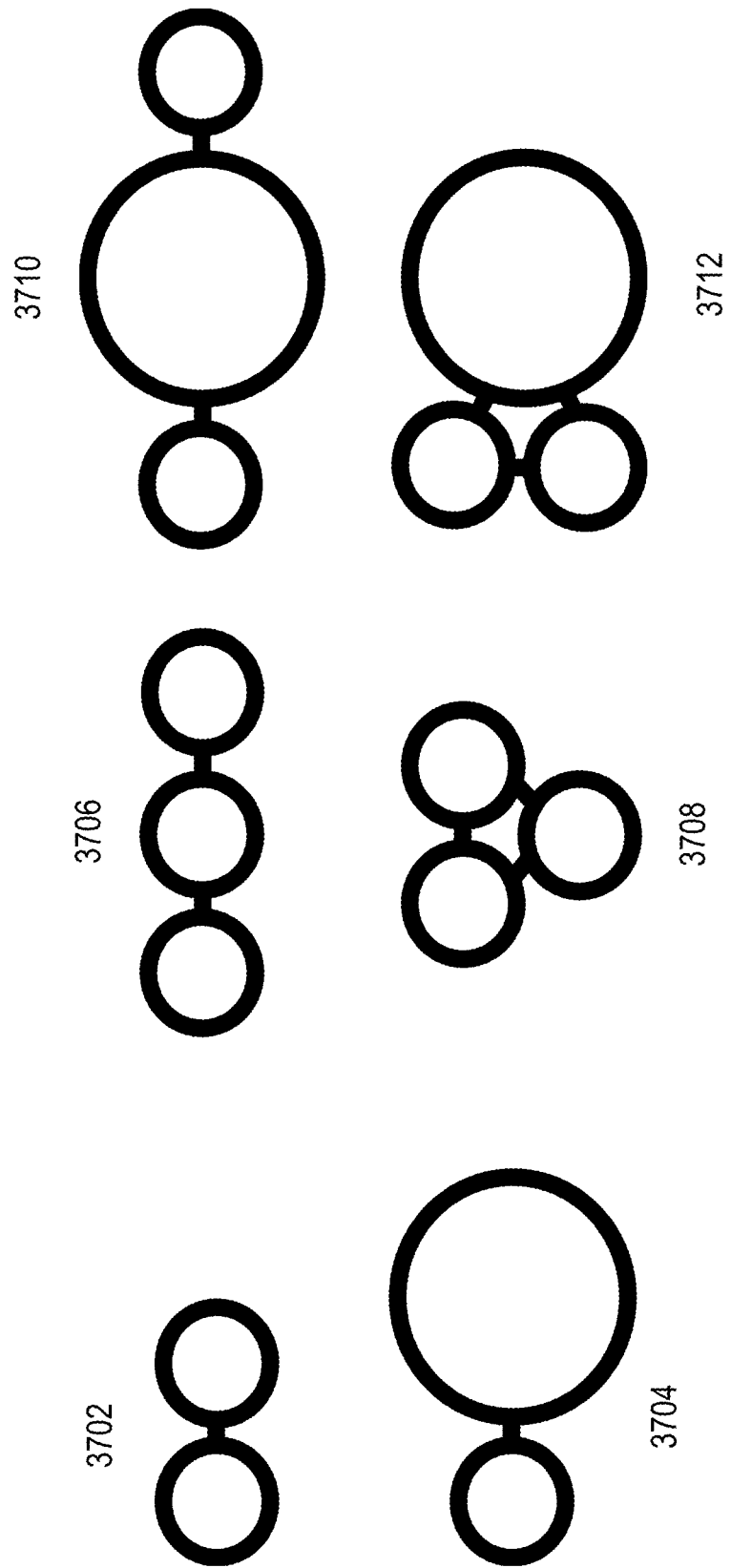
FIG. 37 includes several cross-sectional views of multi-lumen tubing for fluid and/or air delivery and/or recirculation configured in accordance with embodiments of the present technology.

Accordingly, FIG. 37 includes several cross-sectional views of multi-lumen tubing for fluid and/or air delivery and/or recirculation configured in accordance with embodiments of the present technology. In some embodiments, a selected fluid delivery channel and the associated return channel can be combined in a single tube 3702 having two equally-sized lumen. In some embodiments of systems including forced air delivery, fluid delivery, and fluid recirculation the various delivery and return channels can be combined in a tube 3706 having three equal sized lumens in a linear (e.g. planar) arrangement or a tube 3708 having three equally sized lumens in a bunched arrangement. In some embodiments, the washer fluid and/or of forced air can flow at significantly different flow velocities. Accordingly, the various delivery and return channels can be combined in a tube 3710 having three unequally-sized lumens in a linear arrangement or a tube 3712 having three unequally sized lumens in a bunched arrangement. In yet other embodiments, a tube 3704 having two unequally sized lumens can be used to, for example, combine fluid delivery and return channels. As one of ordinary skill in the art will appreciate, many other configurations of multi-lumen tubing are within the scope of the present technology.

In some embodiments, the various tube lumens can be used to carry wires instead of or in addition to fluid and air. Such wires can include, for example, any wires necessary to sense, control, and/or operate localized heating elements within distributed heating chambers.

X. SELECTED EMBODIMENTS OF FLUID HEATING

Referring again to FIG. 1, in some embodiments the cleaning system 110 is configured to heat fluid such that it has a temperature of between about 35-60° C. when it is held within one or more holding and/or heating chambers positioned near corresponding vehicle components (e.g., corresponding ones of the sensors 108 and/or perception surfaces 109). In some embodiments, a target temperature within each chamber may be different based on, for example, a surface to be cleaned, a vehicle operating state, ambient weather conditions, etc. For example, the cleaning system 110 may have one or more preset temperature target modes, and each channel (corresponding to a chamber) may be assigned one of these preset modes which determines the temperature to which it will heat fluid held in its heating chamber. For example, the cleaning system 110 can have a high temperature mode set to 60° C., a medium mode set to 45° C., a low temperature mode set to 30° C., and/or an ambient temperature mode in which no heating is provided. The cleaning system 110 can determine which mode to assign to each channel through the use of inputs, such as inputs from ambient temperature sensors or information conveyed by a vehicle control system.

In some embodiments, the vehicle 100 is an electric vehicle having one or more batteries and the cleaning system 110 is configured to pre-heat fluid during charging of the batteries. That is, initial fluid heating may be performed while the vehicle 100 is charging to minimize energy consumption from the batteries of the vehicle 100 during operation.

In some embodiments, the cleaning system 110 is configured heat fluid within one or more heating chambers using closed-loop temperature control of electric resistance heating elements. Accordingly, one or more electric resistance heating elements and one or more temperature sensors can be located within each heating chamber. The temperature in the heating chamber can be measured on one or more heating elements, in the fluid in the heating chamber, or elsewhere in the heating chamber. In some embodiments, bang-bang heating control is done wherein power to the one or more heating elements is turned on when the measured temperature is below a first threshold value and is turned off when it is above a second threshold value. In other embodiments, power provided to the one or more heating elements is reduced to reduce the heating rate. For example, power can be reduced via pulse width modulation of the electrical circuit of each heating element to reduce the average voltage provided to the one or more heating elements. In yet other embodiments, heating power is reduced by low frequency switching of the power to the one or more heating elements, such as turning the heaters on for several seconds and then off for several seconds. In some embodiments, heating power is increased or reduced based on the difference between the measured temperature and a target temperature.

In some embodiments, the cleaning system 110 is configured to heat fluid within one or more heating chambers using uncontrolled positive temperature coefficient fluid heating within the heating chambers. For example, the heating can be done by providing electric power to positive temperature coefficient heating elements positioned at and/or within the heating chambers. The cleaning system 110 can provide a constant voltage to the positive temperature coefficient heating elements or a modulated voltage to, for example, control the heating rate or the equilibrium temperature of the heating elements.

In some embodiments, the cleaning system 110 is configured to heat fluid within one or more heating chambers using switched positive temperature coefficient fluid heating within the heating chambers. For example, the heating can be done by independently controlling the electric power to positive temperature coefficient heating elements positioned at and/or within the heating chambers. In other embodiments, the heating chambers can be grouped, and the electric power can be modulated to each group of associated heating elements. Each heating chamber can contain one or more one positive temperature coefficient heating elements that can have the same or different power ratings, the same or different equilibrium temperatures, and/or can be controlled together or independently.

Figure 38:
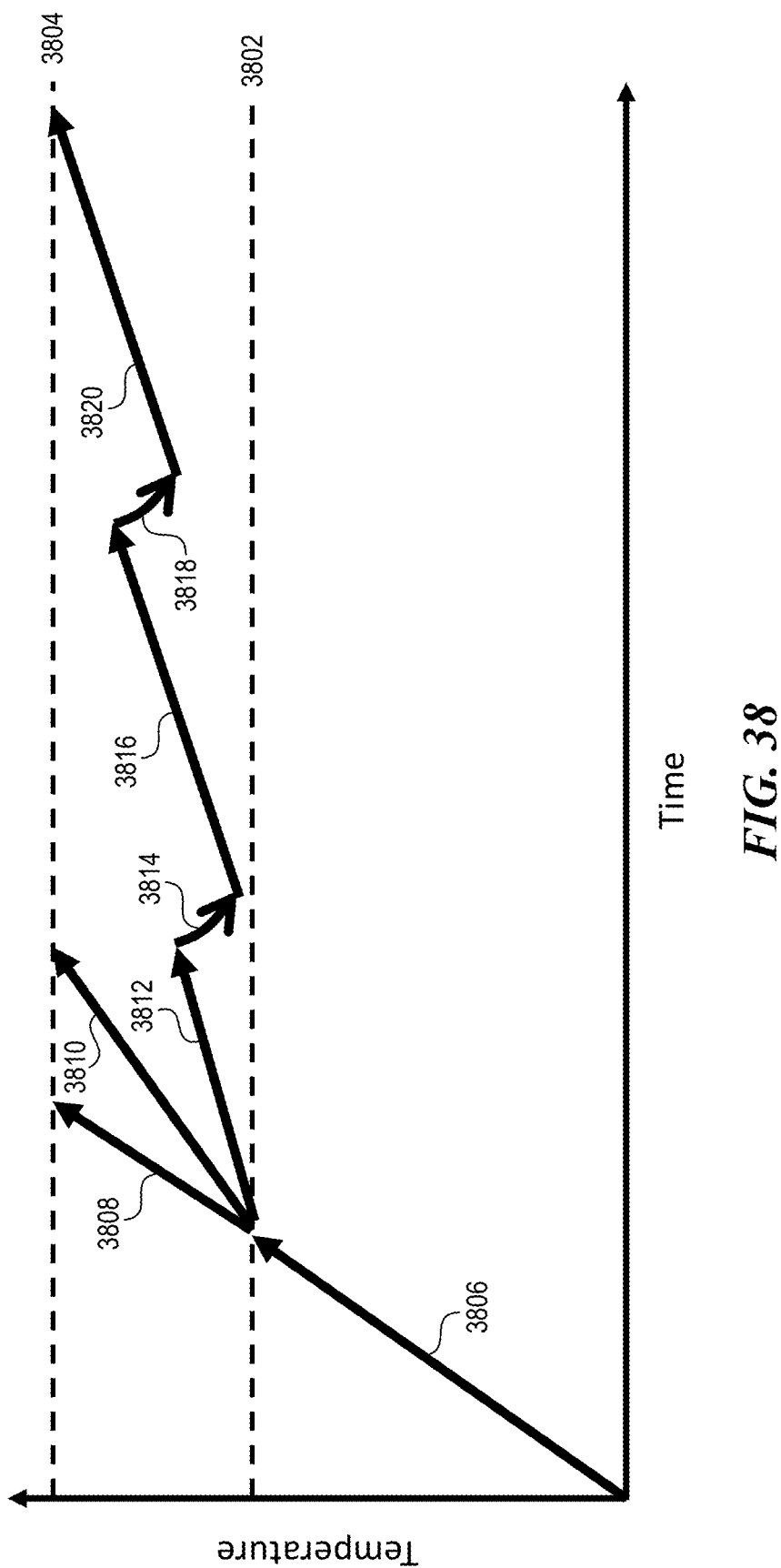
FIG. 38 is a graph of fluid temperature versus time within a washer fluid heating chamber in accordance with embodiments of the present technology.

FIG. 38 is a graph of fluid temperature versus time for the heating of washer fluid within a heating chamber (e.g., by a cleaning system, such as the cleaning system 110 of FIG. 1) in accordance with embodiments of the present technology. In the illustrated embodiment, the fluid heating system provides an initial rapid fluid heating 3806 curve such that the washer fluid temperature rises quickly to a lower limit 3802 of a target temperature range. This can provide the washer fluid with enough thermal energy to reduce its viscosity, increase its flow rate, and improve its cleaning ability. Once the lower limit 2802 of the target temperature range is reached, the fluid heating system may manage the expenditure of power in different ways to reduce power draw from the vehicle. If power is readily available, heating may continue as before, following the curve 3808 denoting continued rapid fluid heating. If cumulative power management is needed, the fluid heating system may reduce the power provided to the heater in the heating chamber, resulting in a reduced power fluid heating curve 3810. In extreme cases, power may be greatly reduced, as in a curve 3812 denoting power-limited fluid heating. In some embodiments, heating may be turned off, yielding pauses in heating (and associated temperature decline)—denoted by a first paused heating period 3814 and a second paused heating period 3818. The fluid heating system may intermittently have power available, allowing the system to continue heating as shown by a resumed power-limited heating curve 3816, and a second resumed power-limited heating curve 3820 until an upper limit 3804 of the target temperature range is achieved. Once the upper limit 3084 is reached, heating is reduced, stopped, or the temperature is thermostatically controlled at a minimal heating rate required to offset thermal losses to the environment.

XI. SELECTED EMBODIMENTS OF PULSED FLUID DELIVERY

Referring again to FIG. 1, in some embodiments the cleaning system 110 is configured to deliver fluid to clean vehicle components in pulses as one or more fluid delivery valves are opened and subsequently closed (while a fluid pump operates) to deliver the fluid along selected channels to corresponding ones of the fluid delivery components 114. In some embodiments, the parameters which control the pulse may be preset and correspond to the vehicle component to be cleaned such that each vehicle component (e.g., a surface thereof) receives an appropriate amount of fluid. In some embodiments, each vehicle component to be cleaned has a standard set of parameters which control the delivery of a fluid pulse. These parameters may be added to, subtracted from, multiplied, or divided based on changes to input parameters which include an ambient temperature, a temperature of the fluid, a detected occlusion severity, a mode of vehicle operation, a location of the vehicle 100, and/or other factors. In some embodiments, standard pulses for warmed fluid delivery are set to be between 0.5-5 milliliters per square centimeter of surface area to be cleaned.

In some embodiments, each fluid pulse is controlled by actuating the pump and the delivery valves for a preset time. The preset time may be different for each vehicle component to be cleaned and may change based on other sensed parameters. For example, longer duration pulses may occur when ambient temperatures are lower or detected occlusions are severe. In some embodiments, the delivery of each fluid pulse may be controlled to deliver a specified volume of fluid. This volume may be different for each vehicle component to be cleaned and may change based on other sensed parameters. For example, larger volume pulses may occur when ambient temperatures are lower, and the viscosity of the delivered fluid is greater (e.g., resulting in lower flow rates for a given pump pressure). As another example, pulse volumes may increase when difficult-to-clean occlusions are sensed, perhaps such as insect splatter, or may be decreased when minor occlusions like surface dust are detected.

XII. SELECTED EMBODIMENTS OF CLEANING SYSTEM CONTROL

Referring again to FIG. 1, in some embodiments an electronic control system (e.g., the controller 106 of the vehicle delivery system 104 and/or the controller 112 of the cleaning system 112) includes a microprocessor configured to control/actuate the components of the cleaning system 110, such as one or more fluid pumps, valves, electric heaters, etc. The electronic control system can be separate from the vehicle control system 104 or can communicate with the vehicle control system to receive signals, such as operating states of the vehicle 100, ambient temperatures, power limits, sensors to be cleaned, error signals (such as empty washer fluid reservoir), etc. In some embodiments, the vehicle control system 104 directly controls the cleaning system 110.

When the vehicle 100 is an electric vehicle, it is often important to manage power and energy draw from the batteries of the vehicle 100. The vehicle 100 can include energy management controls which prioritize and de-prioritize expenditure of stored electric energy on vehicle systems. When the cleaning system 110 uses electric energy to heat washer fluid, the vehicle 100 may command a state in the cleaning system 110 which limits electric power usage. In some embodiments, the vehicle control system 104 communicates an operating state to the cleaning system 110, and the cleaning system 110 modifies the fluid heating temperatures accordingly.

In some embodiments, the vehicle control system 104 communicates an operating state to the cleaning system 110, and the cleaning system 110 manages the cumulative consumption of electricity from the cleaning system 110 to remain within a corresponding preset range. In other embodiments, the vehicle control system 104 communicates a numerical value for a preset power limit to the cleaning system 110, and the cleaning system 110 allocates the cumulative power consumption of the system to stay within this limit.

In some embodiments, the cleaning system 110 includes one or more energy storage devices in which in which electrical energy may be stored over a period and released for fluid heating and valve operation over a shorter period. The energy storage devices can be batteries, capacitors, and/or other devices. The energy storage devices can be located proximate to one or more fluid heating chambers and the heating elements contained therein. In such embodiments, small wires may carry low electric current over longer spans to the energy storage devices, and larger wires can carry the higher currents from the energy storage devices to the heating elements over a shorter distance. In some embodiments, the energy storage devices are designed to hold enough energy to heat the washer fluid within a heating chamber by about 50° C., can store between 1-10 kilojoules of electrical energy, and/or can release their stored energy in less than 30 seconds.

XIII. EXEMPLARY SYSTEM

Referring again to FIG. 1, in some embodiments, the cleaning system 110 includes 20 parallel fluid delivery channels, 15 of which service small, 5 square centimeter camera sensor surfaces, and 5 of which service larger, 25 square centimeter LIDAR sensor surfaces. In some embodiments, maintaining the cleanliness of the LIDAR sensor surfaces can be relatively more important than maintaining the cleanliness of the camera surfaces. When a camera surface occlusion is detected, delivery of a 10-milliliter bolus of heated fluid is specified. In line, just before nozzles configured to clean the camera surfaces, each channel can have a 20-milliliter heating chamber including a 20-watt electric heater capable of heating the volume from 0° C. to 30° C. in less than three minutes, and to 55° C. in less than ten minutes. To clean the LIDAR surfaces, a 50-milliliter bolus of heated fluid is specified. In line, just before the LIDAR surfaces, each channel has a 100-milliliter heating chamber including a 100-watt electric heater.

Accordingly, operating all 20 channels at maximum power can requires 800 watts. This power can be available from the vehicle 100 while the vehicle 100 is charging (in the case of an electric vehicle), or for a short period of up to five minutes after start-up. After the start-up period, the cleaning system 110 can have a maximum allowable power draw of 130 watts. The system controller selectively applies this power to the 20 fluid holding chambers to compensate for their heat loss and to maintain their temperatures, or to reheat fluid in a chamber following fluid delivery.

The cumulative heat loss from the holding chambers—even in very cold conditions—can total less than approximately 25 watts. Reheating a large holding chamber following delivery of a pulse of fluid may draw as much as approximately 100 watts if rapid reheating is allowed, or less, if the heating rate is throttled to limit system power. Cumulatively, the cleaning system 110 may see short peaks of 125-watt power draw but, over time, the average power draw is expected to be much closer to 25 watts. When ambient temperatures are warmer, or when the target washer fluid temperature is reduced, this power draw can be reduced considerably.

XIV. CONCLUSION

The above Detailed Description of examples of the present technology is not intended to be exhaustive or to limit the present technology to the precise form disclosed above. While specific examples for the present technology are described above for illustrative purposes, various equivalent modifications are possible within the scope of the present technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the present technology in light of the above Detailed Description. While the Detailed Description describes certain examples of the present technology as well as the best mode contemplated, the present technology can be practiced in many ways, no matter how detailed the above description appears in text. Details of the system may vary considerably in its specific implementation, while still being encompassed by the technology disclosed herein. As noted above, particular terminology used when describing certain features or aspects of the present technology should not be taken to imply that the terminology is being redefined herein to be restricted to any specific characteristics, features, or aspects of the present technology with which that terminology is associated. Accordingly, the present technology is not limited, except as by the appended claims. In general, the terms used in the following claims should not be construed to limit the present technology to the specific examples disclosed in the specification, unless the above Detailed Description section explicitly defines such terms.

Although certain aspects of the present technology are presented below in certain claim forms, the applicant contemplates the various aspects of the present technology in any number of claim forms. Accordingly, the applicant reserves the right to pursue additional claims after filing this application to pursue such additional claim forms, in either this application or in a continuing application.

We claim:

1. A system for cleaning a perception component of a vehicle, the system comprising:
    a manifold including a delivery valve and a return valve each movable between open and closed positions;
    a pump configured to be actuated to provide a flow of fluid to the manifold;
    a delivery conduit fluidly connected to the manifold via the delivery valve;
    a holding chamber fluidly connected to the delivery conduit, wherein the holding chamber is configured to hold a volume of the fluid;
    a one-way valve fluidly connected to the holding chamber, wherein the one-way valve is movable from a closed position to an open position when a pressure in the holding chamber exceeds a cracking-pressure of the one-way valve;
    a delivery component fluidly connected to the holding chamber via the one-way valve, wherein the delivery component is configured to deliver the fluid to the perception component of the vehicle to clean the perception component; and
    a return conduit fluidly connected to (a) the manifold via the return valve and (b) the holding chamber.

2. The system of claim 1 wherein, when the delivery valve and the return valve are both in the open position and the pump is actuated, the pressure in the holding chamber does not exceed the cracking-pressure of the one-way valve such that the flow of the fluid is routed (a) from the manifold along the delivery conduit to the holding chamber and (b) from the holding chamber along the return conduit back to the manifold.

3. The system of claim 2, further comprising:
    a temperature sensor configured to detect a temperature of the volume of the fluid in the holding chamber; and
    a controller configured to—
        receive the temperature from the temperature sensor; and
        when the temperature is below a predefined threshold, send a control signal to the manifold to (a) move the delivery valve to the open position and (b) move the return valve to the open position to route the flow of the fluid from the holding chamber along the return conduit to the manifold.

4. The system of claim 1 wherein, when the delivery valve is in the open position, the return valve is in the closed position, and the pump is actuated, the pressure in the holding chamber exceeds the cracking-pressure of the one-way valve such that the flow of the fluid is routed (a) from the manifold along the delivery conduit to the holding chamber and (b) from the holding chamber to the delivery component for delivery to the perception component.

5. The system of claim 4, further comprising a controller configured to—
    receive a signal from the perception component indicating that the perception component has an occlusion; and
    based on the signal indicating that the perception component has an occlusion, send a control signal to the manifold to (a) move the delivery valve to the open position and (b) move the return valve to the closed position to deliver the fluid from the holding chamber to the perception component to clear the occlusion.

6. The system of claim 1 wherein the delivery conduit and the return conduit each comprise a separate lumen in the same tube.

7. The system of claim 1 wherein the volume of the fluid held by the holding chamber is sufficient for up to 5 pulses of the fluid for delivery to clear a surface of the perception component.

8. The system of claim 1 wherein the holding chamber is insulated to inhibit heat loss from the volume of the fluid held therein.

9. The system of claim 1, further comprising a fluid heater fluidly connected to the manifold, wherein the heater is an electric heater, a parasitic heater, or both an electric heater and a parasitic heater.

10. A system for cleaning a perception component of a vehicle, the system comprising:
    a manifold including a delivery valve and a return valve each movable between open and closed positions, wherein the manifold is configured to receive a flow of fluid;
    a delivery conduit fluidly connected to the manifold via the delivery valve;
    a holding chamber fluidly connected to the delivery conduit, wherein the holding chamber is configured to hold a volume of the fluid;
    a flow-control valve fluidly connected to the holding chamber, wherein the flow control valve is a one-way valve fluidly connected to the holding chamber, wherein the one-way valve is moveable from a closed position to an open position when a pressure in the holding chamber exceeds a cracking-pressure of the one-way valve;
    a delivery component fluidly connected to the holding chamber via the flow-control valve, wherein the delivery component is configured to deliver the fluid to the perception component of the vehicle to clean the perception component; and
    a return conduit fluidly connected to (a) the manifold via the return valve and (b) the holding chamber.

11. The system of claim 10, further comprising a controller configured to—
    receive a signal from the perception component indicating that the perception component has an occlusion.

12. The system of claim 10, further comprising:
    a temperature sensor configured to detect a temperature of the volume of the fluid in the holding chamber.

13. The system of claim 10 wherein the delivery component is a nozzle configured to spray the fluid against the perception component to clean the perception component.

14. The system of claim 10 wherein the perception component is a sensor having a perception surface, and wherein the delivery component is a nozzle configured to spray the fluid against the perception surface.

15. The system of claim 10 wherein the holding chamber has a ratio of surface area to volume that is less than a ratio of surface area to volume of the delivery conduit.

16. The system of claim 10 wherein the holding chamber is connected to an insulated segment of the delivery conduit adjacent to the delivery component.

17. The system of claim 10 wherein the flow control valve is between the holding chamber and the delivery component.

* * * * *